United States Patent [19]
Kudoh et al.

[11] Patent Number: 5,948,058
[45] Date of Patent: Sep. 7, 1999

[54] METHOD AND APPARATUS FOR CATALOGING AND DISPLAYING E-MAIL USING A CLASSIFICATION RULE PREPARING MEANS AND PROVIDING CATALOGING A PIECE OF E-MAIL INTO MULTIPLE CATEGORIES OR CLASSIFICATION TYPES BASED ON E-MAIL OBJECT INFORMATION

[75] Inventors: Masato Kudoh; Midori Tanaka; Yoshiyuki Koseki, all of Tokyo, Japan

[73] Assignee: NEC Corporation, Tokyo, Japan

[21] Appl. No.: 08/739,838

[22] Filed: Oct. 30, 1996

[30] Foreign Application Priority Data

Oct. 30, 1995 [JP] Japan ..................................... 7-304968
Jan. 10, 1996 [JP] Japan ..................................... 8-001880

[51] Int. Cl.$^6$ ........................... G06F 15/20; G06F 15/18; G06F 15/00; G06F 13/00
[52] U.S. Cl. .......................... 709/206; 709/207; 709/203; 707/104; 707/103; 707/500; 707/522; 707/526; 707/7; 706/45; 706/47; 705/30; 705/32
[58] Field of Search ........................ 395/200.36, 200.37, 395/200.33; 705/30, 32; 707/10–4, 104, 103, 500, 522, 526; 706/45, 47; 709/207, 203

[56] References Cited

U.S. PATENT DOCUMENTS

| | | | |
|---|---|---|---|
| 5,245,532 | 9/1993 | Mourier | 364/400 |
| 5,283,856 | 2/1994 | Gross et al. | 706/45 |
| 5,283,887 | 2/1994 | Zachery | 395/200.36 |
| 5,333,266 | 7/1994 | Boaz et al. | 395/200.36 |
| 5,377,354 | 12/1994 | Scannell et al. | 706/45 |
| 5,483,466 | 1/1996 | Kawahara et al. | 395/200.36 X |
| 5,504,897 | 4/1996 | Gans et al. | 707/104 |
| 5,544,360 | 8/1996 | Lewak et al. | 707/1 |
| 5,555,346 | 9/1996 | Gross et al. | 706/45 |
| 5,613,108 | 3/1997 | Morikawa | 707/202 |
| 5,627,764 | 5/1997 | Schutzman et al. | 395/200.37 |
| 5,717,913 | 2/1998 | Driscoll | 707/4 |
| 5,752,059 | 5/1998 | Holleran et al. | 395/200.36 |
| 5,761,644 | 9/1998 | Ueda et al. | 705/1 |

FOREIGN PATENT DOCUMENTS

| | | |
|---|---|---|
| 63-175965 | 7/1988 | Japan . |
| 2-170642 | 7/1990 | Japan . |
| 4-351134 | 12/1992 | Japan . |
| 5-110593 | 4/1993 | Japan . |
| 6-162085 | 6/1994 | Japan . |

Primary Examiner—Frank J. Asta
Assistant Examiner—William D. Thomson
Attorney, Agent, or Firm—Foley & Lardner

[57] ABSTRACT

An electronic mail cataloging and retrieving system comprises an electronic mail communication unit, an electronic mail storage unit for storing electronic mails, a tray information storage unit for storing information on classification types used for classification of electronic mails and a format for relating electronic mails to said classification types, an electronic mail object storage unit for storing an electronic mail object related to each electronic mail stored in the electronic mail storage unit, a header information display control unit for showing header information and electronic mail attribute information on a prescribed electronic mail in the form of an at-a-glance guide, a tray display control unit showing tray information which shows that a prescribed electronic mail is classified into a prescribed classification type, and an electronic mail editing means for showing and editing the content of an electronic mail.

28 Claims, 34 Drawing Sheets

FIG. 32

| | UNCLASSIFIED | MATERIAL MANAGEMENT | SKI CLUB | tanaka | BUG | INPORTANT |
|---|---|---|---|---|---|---|
| 11/1 osamu@kp TRAINING CAMP | ○ | | | | | |
| 11/1 midori@swi MATERIAL | | | × | | | |
| 10/31 tanaka@xxx BUG | | | | | ○ | |
| 10/31 yamada@kk MATERIAL | | | ○ | | | ○ |
| 10/30 tanaka@xxx MEETING | | | | ○ | | |

FIG. 37

| | | |
|---|---|---|
| ☐ | From: | osamu@kp.co.jp |
| ☐ | To: | midori@swi.co.jp |
| ☒ | Cc: | ski-ciub@swi.co.jp |
| ☐ | Bcc: | |
| ☐ | Date: | 1995.11.17  11:05:00 |
| ☐ | Subject: | TRAINING CAMP |
| ☐ | Importance: | normal |

| | |
|---|---|
| From: | osamu@kp.co.jp |
| To: | midori@swi.co.jp |
| Cc: | ski-ciub@swi.co.jp |
| Bcc: | |
| Date: | 1995.11.17  11:05:00 |
| Subject: | TRAINING CAMP |
| Importance: | normal |

FIG. 36

| | |
|---|---|
| From: | midori@swi.co.jp |
| To: | prj-member@xxx.co.jp |
| Cc: | |
| Bcc: | |
| Date: | 1995.11.1  09:51:00 |
| Subject: | MATERIAL |
| Importance: | normal |

METHOD AND APPARATUS FOR CATALOGING AND DISPLAYING E-MAIL USING A CLASSIFICATION RULE PREPARING MEANS AND PROVIDING CATALOGING A PIECE OF E-MAIL INTO MULTIPLE CATEGORIES OR CLASSIFICATION TYPES BASED ON E-MAIL OBJECT INFORMATION

BACKGROUNDS OF THE INVENTION

1. Field of the Invention

The present invention relates to an electronic mail cataloging and retrieving system which is used to catalog and retrieve many electronic mails exchanged by a wide area network, and particularly to an electronic mail retrieving system which saves time and trouble required for cataloging and retrieving and facilitates the addition and change of electronic mail classifying rules.

2. Description of the Related Art

A conventional electronic mail cataloging and retrieving system of this type which is used for cataloging and retrieving electronic mails catalogues and retrieves lots of electronic mails by utilizing a virtually set mail folder. The mail folder here is univocally given a meaning by a word or word string, and each mail folder has electronic mails conforming to a set meaning in it. Namely, electronic mails are classified by a plurality of mail folders and their meanings. And, when a mail folder is opened, electronic mails kept in it can be seen. On the other hand, when a mail folder is in a closed state, electronic mails kept in the mail folder cannot be seen.

The conventional electronic mail cataloging and retrieving system uses the above mail folders to allow free cataloging and retrieving of electronic mails sent or received by a wide area network according to a user's taste.

FIG. 39 shows one example of the screen shown by a conventional electronic mail cataloging and retrieving system. The conventional electronic mail cataloging and retrieving system will be described with reference to FIG. 39.

As shown in the drawing, a screen 2900 has a mail folder display area 2901 which shows a list of mail folders defined within the electronic mail cataloging and retrieving system and a header information display area 2902 which shows a list of header information on electronic mails. Electronic mails of which the list of header information is shown on the header information screen 2902 are those stored in an open mail folder.

The mail folder display area 2901 shows a mail folder state, namely a folder symbol for showing whether or not the mail folder is open, and a folder name for showing the meaning given to the mail folder. In FIG. 39, the folder symbol corresponding to the folder name indicates that a mail folder having a folder name "Inbox" for example is open.

The header information display area 2902 shows a sending date and time, sender, title and text in part (behind the symbol << in the drawing) extracted from an electronic mail stored in the open mail folder in the form modified to an at-a-glance guide.

When another mail folder other than the open mail folder is to be opened by the electronic mail cataloging and retrieving system, the following operation and process (1) to (3) are performed.
(1) One of the mail folders on which information is shown in the mail folder display area 2901 is selected.

(2) The folder symbol of the mail folder selected by the operation (1) is changed to a "folder symbol indicating its folder is open".
(3) The header information display area 2902 shows the header information on electronic mails stored in the mail folder newly selected by the operation (1) instead of the header information on the electronic mails stored in the mail folder which has been open.

And, to classify a sent or received electronic mail, the pertinent electronic mail temporarily stored in the mail folder displayed is transferred to a desired mail folder to be appropriately classified. When the entered electronic mail is once stored into the appropriate mail folder, it is shown only when the folder in which it is classified is opened.

As described above, the conventional electronic mail cataloging and retrieving system displays in a specified display area a list of header information on the electronic mails stored in the mail folder which is open and attracting attention, and switches to a focused mail folder in order to display a list of header information on the electronic mails stored in another mail folder. Therefore, header in formation on all electronic mails stored in the electronic mail cataloging and retrieving system can not be seen at the same time. When an electronic mail stored in a mail folder different from the mail folder being displayed is wanted to see, the operation of renewing the contents to be displayed in the area for showing a list of header information on electronic mails by switching the focused mail folder is frequently repeated, taking lots of time and labor. Besides, when searching electronic mails based on a meaning which does not correspond to any meaning in the mail folders, search must be done in every folders and that causes the operation of switching folder frequently. Moreover, when reclassifying electronic mails in any mail folders based on a meaning which does not correspond to any meaning in the mail folders, same operation described above is frequently repeated in order to transfer each electronic mail in some folder to other.

And, since header information on electronic mails classified in a mail folder is displayed only when the pertinent mail folder in which they are classified is opened, if a certain electronic mail is erroneously classified into a mail folder, the conventional electronic mail cataloging and retrieving system has a disadvantage that retrieval of this electronic mail involves heavy difficulties.

In addition, the conventional electronic mail cataloging and retrieving system has following disadvantages that it takes lots of time and effort to classify electronic mails, when the conventional electronic mail cataloging and retrieving system receive or send mails, it stores at first all these mails in one particular folder generally called as Inbox. Therefore, in order to appropriately classify the electronic mails as described above, the user has to check each electronic mail to classify according to its content, taking lots of time to classify the electronic mails when there are many sent and received electronic mails. In order to remedy such a disadvantage, there have been proposed a method for automatically classifying electronic mails according to classification rule defined by the user, a method for extracting a keyword by automatically analyzing the content of each mail, a method for automatically studying classification rule and the like. Among such conventional technologies, a technology of automatically classifying electronic mails according to user defined classification rules is disclosed in Japanese Patent Laid-Open Publication (Kokai) Nos. Heisei 6-162085, Heisei 2-170642, and Heisei 4-351134. And, a technology of extracting a keyword and automatically studying a classification rule is disclosed in Japanese Patent Laid-Open Publication (Kokai) No. Showa 63-175965.

But, the above-described electronic mail classifying technologies have the following disadvantages. Specifically, according to the conventional technology for classifying electronic mails according to a classification rule defined by the user, the classification rule is entered by the user through an input device such as a keyboard. Therefore, the user has to study the forms of classification rules in advance. And, as the application range of electronic mails is expanding these years, the number of rules which have to be entered is increasing, and the rules are becoming complex. Besides, since the electronic mail classification standard of each user is frequently changed, the classification rules have to be changed every time the classification standard is changed. Therefore, the conventional method of entering the classification rules through a keyboard needs increased time and trouble to prepare or change the classification rules.

And, since the conventional technology of automatically studying the classification rules in view of the contents of electronic mails requires a dictionary with enormous amounts of words and background knowledge, it is not suitable to be used with a personal computer because its disk capacity and processing speed are limited. And, since large amounts of electronic mails is required to study the classification rules, it is difficult to immediately correspond to the user's classification standard which is changed in a short period.

SUMMARY OF THE INVENTION

A first object of the invention is to provide an electronic mail cataloging and retrieving system by which header information and classified state of all possessed electronic mails can be seen simultaneously and the electronic mails can be cataloged flexibly with less time and labor.

A second object of the invention is to provide an electronic mail cataloging and retrieving system that by a simple operation to show prescribed symbols in one area, the electronic mails corresponding to the symbols can be cataloged.

A third object of the invention is to provide an electronic mail cataloging and retrieving system which links a plurality of symbols to a single electronic mail to enable the classification of electronic mails in multiple viewpoints, so that the electronic mails can be cataloged with higher flexibility.

A fourth object of the invention is to provide an electronic mail cataloging and retrieving system by which the flexibility of cataloging is increased and a hint for retrieving can be increased, so that it is easy to focus on a target electronic mail when retrieving.

A fifth object of the invention is to provide an electronic mail cataloging and retrieving system that allows to freely add information to an electronic mail, so that electronic mails can be cataloged and retrieved in various forms.

A sixth object of the invention is to provide an electronic mail cataloging and retrieving system that allows to retrieve electronic mails according to a retrieving condition entered by a user and to show the retrieved result in the form of a list, so that the electronic mails can be cataloged and retrieved efficiently with less time and labor.

A seventh object of the invention is to provide an electronic mail cataloging and retrieving system that allows to show the retrieval history on the screen together with the header information, electronic mail attribute information and classified state without switching the screen, and the user can refer to the retrieval history, so that the electronic mails can be cataloged and retrieved in more various forms.

An eighth object of the invention is to provide an electronic mail cataloging and retrieving system that has a two-dimensional symbol display area to show the electronic mail symbol corresponding to an electronic mail, and when the user needs a specific electronic mail, the user can readily refer to it by using the electronic mail symbol shown at a specific display position in the two-dimensional symbol display area, so that the electronic mails can be cataloged and retrieved more intuitionally.

A ninth object of the invention is to provide an electronic mail cataloging and retrieving system that allows to easily browse the outline of an electronic mail specified by the header information or the like shown on the screen by a simple operation, so that the electronic mail can be retrieved more efficiently.

A tenth object of the invention is to provide an electronic mail cataloging and retrieving system by that to prepare or modify a classification rule, the user does not need to study a form of the classification rule, and can prepare or modify a desired classification category or classification rule by a simple operation of directly specifying the electronic mail to be classified.

An eleventh object of the invention is to provide an electronic mail cataloging and retrieving system by that when the user requires to classify a plurality of electronic mails into the same category, a classification rule preparing means extracts information which is common to the plurality of electronic mails and automatically prepares a classification rule with information which is common to most electronic mails as the classification condition, so that the user's time and trouble required for processing can be reduced.

According to the first aspect of the invention, a electronic mail cataloging and retrieving system for cataloging and retrieving sent or received electronic mails comprises:

an electronic mail communication means for sending or receiving electronic mails;

a first storage means for storing electronic mails sent or received by said electronic mail communication means;

a second storage means for storing information on classification types used for classification of electronic mails and a format to relate electronic mails according to said classification types;

a third storage means for storing an electronic mail object which has at least path information, electronic mail attribute information, header information and classification information on each of the electronic mails stored in said first storage means;

a header information display means for reading from said third storage means the header information and the electronic mail attribute information among the electronic mail object concerning a prescribed electronic mail and displaying them on a prescribed header information display screen in the form of an at-a-glance guide;

a tray display means for displaying tray information which shows that a prescribed electronic mail is classified into a prescribed classification type on a prescribed tray information display screen by referring to a format which relates an electronic mail with information on the classification types of the electronic mails stored in said second storage means and the classification types and to the classification information of the electronic mail object concerning a prescribed electronic mail stored in said third storage means; and an electronic mail editing means for displaying the content of an electronic mail stored in said first storage means according to a direction by a user and editing the content of the electronic mail as required.

In the preferred construction, the header information display means displays the first list in which a single electronic mail is allocated to a single line onto said header information display screen, and inserts header information and electronic mail attribute information of the electronic mail object related to the electronic mail selected according to a prescribed standard into each column of said first list; and the tray display means allocates a single electronic mail to a single line, relates each line with an electronic mail according to the allocation of the electronic mails in the first list which is shown on said header information display screen by said header information display means, and displays a second list which has all the classification types of the electronic mails as classification items onto said tray information display screen, and inserts a document symbol which indicates that the electronic mail is classified into the classification type into said classification item relevant to a classification category of the electronic mail related to each line of said second list; and the header information display means and said tray display means display said header information display screen and said tray information display screen in display areas disposed in parallel in the same display screen.

In another preferred construction, the header information display means displays a first list in which a single electronic mail is allocated to a single line onto said header information display screen, and inserts header information and electronic mail attribute information of the electronic mail object related to the electronic mail selected according to a prescribed standard into each column of said first list; and the tray display means allocates a single electronic mail to a single line, relates each line with an electronic mail according to the allocation of the electronic mails in the first list which is shown on said header information display screen by said header information display means, and displays a second list which has all the classification types of the electronic mails as classification items onto said tray information display screen, and inserts a document symbol which indicates that the electronic mail is classified into the classification type into said classification item relevant to a classification category of the electronic mail related to each line of said second list; and the electronic mail editing means, according to a direction entered to show an electronic mail by designating a given line on said header information display screen or a given document symbol on said tray information display screen, reads the content of an electronic mail relevant to said designated line or document symbol from said first storage means and shows it on said electronic mail display screen.

In the above-mentioned construction, the electronic mail cataloging and retrieving system further comprises a pointer display means for displaying a pointer at a desired position, and a detailed header information display means which monitors a position of said pointer and displays in a prescribed format detailed header information of an electronic mail specified by the position of said pointer in accordance with a direction to display detailed header information, a board display means which shows an electronic mail symbol for indicating an electronic mail designated by a prescribed means among the electronic mails stored in said first storage means in connection with a desired position on a prescribed symbol display screen, wherein the electronic mail object stored in said third storage means has display position information on electronic mail symbols on the symbol display screen shown by said board display means, the header information display means displays the first list in which a single electronic mail is allocated to a single line onto said header information display screen, and inserts header information and electronic mail attribute information of the electronic mail object related to the electronic mail selected according to a prescribed standard into each column of said first list; and the tray display means allocates a single electronic mail to a single line, relates each line with an electronic mail according to the allocation of the electronic mails in the first list which is shown on said header information display screen by said header information display means, and displays a second list which has all the classification types of the electronic mails as classification items onto said tray information display screen, and inserts a document symbol which indicates that the electronic mail is classified into the classification type into said classification item relevant to a classification category of the electronic mail related to each line of said second list; and the detailed header information display means, in accordance with a direction to display said detailed header information entered when said pointer is positioned on a given line on said header information display screen, on a given document symbol on said tray information display screen or on a given electronic mail symbol on said symbol display screen, reads from said third storage means an electronic mail object of an electronic mail relevant to said line, document symbol or electronic mail symbol where said pointer is positioned and displays it near said pointer.

In the preferred construction, the electronic mail cataloging and retrieving system further comprises an electronic mail condition retrieval means for retrieving electronic mails stored in said first storage means based on a given retrieval condition separately entered, wherein the second storage means stores said retrieval condition as one of the classification types of an electronic mail, the third storage means stores the retrieved result on each electronic mail by said electronic mail condition retrieval means as classification information contained in the electronic mail object corresponding to each electronic mail, and the tray information display means additionally shows a classification item corresponding to said retrieval condition onto said tray information display screen based on a classification type corresponding to said retrieval condition stored in said second storage means and classification information corresponding to said retrieved result stored in said third storage means.

In another preferred construction, the electronic mail cataloging and retrieving system further comprises a board display means which shows an electronic mail symbol for indicating an electronic mail designated by a prescribed means among the electronic mails stored in said first storage means in connection with a desired position on a prescribed symbol display screen, wherein the electronic mail object stored in said third storage means has display position information on electronic mail symbols on the symbol display screen shown by said board display means, The header information display means, said tray display means and said board display means show said header information display screen, said tray information display screen and said symbol display screen in a display area formed in the same display screen, the header information display means displays the first list in which a single electronic mail is allocated to a single line onto said header information display screen, and inserts header information and electronic mail attribute information of the electronic mail object related to the electronic mail selected according to a prescribed standard into each column of said first list; and the tray display means allocates a single electronic mail to a single line, relates each line with an electronic mail according to the allocation of the electronic mails in the first list which is shown on said header information display screen by said header information display means, and displays a second list which has all the classification types of the electronic mails as classification items onto said tray information display screen, and inserts a document symbol which indicates that the electronic mail is classified into the classification type into said classification item relevant to a classification category of the electronic mail related to each line of said second list; and the electronic mail editing means, according to a direction entered to show an electronic mail by designating a given line on said header information display screen, a given document symbol on said tray information display screen, or a given electronic mail symbol on said symbol display screen, reads the content of an electronic mail relevant to said designated line, document symbol or electronic mail symbol from said first storage means and shows it on said electronic mail display screen.

According to the second aspect of the invention, an electronic mail cataloging and retrieving system for cataloging and retrieving sent or received electronic mails comprises an electronic mail communication means for sending or receiving electronic mails;

a first storage means for storing electronic mails sent or received by said electronic mail communication means;

a second storage means for storing a format to relate information on classification types used for classification of electronic mails with electronic mails according to said classification types;

a third storage means which with respect to each of the electronic mails stored in said first storage means, stores an electronic mail object having at least path information, electronic mail attribute information, header information, classification information, and given additional information on a related electronic mail;

a header information display means for reading from said third storage means the header information and the electronic mail attribute information among the electronic mail object concerning a prescribed electronic mail and displaying on a prescribed header information display screen in the form of an at-a-glance guide;

a tray display means for displaying tray information which shows that a prescribed electronic mail is classified into a prescribed classification type on a prescribed tray information display screen by referring to a format which relates an electronic mail with information on the classification types of the electronic mails stored in said second storage means and the classification types and to the classification information of the electronic mail object concerning a prescribed electronic mail stored in said third storage means;

an additional information display means for showing a memo symbol indicating that said additional information is added to said electronic mail which includes said additional information in said electronic mail object in correspondence with said first list displayed by said header information display means; and an electronic mail editing means for displaying the content of an electronic mail stored in said first storage means according to a direction by a user and editing the content of the electronic mail as required.

In the preferred construction, the additional information display means, among the lines in said first list shown by said header information display means, shows said memo symbol at a prescribed position on a line corresponding to an electronic mail containing said additional information in said electronic mail object, and, according to a direction entered to show said additional information by designating a given memo symbol, reads said additional information in said electronic mail object corresponding to said designated memo symbol from said third storage means and shows it on a prescribed additional information display screen.

According to the third aspect of the invention, an electronic mail cataloging and retrieving system for cataloging or retrieving sent or received electronic mails comprises an electronic mail communication means for sending or receiving electronic mails;

a first storage means for storing electronic mails sent or received by said electronic mail communication means;

a fourth storage means which stores classification rules used for classification of electronic mails;

an electronic mail classification means which determines classification categories of electronic mails by using the classification rules stored in said fourth storage means and stores in said first storage means by incorporating said classified result;

a classified result display means for displaying the classified result by said electronic mail classification means, and;

a classification rule preparing means which extracts required information from the mail data of an electronic mail according to a classification example entered by a user and prepares a classification rule by an interactive procedure.

In the preferred construction, the classification rules stored in said fourth storage means are rules to relate a pattern of an electronic mail with a category in which an electronic mail having said pattern has to be classified or a category in which the electronic mail having said pattern must not be classified, the classification rule preparing means shows prescribed information for forming a pattern of said electronic mail based on a predetermined standard, prepares a prescribed electronic mail pattern based on information specified by a user among said shown information, prepares a category in which an electronic mail having said pattern has to be classified, and relates said prepared electronic mail pattern to said prepared category.

In another preferred construction, the classification rules stored in said fourth storage means are rules to relate a pattern of an electronic mail with a category in which an electronic mail having said pattern has to be classified or a category in which the electronic mail having said pattern must not be classified, the classification rule preparing means receives a request for changing the classification of an electronic mail, when the classification change request requires to prepare a new category and to classify said electronic mail into the prepared category, shows prescribed information for forming a pattern of said electronic mail based on a predetermined standard, prepares a prescribed electronic mail pattern based on information specified by a user among the shown information, prepares a category in which an electronic mail having said pattern has to be classified, and prepares a rule to relate said prepared electronic mail pattern to said prepared category, when the classification change request requires to specify the existing category to newly classify said electronic mail into said category, prepares a rule to relate said designated category as a category in which classification must be made to said electronic mail pattern, and when the classification change request requires to delete a prescribed category among the categories in which said electronic mail is classified by the existing classification rule, prepares a rule to relate said category to be deleted as a category in which classification must not be made to said electronic mail pattern.

In another preferred construction, the electronic mail classification means reads an electronic mail classified and stored in said first storage means as required and redetermines a classification category based on the classification rule stored in said fourth storage means.

Also, the electronic mail classification means, upon receiving a request for changing the classification rule made by specifying a plurality of electronic mails, prepares a set of classification rules to meet the relevant relation with said plurality of electronic mails.

Also, the electronic mail classification means, upon receiving a request for changing the classification rule made by specifying a plurality of electronic mails, when a classification rule meeting the relevant relation with all the electronic mails is available, determines said classification rule as a classification rule for said plurality of electronic mails, when a classification rule meeting the relevant relation with all the electronic mails is not available, extracts a classification rule which meets the relevant relation with most electronic mails and extracts a classification rule which meets the relevant relation with each electronic mail which is not pertinent to the extracted classification rule, and prepares a classification rule set including all the extracted classification rules.

Other objects, features and effects of the present invention will be apparent from the following description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 32 is one example of the screen showing the classified result.

FIG. 35 is a diagram showing a first specific example of mail data.

FIG. 36 is a diagram showing a second specific example of mail data.

FIG. 37 is a diagram showing one example of the list of data extracted by a classification rule preparing means.

DESCRIPTION OF THE PREFERRED EMBODIMENTS

Figure 1:
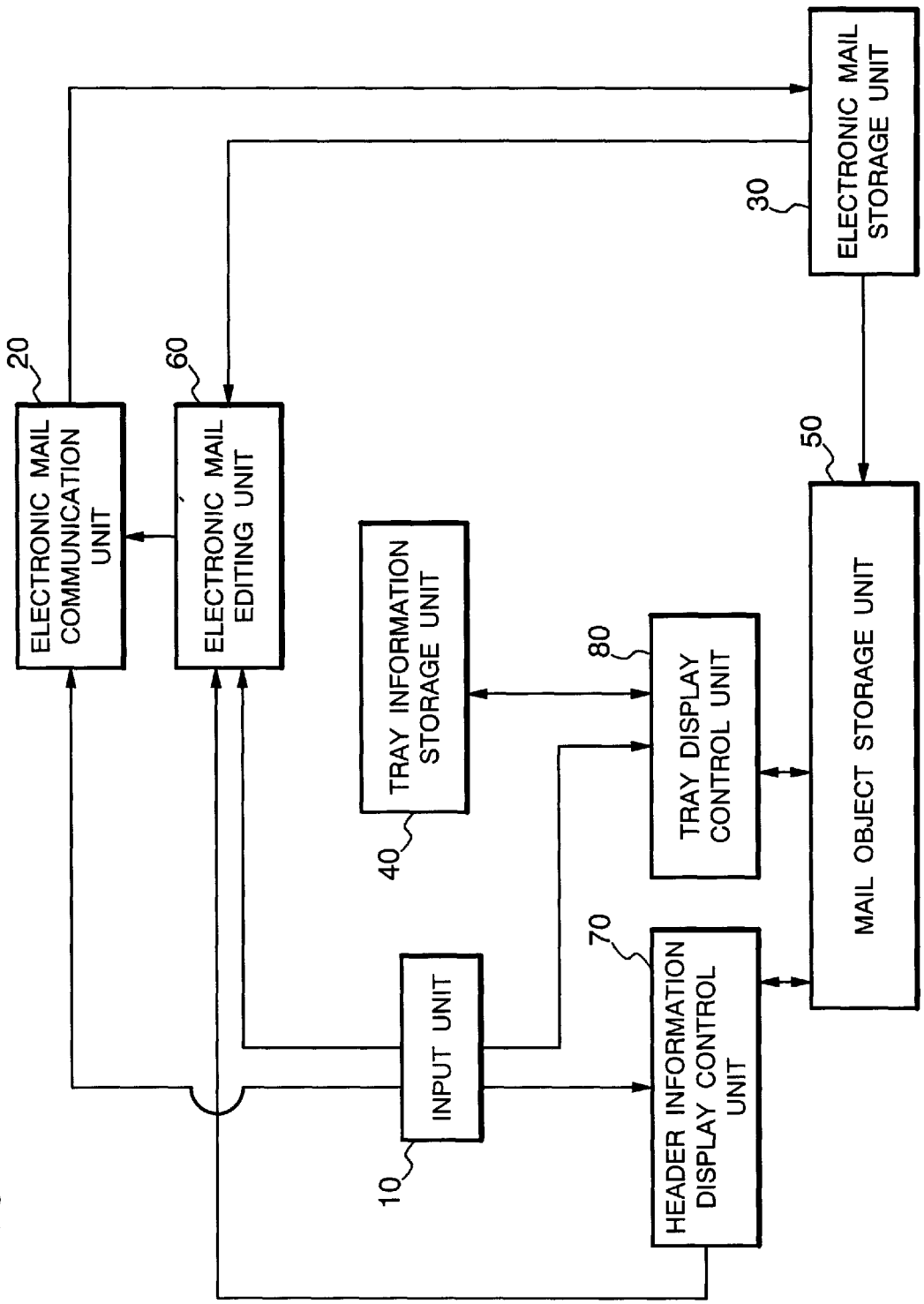
FIG. 1 is a block diagram showing a structure of the electronic mail cataloging and retrieving system according to Embodiment 1.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.
Embodiment 1:

FIG. 1 is a block diagram showing a structure of the electronic mail cataloging and retrieving system according to Embodiment 1 of the invention.

The electronic mail cataloging and retrieving system of Embodiment 1 comprises an input unit 10, an electronic mail communication unit 20, an electronic mail storage unit 30, a tray information storage unit 40, a mail object storage unit 50, an electronic mail editing unit 60, a header information display control unit 70, and a tray display control unit 80. FIG. 1 shows only a characteristic structure of this embodiment and omits other general structures. In practical use, a display unit for showing electronic mails and various information, and a printer for printing an electronic mail as required are naturally provided.

The input unit 10 is a keyboard, a pointing device such as a mouse or the like, and used to enter commands or data such as characters and positions for preparing an electronic mail, selecting or designating a line or a symbol or the like. And, it is also used to enter information showing a type of processing in order to command a process to be executed.

The electronic mail communication unit 20 is an interface for connecting the electronic mail cataloging and retrieving system and a wide area network, and sends or receives an electronic mail between the electronic mail cataloging and retrieving system and the wide area network.

The electronic mail storage unit 30 is an internal storage device such as a RAM or an external storage device such as a magnetic disk device, and stores an electronic mail sent or received through the electronic mail communication unit 20.

The tray information storage unit 40 is an internal storage device such as a RAM or an external storage device such as a magnetic disk device, and stores tray information showing the names of classification categories (classification types) for classifying electronic mails stored in the electronic mail storage unit 30 and the order of showing the classification categories as a tray.

The mail object storage unit 50 comprises a program-controlled CPU and an internal storage device such as a RAM or an external storage device such as a magnetic disk device, and when an electronic mail is stored in the electronic mail storage unit 30, prepares and stores a mail object 500 corresponding to the electronic mail. And, when information contained in the mail object 500 is instructed to be renewed by a command or the like entered from the input unit 10 through the header information display control unit 70 and the tray display control unit 80, the information of the pertinent mail object 500 is renewed by the mail object storage unit 50.

The electronic mail editing unit 60 is a program-controlled CPU and reads a desired electronic mail from the electronic mail storage unit 30 to show on a display device not shown and edits the electronic mail. Specifically, when it is instructed to show the content of an electronic mail corresponding to a line shown on the screen of the display device by a command or the like entered from the input unit 10 through the header information display control unit 70, the desired electronic mail is looked for and read from the electronic mail storage unit 30 based on path information contained in the mail object 500 corresponding to the instructed line, and shows the contents of the pertinent electronic mail on the screen of the display device. And, the electronic mail is edited based on the input of data or the like from the input unit 10.

The header information display control unit 70 is a program-controlled CPU or the like, reads header information and mail attribute information of the mail object 500 stored in the mail object storage unit 50, conducts shaping in order to show in a style of allocating one mail object to one line on the screen of the display device, and displays at a prescribed position on the screen of the display device.

The tray display control unit 80 is a program-controlled CPU or the like, displays one of classification types stored in the tray information storage unit 40 as a tray in a line in the vertical direction on the screen of the display device, conducts shaping to arrange such a line in multiple numbers in the horizontal direction in order to show in a style so that a plurality of classification categories can be seen simultaneously, and displays at a prescribed position on the screen of the display device. And, with reference to classification information contained in the mail object 500 shown on the screen, a document symbol is shown for the pertinent tray on the screen.

Figure 2:
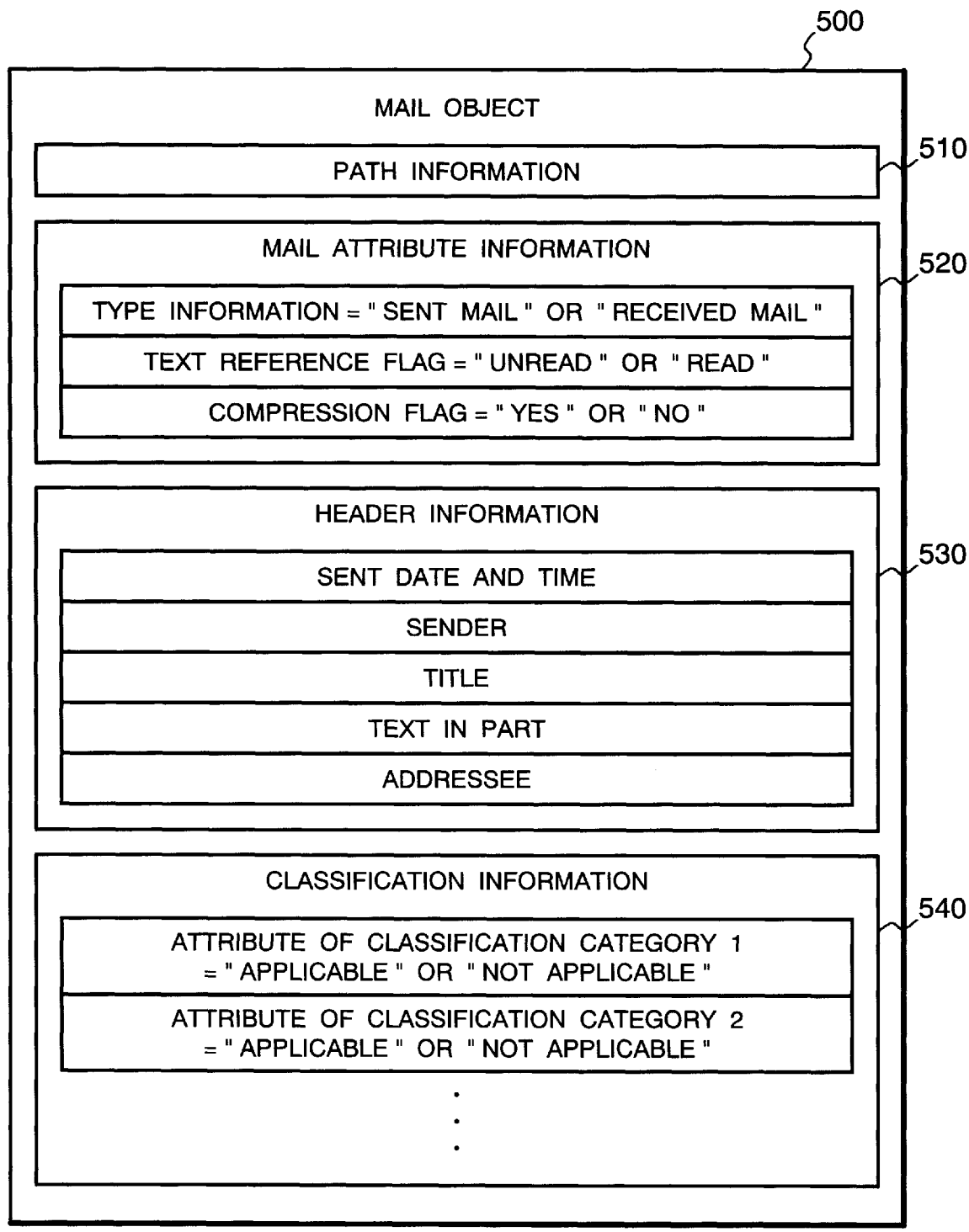
FIG. 2 is a diagram showing a structure of the mail object of an electronic mail processed in Embodiment 1.

FIG. 2 is a diagram showing the structure of the mail object 500 corresponding to the electronic mail processed in the electronic mail cataloging and retrieving system of Embodiment 1.

As seen in the drawing, the mail object 500 has path information 510 which shows a storage location of electronic mails corresponding to the mail object 500 in the electronic mail storage unit 30, mail attribute information 520 which shows an attribute of the electronic mail, header information 530 which has the sent date and time or received date and time, sender, title, text in part (the first part of the text) and addressee extracted from the electronic mail, and classification information 540 comprising information on an attribute value (attribute value showing a binary of "Applicable" and "Not applicable") which the electronic mail attain with respect to each classification category stored in the tray information storage unit 40. The mail attribute information 520 has type information ("Sent mail" or "Received mail") showing a type of the electronic mail, a text reference flag ("Unread" or "Read") showing whether or not the electronic mail has been referred to by the electronic mail editing unit 60, and a compression flag ("Yes (compressed)" or "No (not compressed)") showing whether or not the electronic mail is compressed and stored in the electronic mail storage unit 30.

In this embodiment, the mail object 500 configured as described above is stored separate from the electronic mails in the mail object storage unit 50 and used. Thus, all the electronic mails stored in the electronic mail cataloging and retrieving system of this embodiment can be controlled efficiently and readily.

Figure 3:
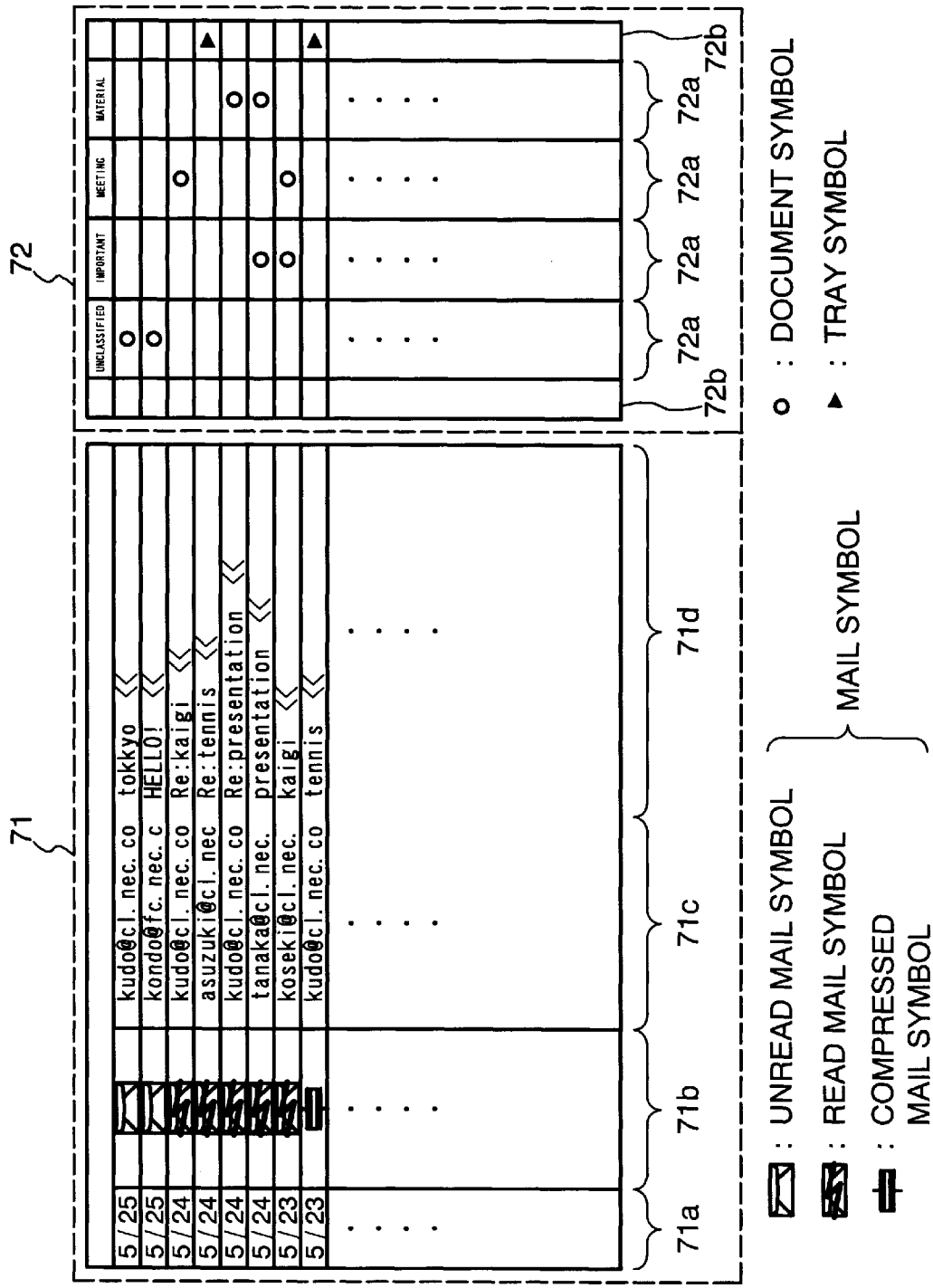
FIG. 3 is a diagram showing one example of the screen shown by Embodiment 1.

FIG. 3 is a diagram showing one example of the screen shown on the display device or the like of the electronic mail cataloging and retrieving system of Embodiment 1. It shows a screen of information on the electronic mails received.

As seen in the drawing, this screen shows a header information display area 71 and a tray display area 72. The header information display area 71 has a date and time display part 71a for showing the sent date and time of a received electronic mail, a mail attribute display part 71b for showing the attribute of an electronic mail, a sender display part 71c for showing the sender of an electronic mail, and a content display part 71d for showing a part of the content of an electronic mail. The content display part 71d shows the title of an electronic mail and the first part (behind the symbol << in the drawing) of the text of the electronic mail. And, when the screen is a screen for showing information on the sent electronic mails, the addressee is shown instead of the sender. The tray display area 72 comprises tray display parts 72a for showing trays of classification types of electronic mails, and tray symbol display parts 72b for showing tray symbols to indicate that there are another tray not shown on the screen.

Figure 13:
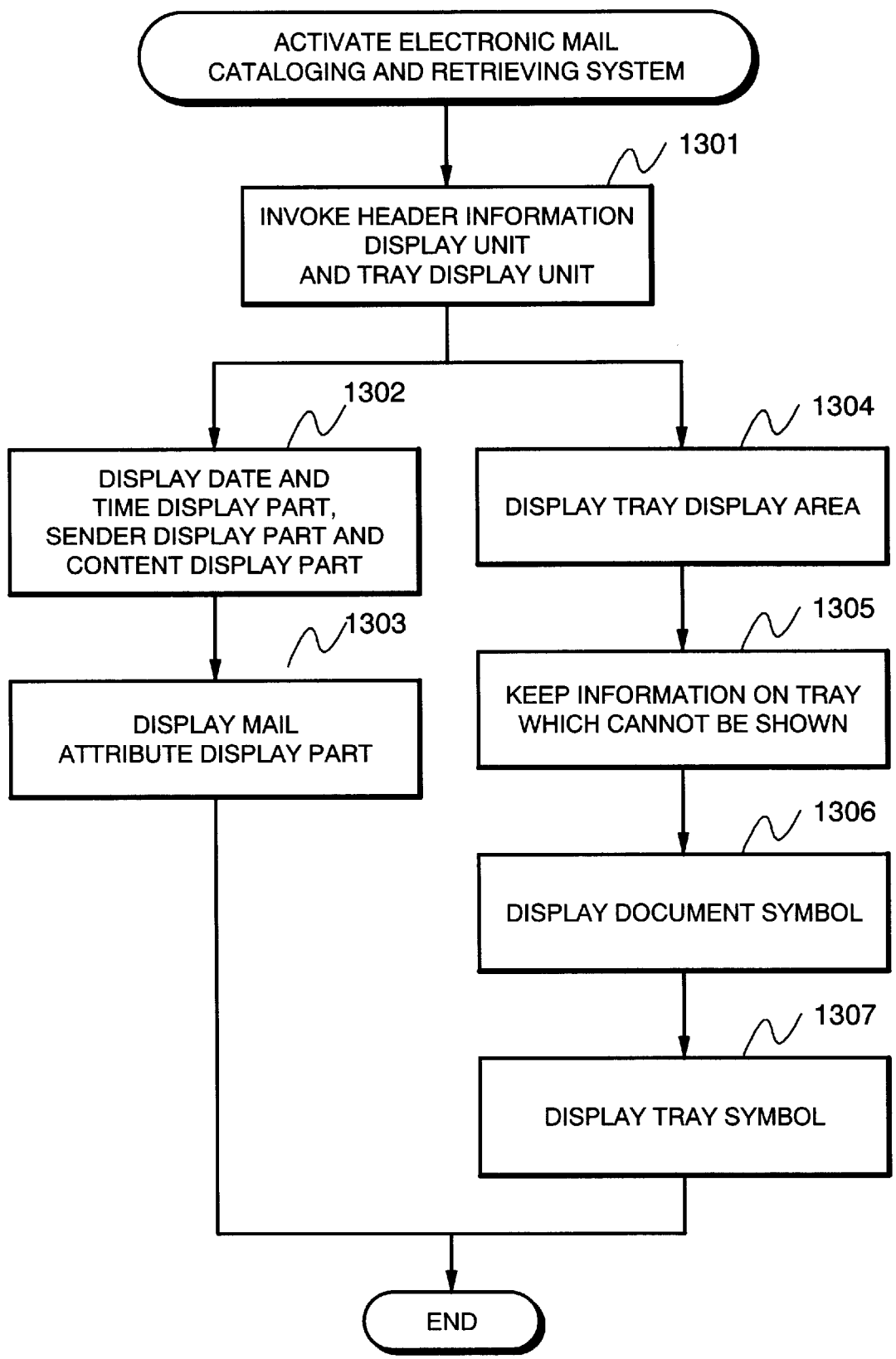
FIG. 13 is a flowchart showing a displaying process at the time of activation in Embodiment 1.
Figure 14:
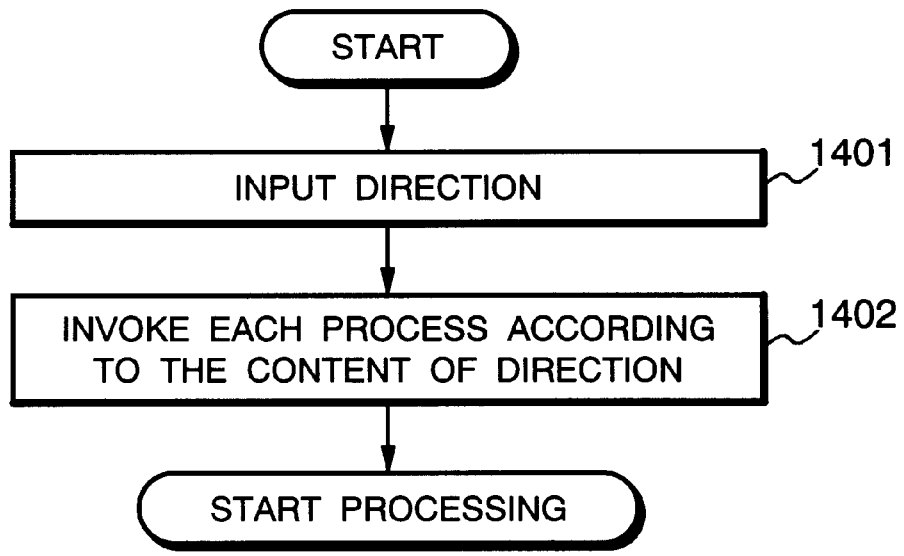
FIG. 14 is a flowchart showing a process at the execution of a direction in Embodiment 1, showing the operation to invoke a process relevant to the direction.

Now, the operation of this embodiment will be described. FIG. 13 is a flowchart showing a displaying process to the display device at the time of activation in this embodiment. FIG. 14 through FIG. 20 are flowcharts showing processes at the time of executing directions in this embodiment.

Referring to FIG. 13, the operation of displaying a screen on the display device when the electronic mail cataloging and retrieving system is activated will be described. In this embodiment, it is assumed that the information on the received mails shown in FIG. 3 is displayed when activated.

When the electronic mail cataloging and retrieving system of this embodiment is activated by the user, the header information display control unit 70 and the tray display control unit 80 are invoked (step 1301).

The header information display control unit 70, which is called in step 1301, refers to the mail object 500 stored in the mail object storage unit 50, allocates one line on the screen to one mail object 500, inserts each piece of information read from the header information 530 contained in each mail object 500 into the corresponding line as shown by the following (1) to (3), and shows in the header information display area 71 on the screen (step 1302).

(1) Information on the sent date and time read from the header information 530 is shown in the date and time display part 71a.

(2) Information on the addressee read from the header information 530 is shown in the sender display part 71c.

(3) Information on the title and information on the text in part read from the header information 530 are shown in the content display part 71d.

Besides, the header information display control unit 70 refers to the mail attribute information 520 of each mail object 500, and displays mail symbols in the mail attribute display part 71b based on the attribute values stored in the text reference flag and the compression flag of the mail attribute information 520 (step 1303). As the mail symbols, an unread mail symbol indicating an unread electronic mail, a read mail symbol indicating a read electronic mail, and a compressed mail symbol indicating that the electronic mail is compressed can be set for example.

On the other hand, the tray display control unit 80, when invoked in step 1301, displays as indicated by the following (1) to (4).

(1) Tray information stored in the tray information storage unit 40 is referred to, the classification type is shown in the each tray display part 72a, and it is arranged in multiple numbers so that a plurality of classification categories can be seen simultaneously and shown in the tray display area 72 on the screen (step 1304).

(2) Information on any tray which cannot be shown in the tray display area 72 on the screen is kept (step 1305) and displayed as required according to a command entered through the input unit 10. Specifically, it is prepared to change the tray display part 72a of the tray display area 72.

(3) The classification information 540 of each mail object 500 corresponding to each line shown on the screen is referred to, and the document symbol is shown at a location corresponding to the classification category which has an attribute value "Applicable" indicating that the electronic mail is applicable to the classification (step 1306).

(4) As to the mail object 500 which has an attribute value "Applicable" at the classification category corresponding to any tray which cannot be shown on the screen, the tray symbol (see FIG. 3) is shown in the tray symbol display part 72b of a line corresponding to the mail object 500 (step 1307). Thus, it is indicated to the user that the mail object 500 is classified for the trays excluded from the screen.

Now, referring to FIG. 14 through FIG. 20, the operation in the process according to each instruction when the user gives various types of directions with respect to the shown screen through the input unit 10 will be described.

When the user enters a direction to perform a desired process through the input unit 10 (step 1401), a necessary process is activated based on the content of the entered direction (step 1402). The contents of the processes will be described with reference to the drawing for each process.

Figure 15:
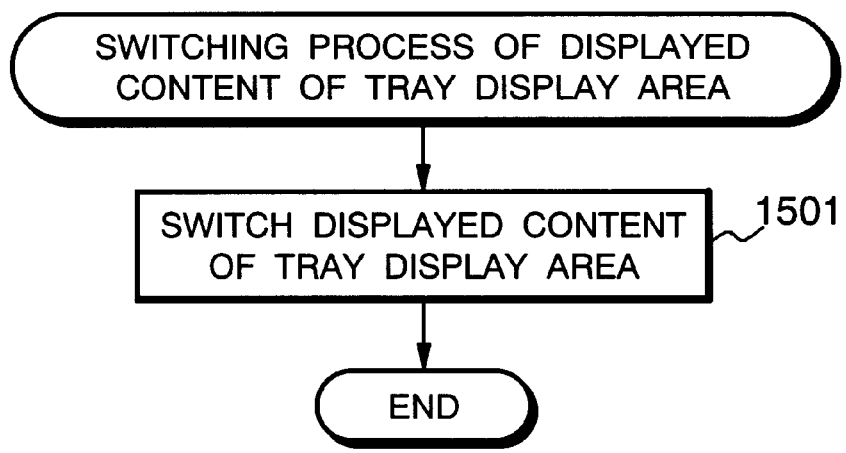
FIG. 15 is a flowchart showing a process at the execution of a direction in Embodiment 1, showing the operation when a tray symbol is selected.

(1) The tray symbol is selected to refer to a tray not shown on the screen (see FIG. 15).

In this case, the tray display control unit 80 switches over the displayed contents of the tray display area 72 to show information on the trays of which lines showing a selected symbol are not shown (step 1501).

Figure 16:
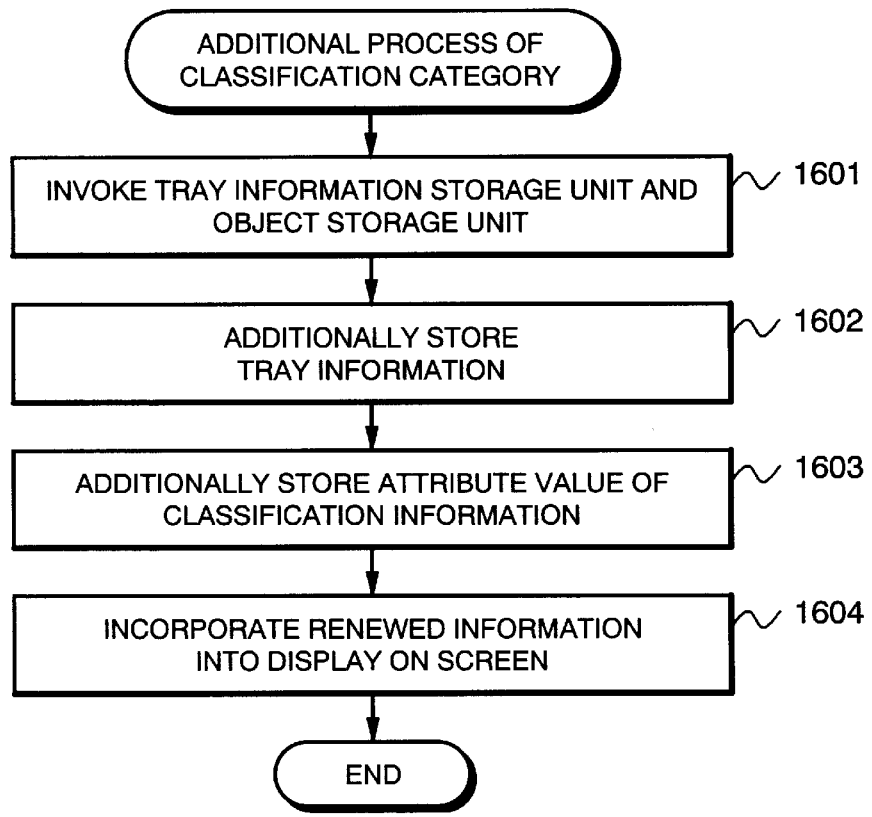
FIG. 16 is a flowchart showing a process at the execution of a direction in Embodiment 1, showing the operation when a direction to add a classification category is given.

(2) A direction to add a classification category is given (see FIG. 16).

In this case, the tray display control unit 80 invokes the tray information storage unit 40 and the mail object storage unit 50 (step 1601). The tray information storage unit 40 adds and stores tray information corresponding to the classification category instructed to be added, and renews the stored contents (step 1602). And, the mail object storage unit 50 adds an attribute value "Not applicable" to the added tray and stores it in the classification information 540 of the each stored mail object 500 to renew the stored contents (step 1603).

Then, the tray display control unit 80 refers to the information renewed as described above and stored in the tray information storage unit 40 and the mail object storage unit 50 and incorporates the renewed result into the content displayed on the screen (step 1604).

Figure 17:
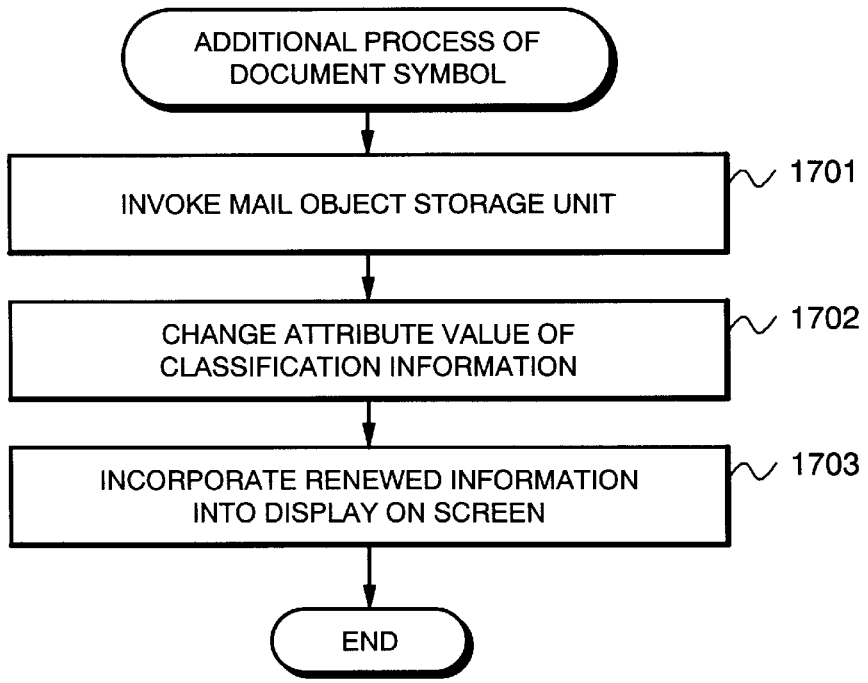
FIG. 17 is a flowchart showing a process at the execution of a direction in Embodiment 1, showing the operation when a direction to add a document symbol is given.

(3) Direction to add the document symbol to a specified line in the tray display part 72a shown on the screen (see FIG. 17).

In this case, the tray display control unit 80 invokes the mail object storage unit 50 (step 1701). The invoked mail object storage unit 50 detects the classification information 540 of the mail object 500 corresponding to the instructed line, and changes the attribute of the classification category corresponding to the instructed tray contained in the classification information 540 to an attribute value "Applicable" (step 1702). Then, the tray display control unit 80 refers to information renewed in the mail object storage unit 50, and incorporates the renewed result into the content displayed on the screen (step 1703).

Figure 18:
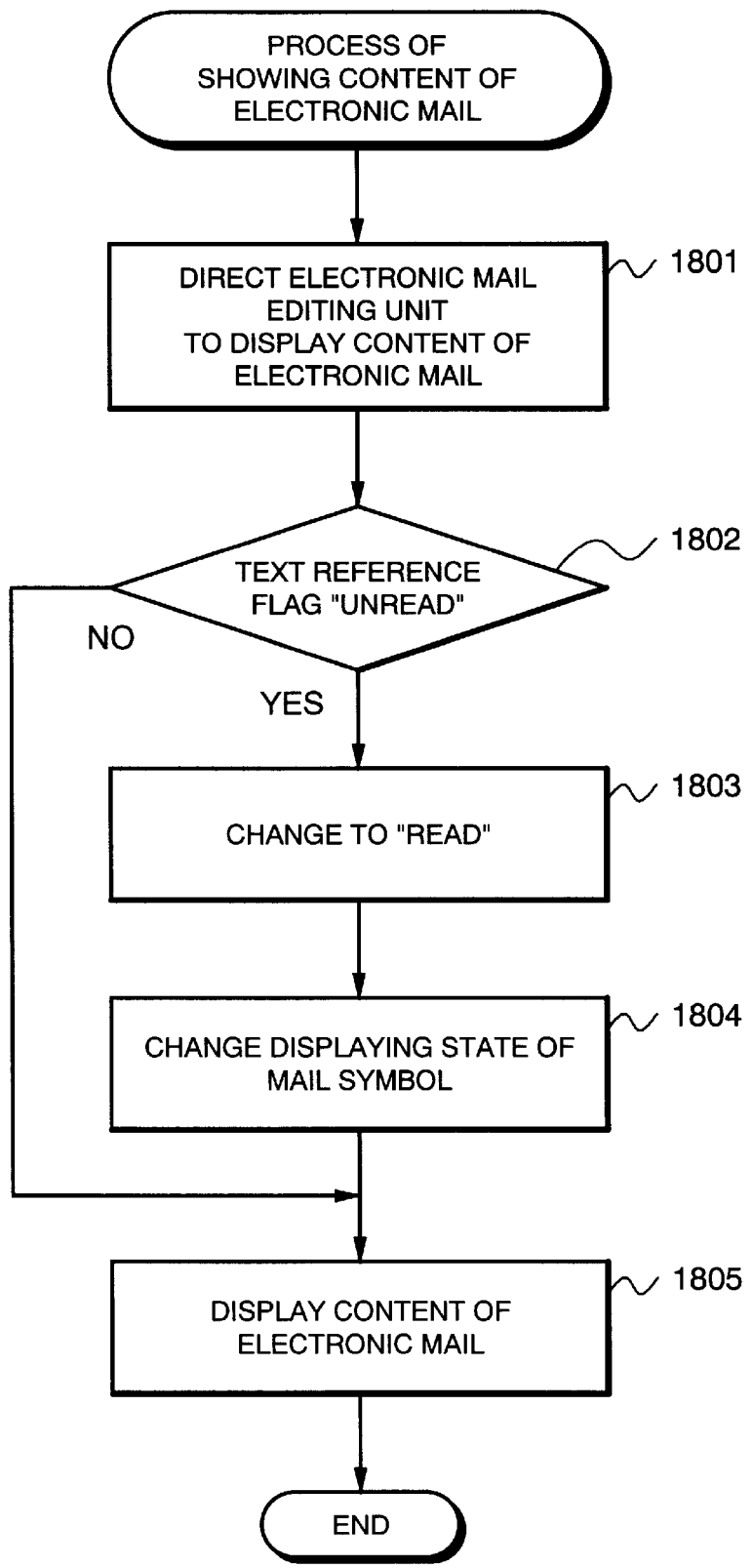
FIG. 18 is a flowchart showing a process at the execution of a direction in Embodiment 1, showing the operation when a direction to show the content of an electronic mail is given.

(4) One or multiple lines on the screen are selected and a direction is given to show the content of the electronic mail corresponding to the mail object 500 allocated to the selected line or lines (see FIG. 18).

In this case, the header information display control unit 70 refers to the path information 510 of the mail object 500 allocated to the selected line or lines, and sends the path information 510 and a direction to show the content of an electronic mail (stored in a location directed by the path information 510) to the electronic mail editing unit 60 (step 1801). Then, the header information display control unit 70 refers to the text reference flag contained in the mail attribute information 520 of the same mail object 500 to judge whether or not its attribute value is "Unread" (step 1802).

When it is judged in step 1802 that the attribute value of the text reference flag is "Unread", the header information display control unit 70 gives a direction to the mail object storage unit 50 to change its attribute value to "Read" (step 1803). The mail object storage unit 50 changes its attribute value according to the direction. Besides, the header information display control unit 70 also refers to other attribute information contained in the mail attribute information 520 of the same mail object 500 to change the displaying state of the mail symbol shown in the mail attribute display part 71b within the header information display area 71 on the screen (step 1804).

When it is judged in step 1802 that the attribute value of the text reference flag is "Read" and the displaying state of the mail symbol shown in the mail attribute display part 71b is changed in step 1804, the electronic mail editing unit 60 uses the received path information 510 to find a desired electronic mail in the electronic mail storage unit 30 and displays its content on the screen (step 1805).

Figure 19:
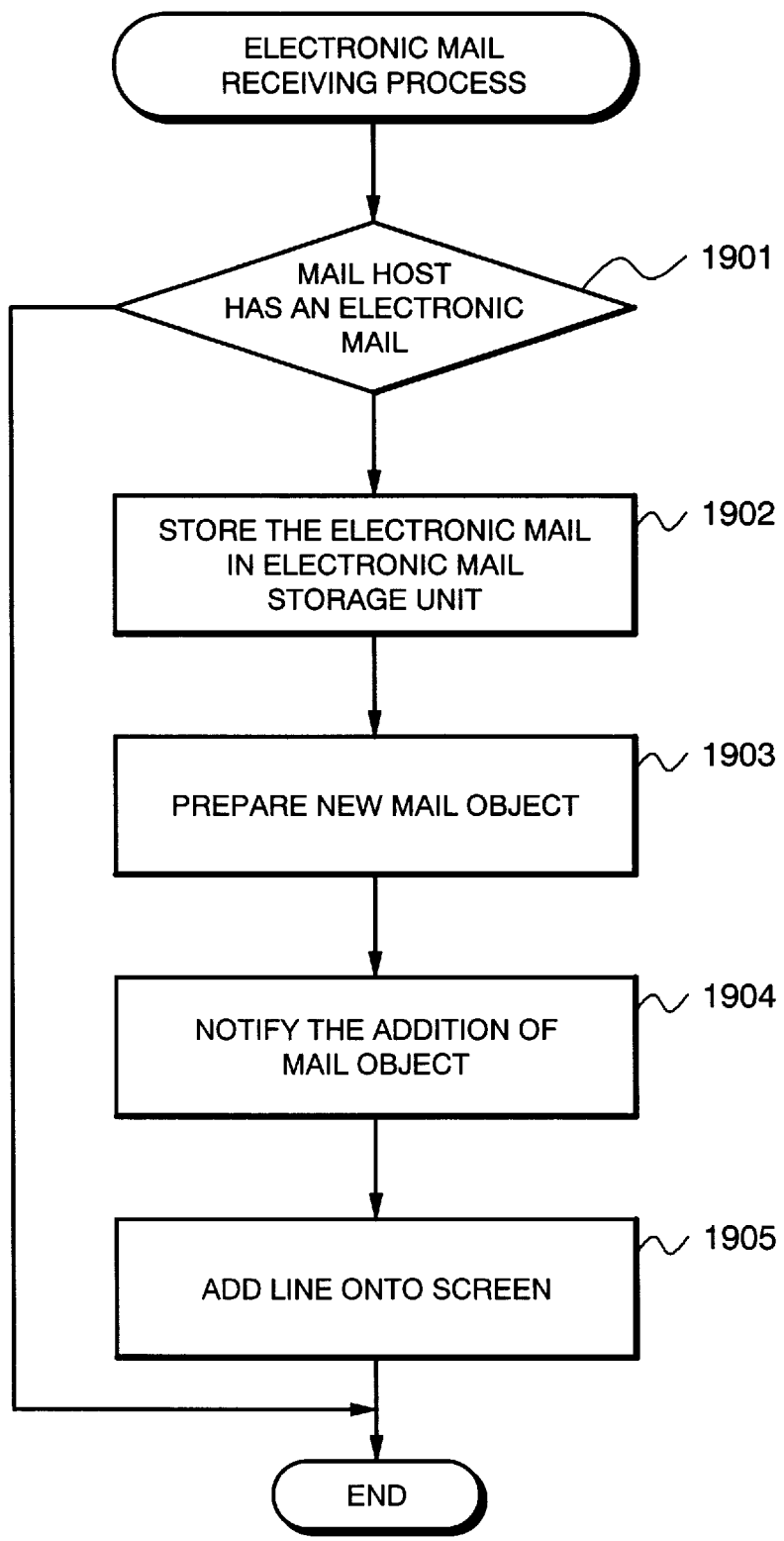
FIG. 19 is a flowchart showing a process at the execution of a direction in Embodiment 1, showing the operation when a direction to receive an electronic mail is given.

(5) A direction is given to receive an electronic mail (see FIG. 19).

In this case, the electronic mail communication unit 20 contacts the mail host connected to a wide area network to ask whether or not there is an electronic mail addressed to the pertinent user (step 1901).

If there is an answer "There is an electronic mail addressed to the pertinent user", the electronic mail communication unit 20 loads the electronic mail from the mail host and stores into the electronic mail storage unit 30 (step 1902). If not, the process is terminated.

The electronic mail storage unit 30, which has stored the electronic mail loaded from the mail host, gives information on its stored location and information on the storing of a new electronic mail to the mail object storage unit 50. Upon receiving the above notice, the mail object storage unit 50 refers to the electronic mail newly stored in the electronic mail storage unit 30 and prepares a new mail object 500 which corresponds to the pertinent electronic mail (step 1903).

Then, the mail object storage unit 50 informs the change (addition) to the content of the mail object 500 to the header information display control unit 70 and the tray display control unit 80 (step 1904). Upon receiving the notice from the mail object storage unit 50, the header information display control unit 70 and the tray display control unit 80 add a line corresponding to the mail object 500 newly stored in the mail object storage unit 50 to the screen (step 1905).

Figure 20:
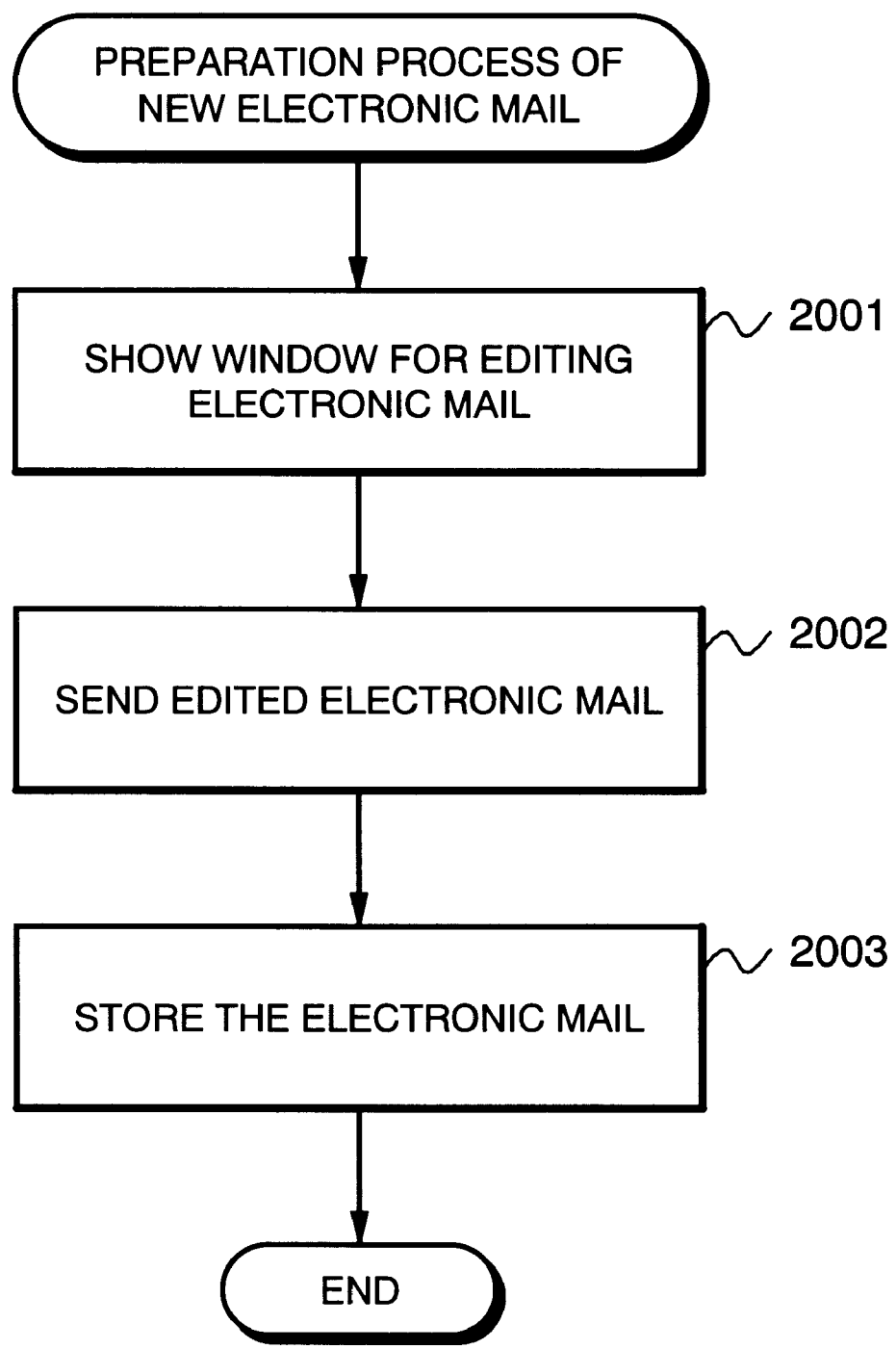
FIG. 20 is a flowchart showing a process at the execution of a direction in Embodiment 1, showing the operation when a direction to prepare a new electronic mail is given.

(6) To send an electronic mail, the electronic mail editing unit 60 is directed to prepare a new electronic mail (see FIG. 20).

In this case, the electronic mail editing unit 60 shows a new window for editing the content of the electronic mail on the screen (step 2001). The user uses the window to edit the content of the electronic mail by entering through the input unit 10. To send the edited electronic mail, the electronic mail communication unit 20 is directed to send the electronic mail by entering through the input unit 10. The directed electronic mail communication unit 20 sends the edited electronic mail (step 2002), and stores a copy of the sent electronic mail into the electronic mail storage unit 30 (step 2003).

By the electronic mail cataloging and retrieving system according to Embodiment 1, the following effects (1) to (4) are obtained by the above operation.

(1) Header information and mail attribute information on all the electronic mails stored in the electronic mail cataloging and retrieving system of this embodiment and the classified conditions of the respective electronic mails can be seen on the screen simultaneously.

(2) To classify and catalogue the sent or received electronic mails, the operation to catalogue the electronic mails is simplified because it is sufficient by directing to show the document symbols on trays where the mails are wanted to be classified.

(3) The electronic mails ca n be classified in multiple viewpoints and the flexibility of cataloging is increased because the direction c an be given to a plurality of trays to show the document symbols with respect to a single electronic mail (one line on the screen).

(4) Since the flexibility of cataloging is increased as described above, a hint for retrieving can be increased, and it is easy to focus on a target electronic mail when retrieving.

Figure 4:
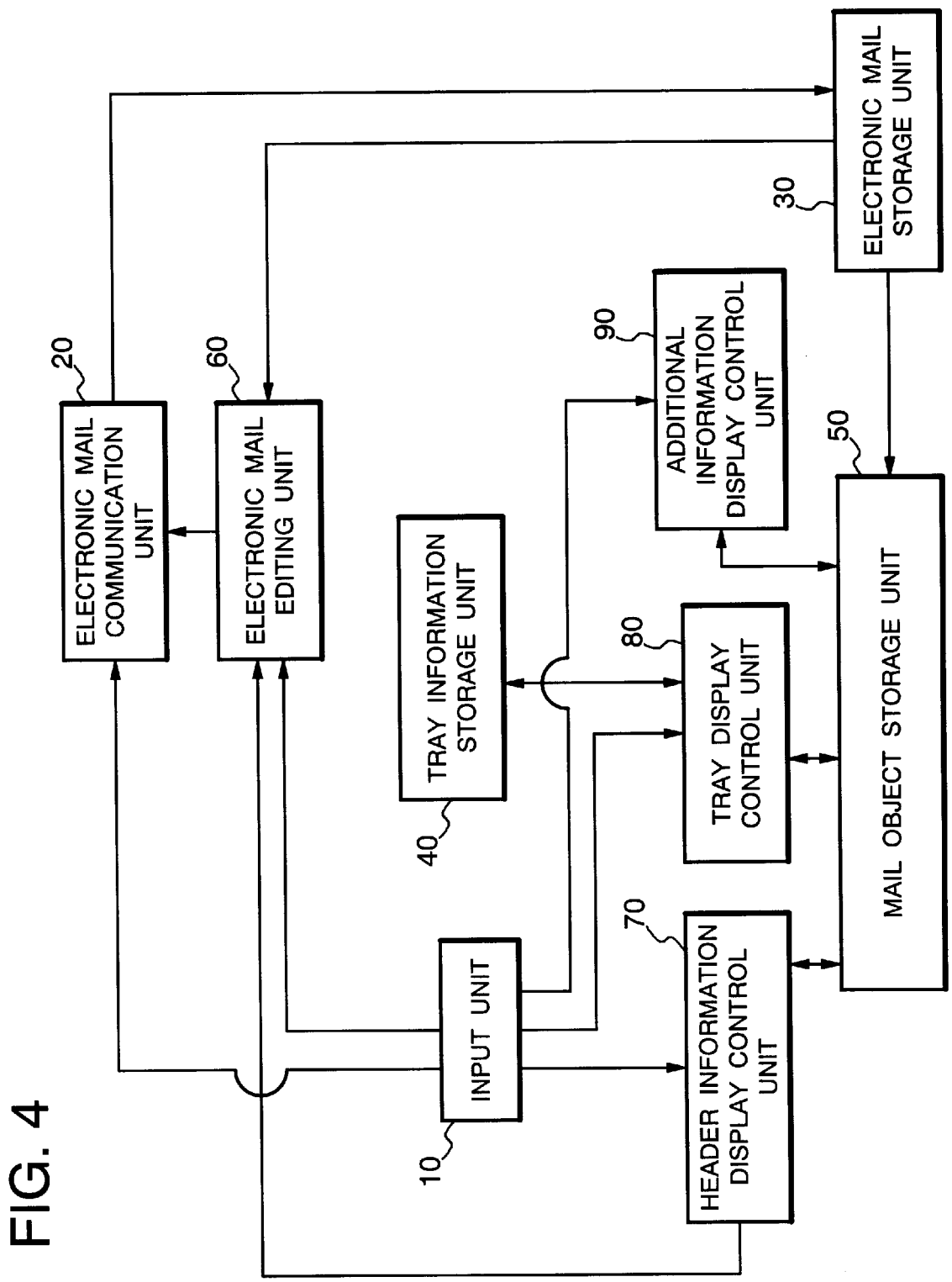
FIG. 4 is a block diagram showing a structure of the electronic mail cataloging and retrieving system according to Embodiment 2 of the invention.

Embodiment 2:

FIG. 4 is a block diagram showing a structure of the electronic mail cataloging and retrieving system according to Embodiment 2 of the invention.

The electronic mail cataloging and retrieving system of Embodiment 2 comprises an input unit 10, an electronic mail communication unit 20, an electronic mail storage unit 30, a tray information storage unit 40, a mail object storage unit 50, an electronic mail editing unit 60, a header information display control unit 70, a tray display control unit 80, and an additional information display control unit 90. FIG. 4 shows only a characteristic structure of this embodiment and omits other general structures. In the above configuration, descriptions on the input unit 10, the electronic mail communication unit 20, the electronic mail storage unit 30, the tray information storage unit 40, the mail object storage unit 50, the electronic mail editing unit 60, the header information display control unit 70, and the tray display control unit 80 are omitted because they have the same configurations and reference numerals as those described in connection with Embodiment 1 shown in FIG. 1.

The additional information display control unit 90 is a program-controlled CPU or the like, and displays additional information to be used as a tag on the screen. Specifically, a tag is added according to a direction entered through the input unit 10 to each mail object corresponding to each line shown on the screen, and a memo symbol is shown to indicate the presence of the tag on the screen. And, in response to a direction entered through the input unit 10, the content of the tag corresponding to the selected memo symbol shown on the selected screen is displayed.

Figure 5:
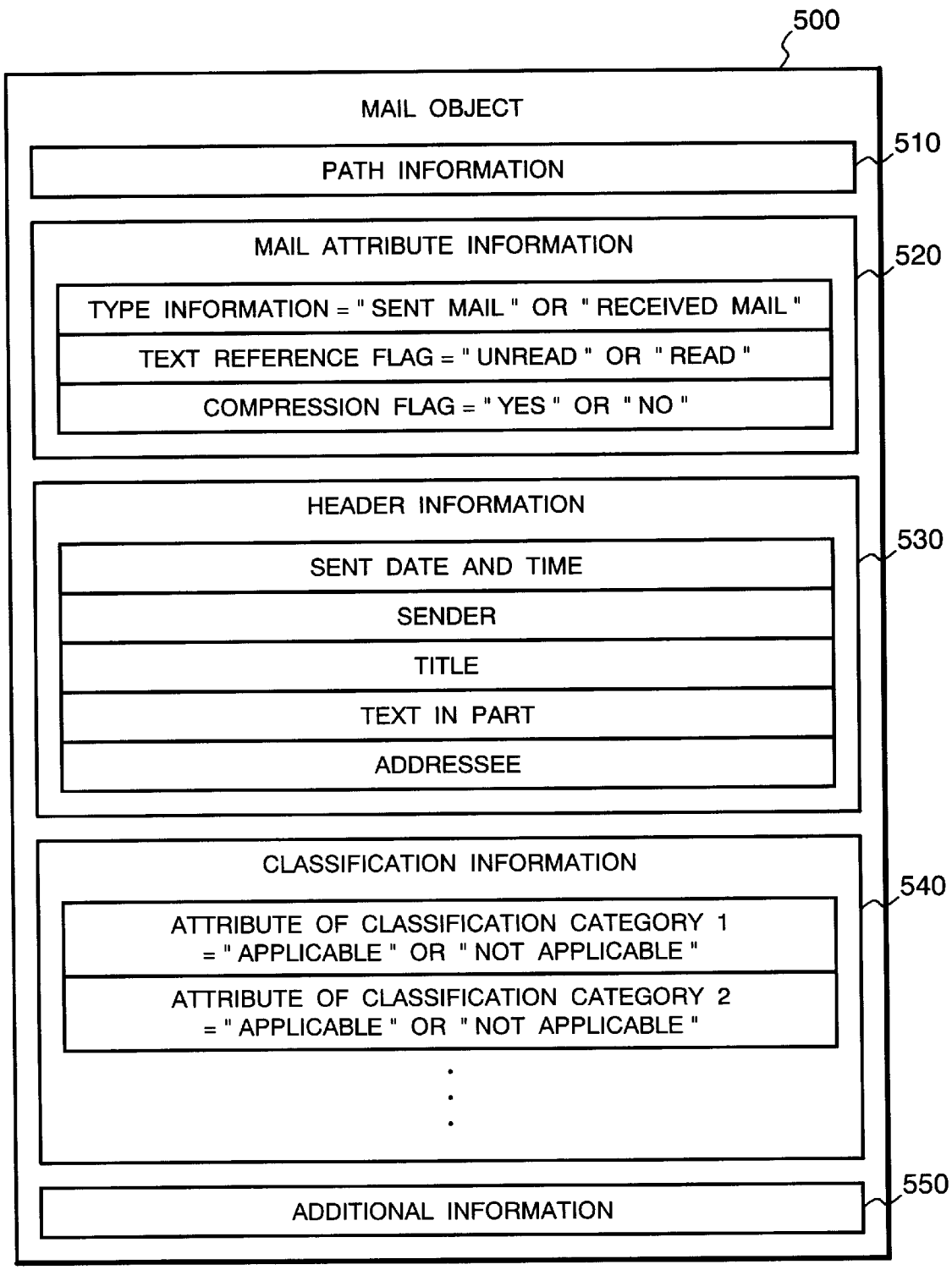
FIG. 5 is a diagram showing a structure of the mail object of an electronic mail processed in Embodiment 2.

FIG. 5 is a diagram showing a structure of the mail object 500 corresponding to the electronic mail processed in the electronic mail cataloging and retrieving system of Embodiment 2.

As seen in the drawing, the mail object 500 has the same configuration as the mail object 500 in Embodiment 1 shown in FIG. 2 except that additional information 550 added. The additional information 550 contains the content of the tag added by the additional information display control unit 90.

Figure 6:
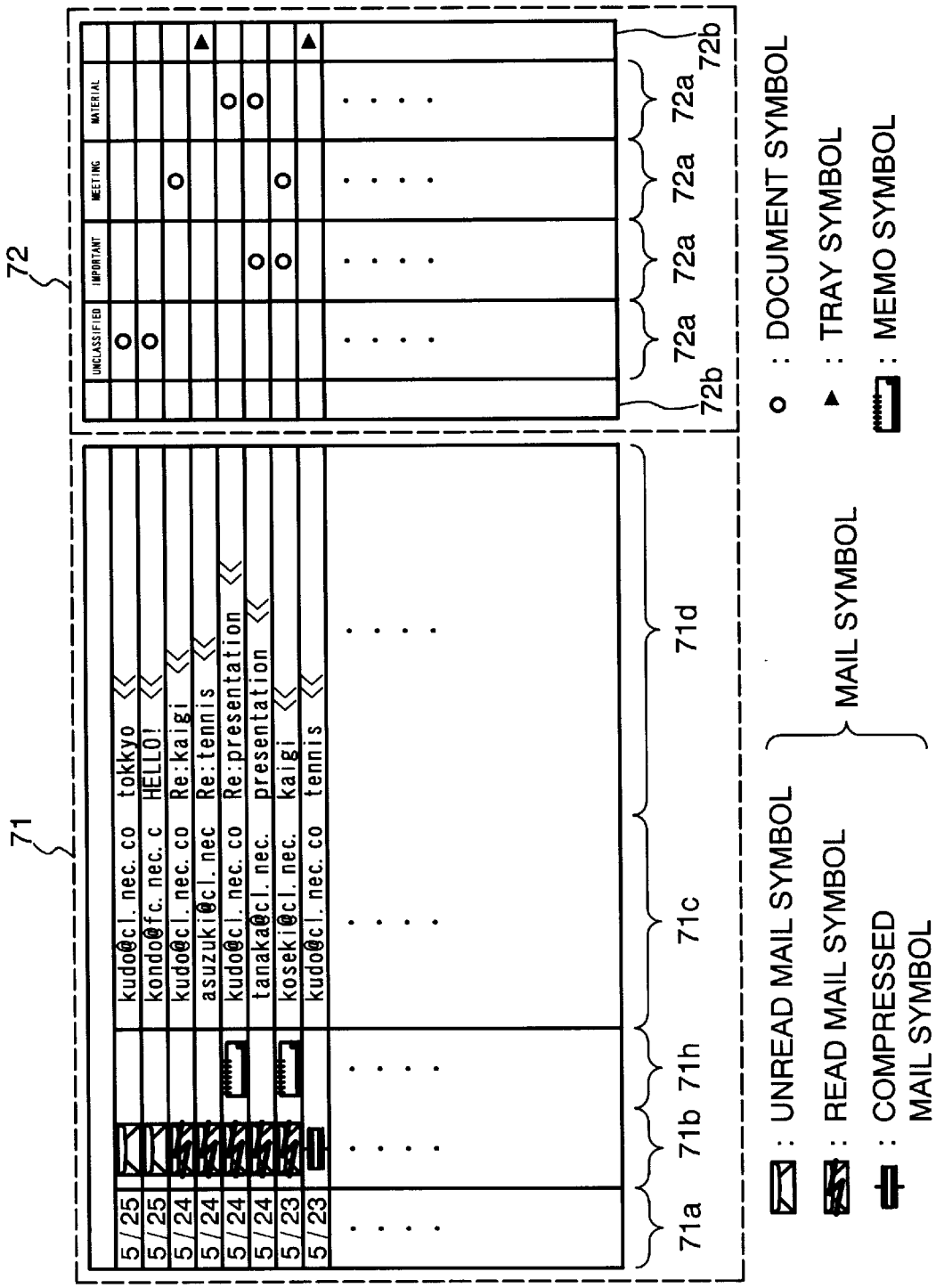
FIG. 6 is a diagram showing one example of the screen shown by Embodiment 2.

FIG. 6 is a diagram showing one example of the screen shown on the display device or the like of the electronic mail cataloging and retrieving system of Embodiment 2. It shows a screen of information on the electronic mails received, which includes a header information display area 71 and a tray display area 72.

As shown in the drawing, in the same manner as the header information display area 71 on the screen in Embodiment 1 shown in FIG. 3, the header information display area 71 includes a date and time display part 71*a*, a mail attribute display part 71*b*, a sender display part 71*c* and a content display part 71*d*, and also has an additional information display part 71*h* for showing a memo symbol to indicate that a certain electronic mail has additional information 55.

Now, the operation of this embodiment will be described. In this embodiment, the operation of showing the screen on the display device when the electronic mail cataloging and retrieving system is activated is the same as that of the electronic mail cataloging and retrieving system in Embodiment 1 shown in FIG. 13. And, the operation to execute a direction is the same as the one by the electronic mail cataloging and retrieving system in Embodiment 1 shown in FIG. 14 through FIG. 20, and additionally includes the operation particular to Embodiment 2 shown in the flowchart of FIG. 21 and FIG. 22.

Figure 21:
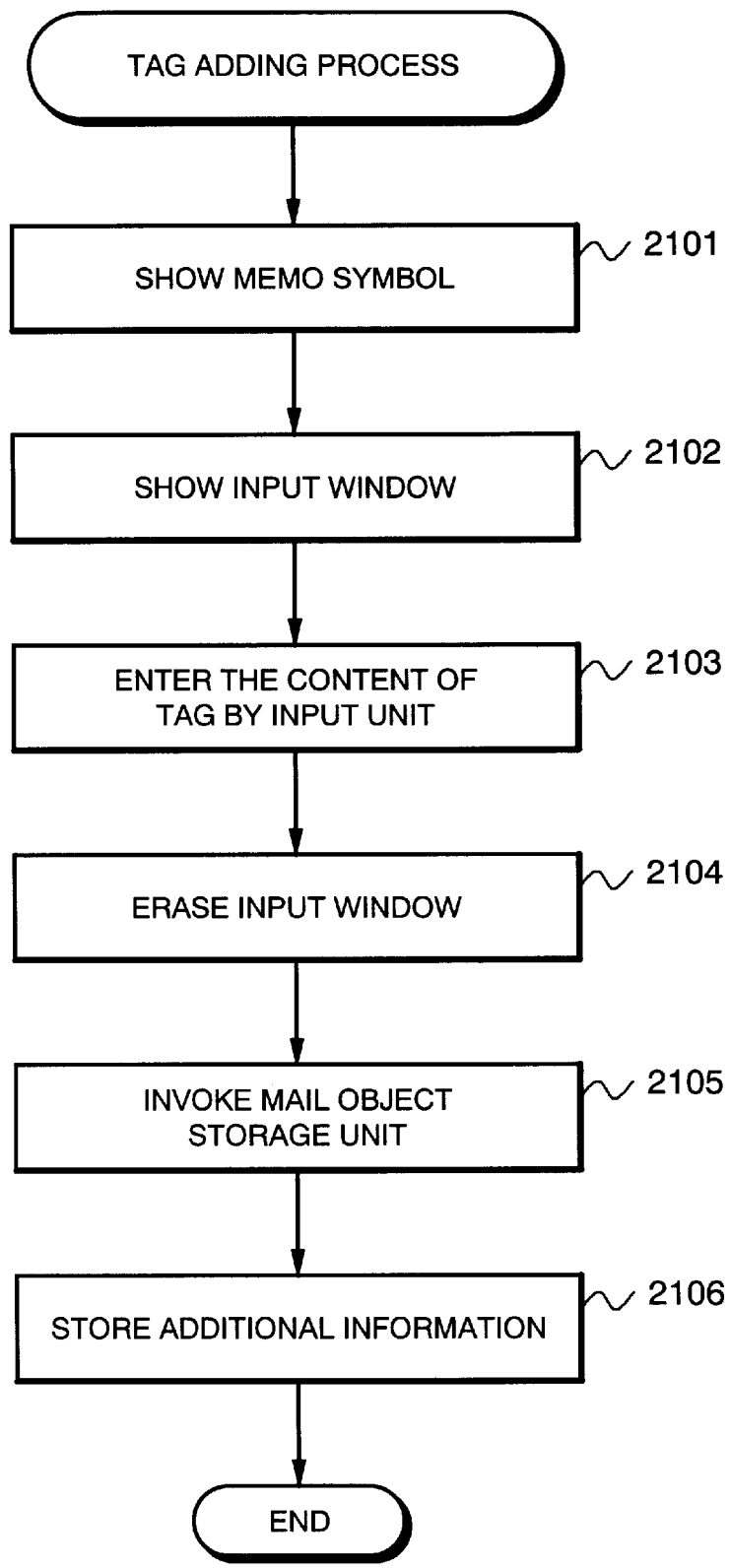
FIG. 21 is a flowchart showing a particular process at the execution of a direction in Embodiment 2, showing the operation when a direction to add a tag is given.

(1) A line on the screen is selected and a direction of adding a tag is given (see FIG. 21).

In this case, the additional information display control unit 90 shows a memo symbol in the additional information display part 71*h* for a line selected on the screen (step 2101), shows an input window for entering the content of the directed tag (step 2102), and waits for the input through the input unit 10.

When the content of the tag is entered through the input unit 10 (step 2103), the additional information display control unit 90 erases the input window (step 2104), and invokes the mail object storage unit 50 (step 2105). The invoked mail object storage unit 50 refers to the mail object 500 corresponding the selected line on the screen, and stores the content of the tag entered into the additional information 550 of the mail object 500 (step 2106).

Figure 22:
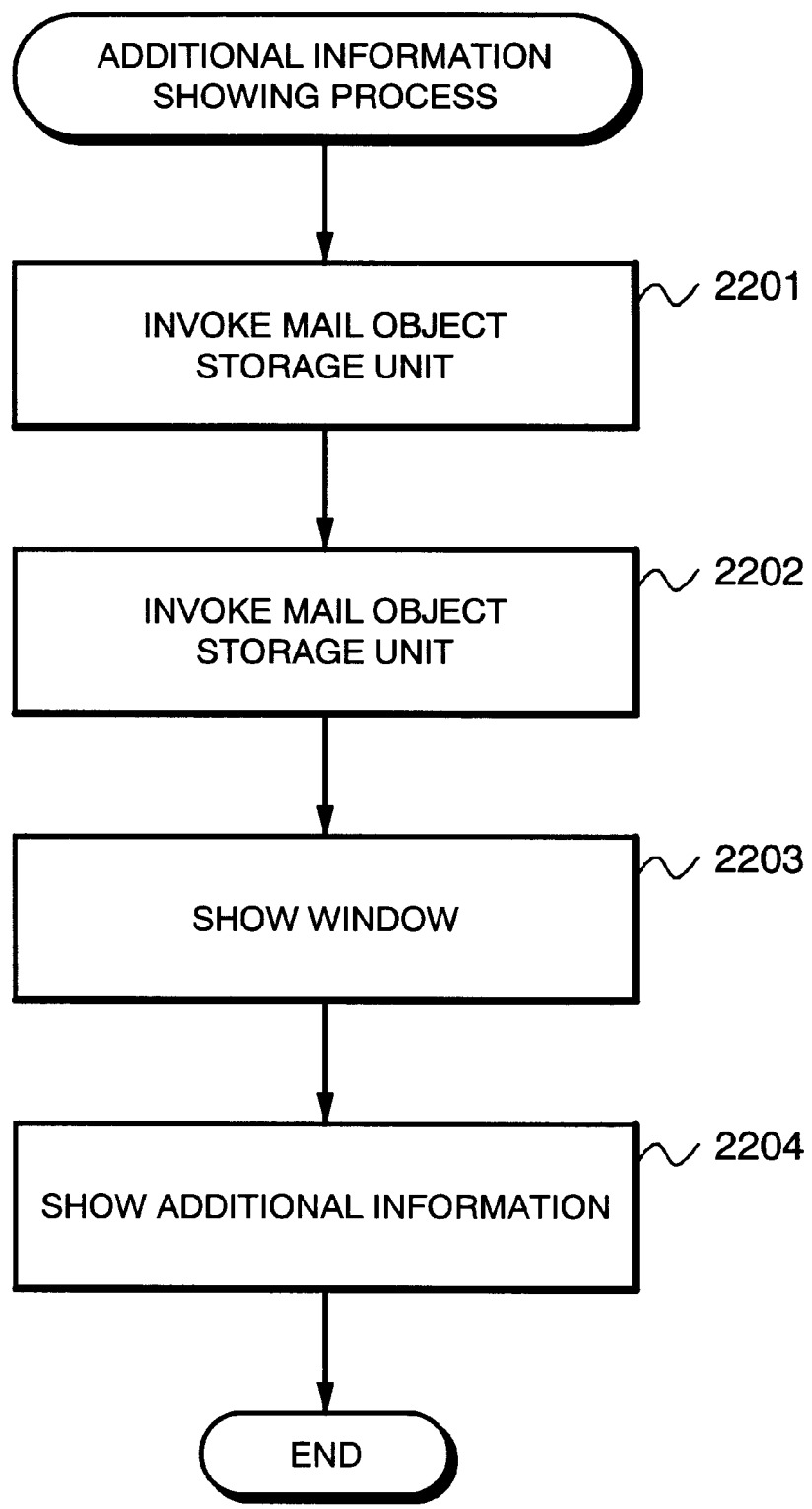
FIG. 22 is a flowchart showing a particular process at the execution of a direction in Embodiment 2, showing the operation when a direction to show the content of additional information is given.

(2) One of the memo symbols shown on the screen is selected and a direction is given to show the content of the additional information 55 corresponding to the selected memo symbol (see FIG. 22).

In this case, the additional information display unit 90 invokes the mail object storage unit 50 (step 2201). The invoked mail object storage unit 50 focuses on the line which has the memo symbol selected on the screen, extracts the additional information 550 of the mail object 500 allocated to the pertinent line, and gives the extracted additional information 550 to the additional information display control unit 90 (step 2202).

Then, the additional information display control unit 90 shows a window for showing the content of the tag (step 2203), and displays in the window the additional information 550 received from the mail object storage unit 50 (step 2204).

By the above-described operation, the electronic mail cataloging and retrieving system of Embodiment 2 provides a particular effect that the user can freely add additional information to all the electronic mails stored in the electronic mail cataloging and retrieving system, in addition to the effects achieved in Embodiment 1.

Figure 7:
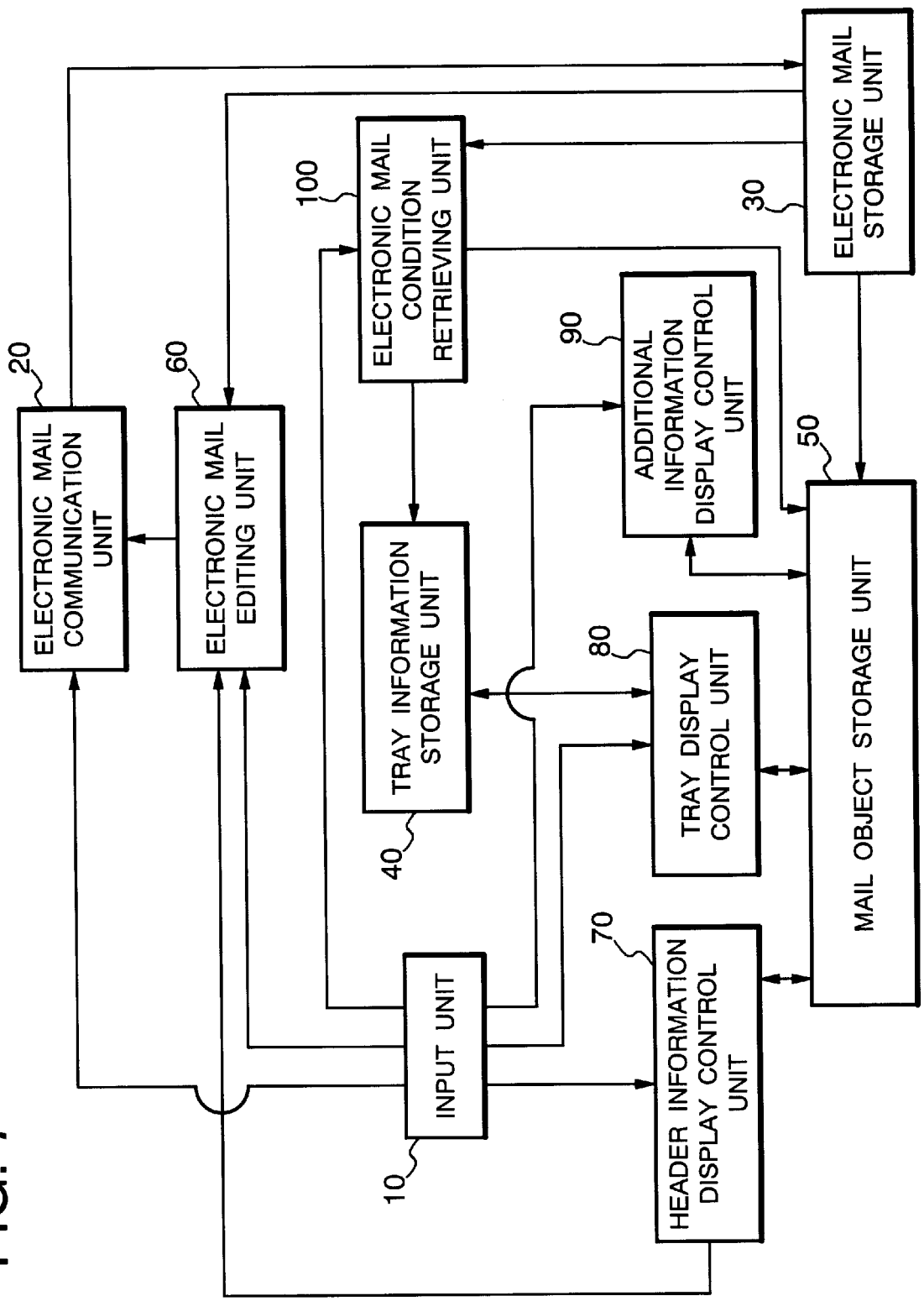
FIG. 7 is a block diagram showing a structure of the electronic mail cataloging and retrieving system according to Embodiment 3 of the invention.

Embodiment 3:

FIG. 7 is a block diagram showing a structure of the electronic mail cataloging and retrieving system according to Embodiment 3 of the invention.

The electronic mail cataloging and retrieving system of Embodiment 3 comprises an input unit 10, an electronic mail communication unit 20, an electronic mail storage unit 30, a tray information storage unit 40, a mail object storage unit 50, an electronic mail editing unit 60, a header information display control unit 70, a tray display control unit 80, an additional information display control unit 90, and an electronic mail condition retrieving unit 100. FIG. 7 shows only a characteristic structure of this embodiment and omits other general structures. In the above configuration, the input unit 10, the electronic mail communication unit 20, the electronic mail storage unit 30, the tray information storage unit 40, the mail object storage unit 50, the electronic mail editing unit 60, the header information display control unit 70, and the tray display control unit 80 have the same configurations as those described in connection with Embodiment 1 shown in FIG. 1. And, the additional information display control unit 90 is the same as the additional information display unit 90 of the Embodiment 2 shown in FIG. 4. Therefore, they are given the same reference numerals and descriptions on their configurations will be omitted.

The electronic mail condition retrieving unit 100 is a program-controlled CPU or the like, and retrieves the electronic mails stored in the electronic mail storage unit 30 according to the retrieval conditions entered through the input unit 10. The retrieval conditions used for retrieving in the electronic mail condition retrieving unit 100 are stored in the tray information storage unit 40 as information on classification type of the electronic mail. As the retrieval conditions, a given character string, the presence or not of a tag and the like can be set.

Now, the operation of this embodiment will be described. In this embodiment, the operation of showing the screen on the display device when the electronic mail cataloging and retrieving system is activated is the same as that of the electronic mail cataloging and retrieving system in Embodiment 1 shown in FIG. 13. And, the operation to execute a direction is the same as the one by the electronic mail cataloging and retrieving system in Embodiment 1 and Embodiment 2 shown in FIG. 14 through FIG. 22, and additionally includes the operation particular to Embodiment 3 shown in the flowchart of FIG. 23.

Figure 23:
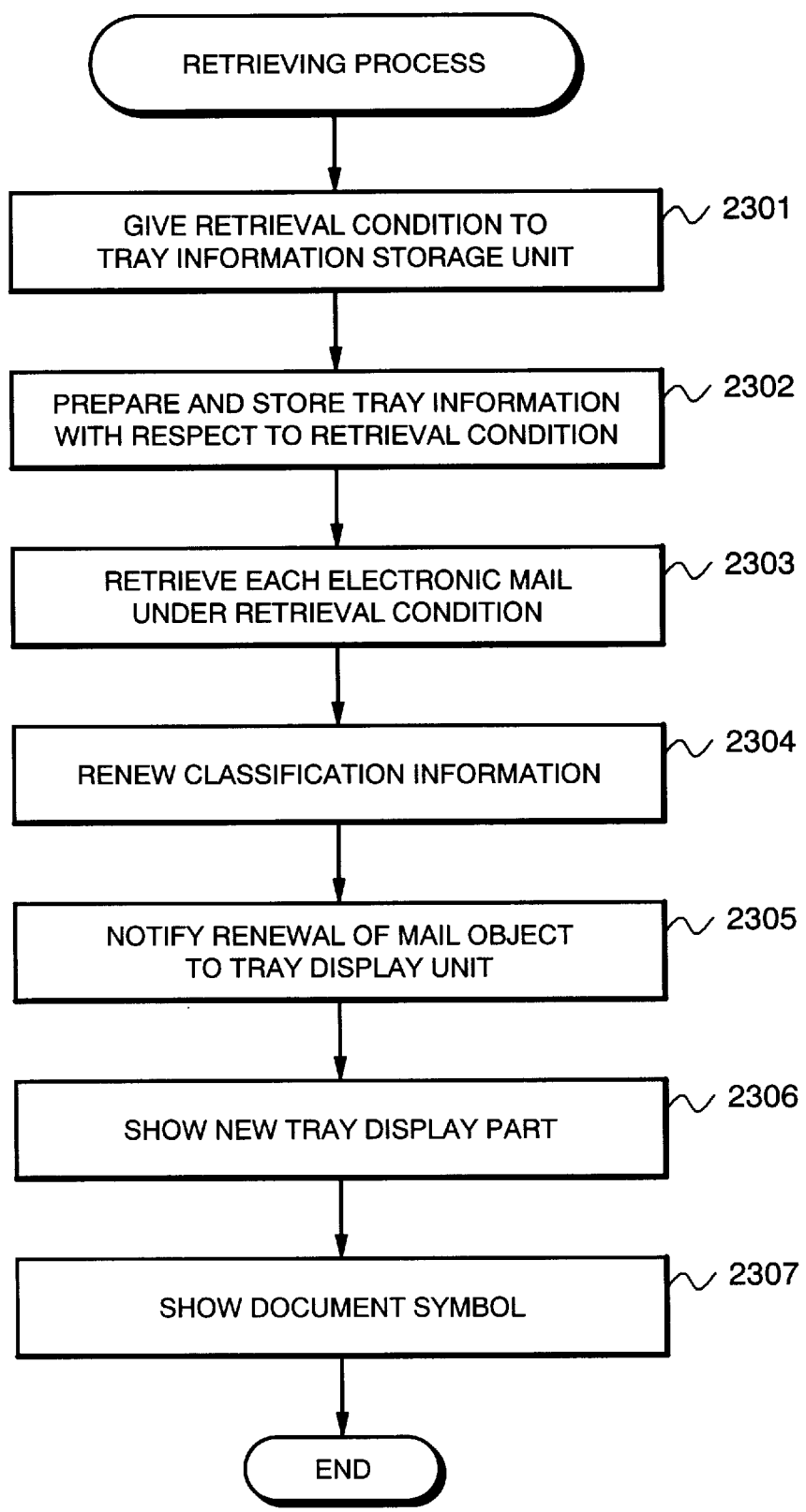
FIG. 23 is a flowchart showing a particular process at the execution of a direction in Embodiment 3, showing the operation when a direction to execute retrieval is given.

Description will be made of the operation when the retrieval conditions are entered through the input unit 10 to direct the execution of retrieving (see FIG. 23).

In this case, the electronic mail condition retrieving unit 100 gives the directed retrieval conditions to the tray information storage unit 40 (step 2301). The tray information storage unit 40 prepares a new piece of information of classification type (tray information), and determined this tray information as the retrieval conditions received from the electronic mail condition retrieving unit 100 (step 2302). Specifically, the retrieval conditions are stored in the "name of classification category" of the pertinent tray information.

Then, the electronic mail condition retrieving unit 100 retrieves an electronic mail stored in the electronic mail storage unit 30 based on the directed retrieval conditions, and gives the retrieved result to the mail object storage unit 50 (step 2303). The mail object storage unit 50 refers to the received retrieved result and adds an attribute value corresponding to the retrieval conditions to the classification information 540 in the stored mail object 500 (step 2304). And, the renewal of the mail object 500 is notified to the tray display control unit 80 (step 2305).

The tray display control unit 80 refers to the information newly added by the operations of the tray information storage unit 40 and the mail object storage unit 50, and shows the tray display part 72a for showing a new tray corresponding to the retrieval conditions in the tray display area 72 on the screen (step 2306). And, the document symbol is shown in the applicable tray display part 72a based on the retrieval result by the electronic mail condition retrieving unit 100 (step 2307).

By the above-described operation, the electronic mail cataloging and retrieving system of Embodiment 3 provides particular effects that an electronic mail can be retrieved by the retrieval conditions determined individually in addition to the classification types set in advance, and the flexibility of retrieval is increased, in addition to the effects achieved in Embodiment 1 and Embodiment 2.

It also has other effects that the retrieval effect based on the entered retrieval conditions can be displayed without switching the displayed screen and the retrieval history can be referred to easily.

In this embodiment, the electronic mail condition retrieving unit 100 was added to the electronic mail cataloging and retrieving system of Embodiment 2 shown in FIG. 4, but it is to be understood that the electronic mail condition retrieving unit 100 may be added to the electronic mail cataloging and retrieving system of Embodiment 1 shown in FIG. 1 which is not provided with the additional information display control unit 90. In this case, the operation of performing the direction is different from the operation which is particular to Embodiment 2 shown in FIG. 21 and FIG. 22. Besides, the particular effects of Embodiment 2 are not attained.

Figure 8:
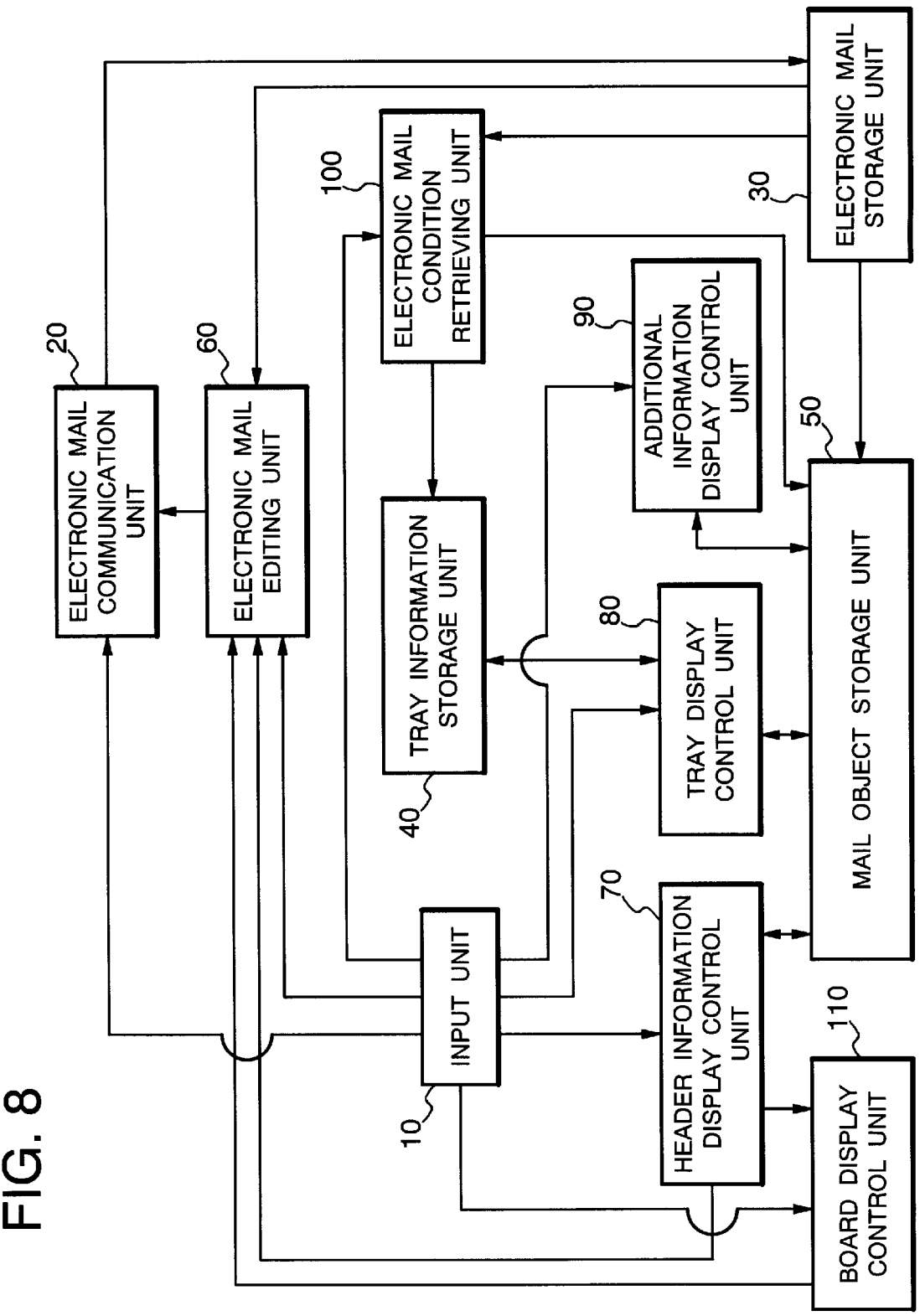
FIG. 8 is a block diagram showing a structure of the electronic mail cataloging and retrieving system according to Embodiment 4 of the invention.

Embodiment 4:

FIG. 8 is a block diagram showing a structure of the electronic mail cataloging and retrieving system according to Embodiment 4 of the invention.

The electronic mail cataloging and retrieving system of Embodiment 4 comprises an input unit 10, an electronic mail communication unit 20, an electronic mail storage unit 30, a tray information storage unit 40, a mail object storage unit 50, an electronic mail editing unit 60, a header information display control unit 70, a tray display control unit 80, an additional information display control unit 90, an electronic mail condition retrieving unit 100, and a board display control unit 110. FIG. 8 shows only a characteristic structure of this embodiment and omits other general structures. In the above configuration, the input unit 10, the electronic mail communication unit 20, the electronic mail storage unit 30, the tray information storage unit 40, the mail object storage unit 50, the electronic mail editing unit 60, the header information display control unit 70, and the tray display control unit 80 have the same configurations as those described in connection with Embodiment 1 shown in FIG. 1. And, the additional information display control unit 90 is the same as the additional information display unit 90 of the Embodiment 2 shown in FIG. 4. Besides, the electronic mail condition retrieving unit 100 is the same as the electronic mail condition retrieving unit 100 in Embodiment 3 shown in FIG. 7. Therefore, they are given the same reference numerals and descriptions on their configurations will be omitted.

The board display control unit 110 is a program-controlled CPU or the like, displays a two-dimensional symbol display area on the screen, and also shows a mail symbol corresponding to the electronic mails stored in the electronic mail storage unit 30 at a prescribed position in the symbol display area. The location where the mail symbol is shown can be designated by the input through the input unit 10 by the user.

Figure 9:
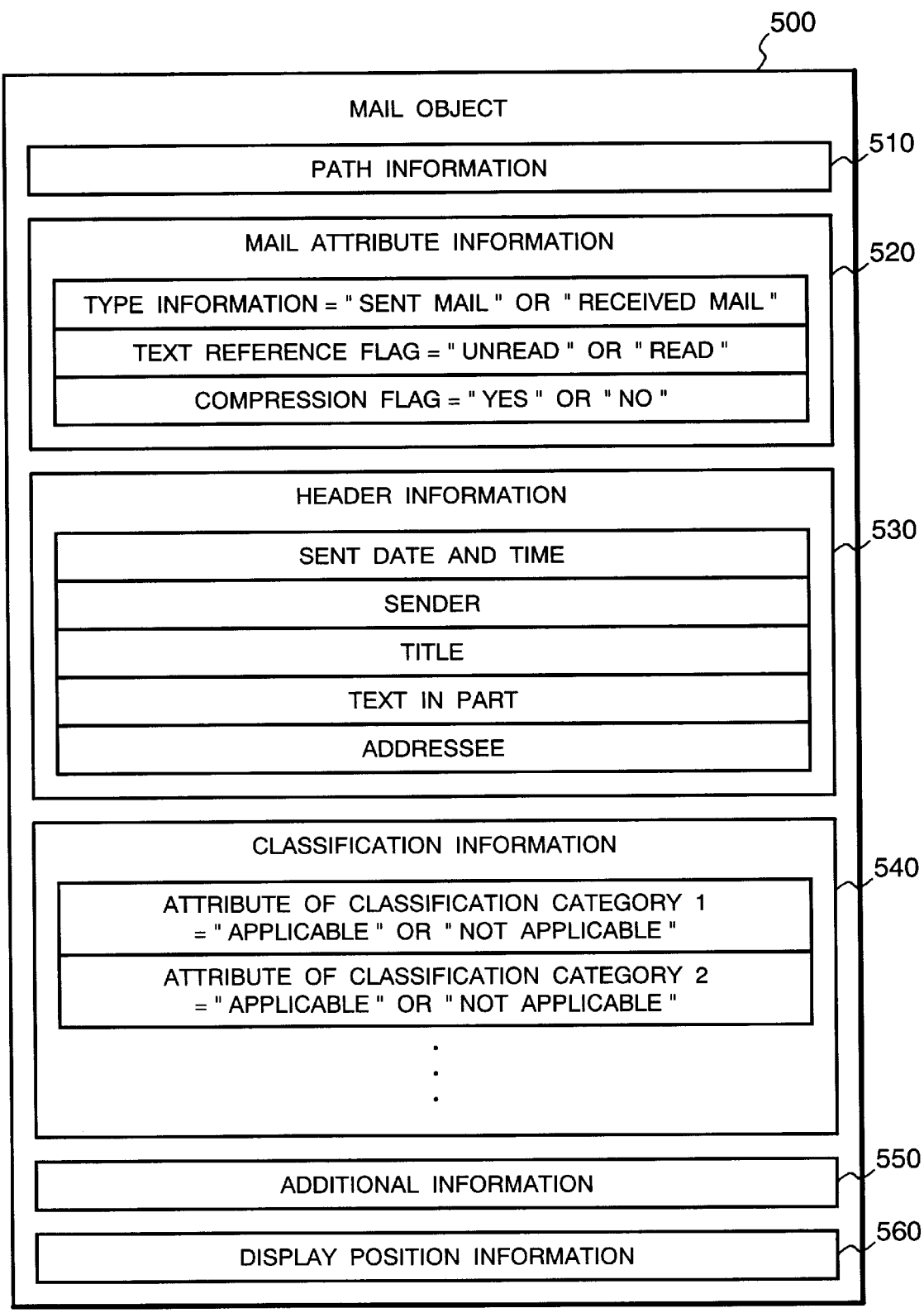
FIG. 9 is a diagram showing a structure of the mail object of an electronic mail processed in Embodiment 4.

FIG. 9 is a diagram showing a structure of the mail object 500 corresponding to the electronic mail processed in the electronic mail cataloging and retrieving system of Embodiment 4.

As seen in the drawing, the mail object 500 has the same configuration as the mail object 500 in Embodiment 2 shown in FIG. 5 except that display position information 560 is added. The display position information 560 contains coordinates of mail symbols in the two-dimensional symbol display area shown by the board display control unit 110.

Figure 10:
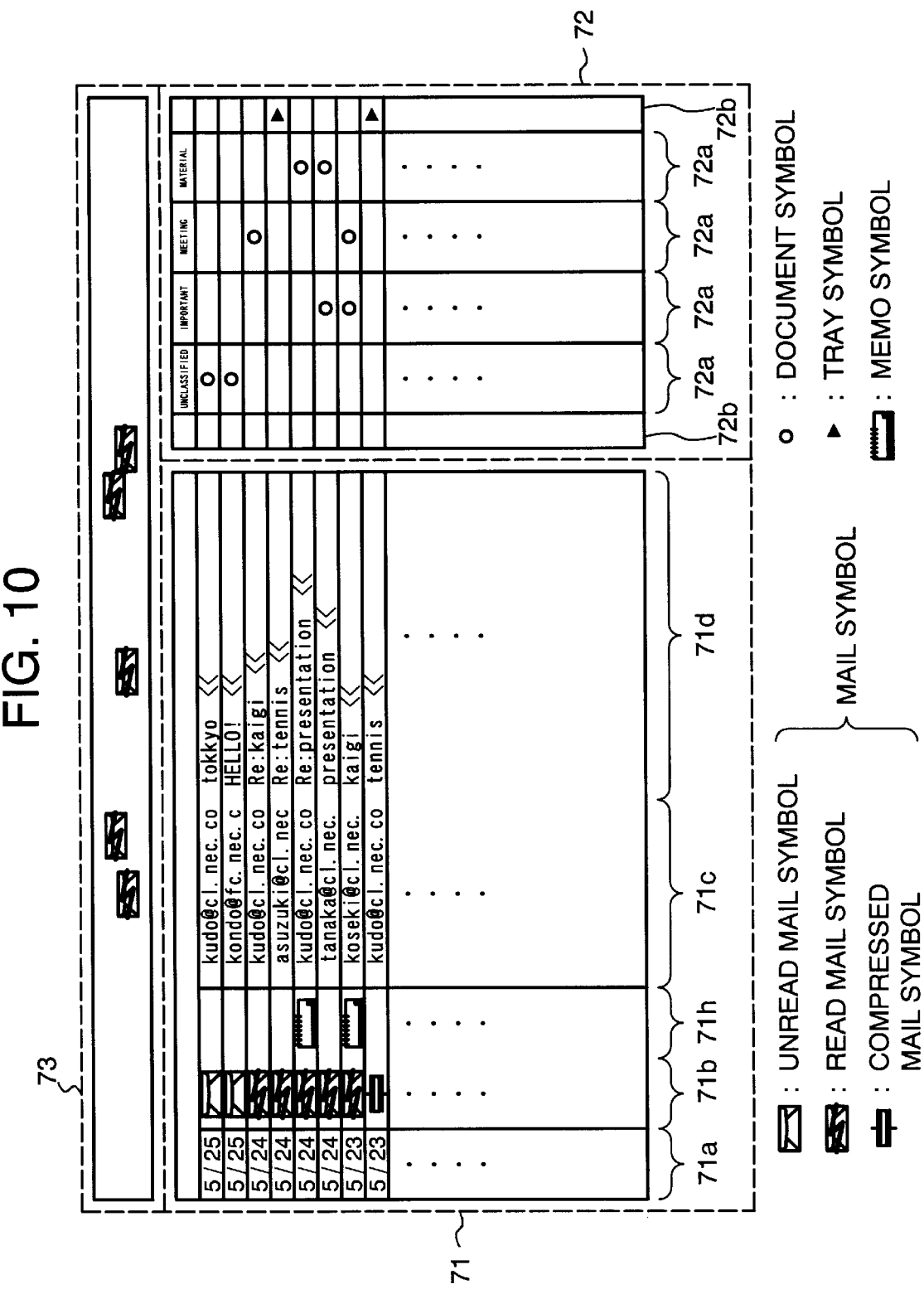
FIG. 10 is a diagram showing one example of the screen shown by Embodiment 4.

FIG. 10 is a diagram showing one example of the screen shown on the display device or the like of the electronic mail cataloging and retrieving system of Embodiment 4. It shows a screen of information on the electronic mails received which includes a header information display area 71, a tray display area 72, and a board display area 73.

The header information display area 71 and the tray display area 72 are the same as the header information display area 71 and the tray display area 72 on the screen in Embodiment 2 shown in FIG. 6.

The board display area 73 is a two-dimensional symbol display area for showing mail symbols such as an unread mail symbol to indicate an electronic mail which has not been read, a read mail symbol to indicate an electronic mail which has been read, and a compressed mail symbol to indicate that the pertinent electronic mail is compressed. As the mail symbols shown in the board display area 73, the same symbols as those shown in the mail attribute display unit 71b can be used.

The user can designate the display position of the mail symbol for each electronic mail in the board display area 73. Therefore, with reference to the mail symbol at the designated position, the attribute of the pertinent electronic mail can be known. The mail symbol is shown in the board display area 73 without relevance to the header information display area 71 and the tray display area 72. Therefore, even when a line related to a corresponding electronic mail is not shown in the header information display area 71 and the tray display area 72, the attribute of the pertinent electronic mail can be known. Besides, when the mail symbols shown in the board display area are linked with information on electronic mails corresponding to the pertinent mail symbols as described afterward, the line related to the pertinent electronic mail or the content of the pertinent electronic mail can be invoked from the pertinent mail symbol as required.

And, the user can erase a particular mail symbol in the board display area 73 by entering a direction through the input unit 10. In this case, the coordinates in the display position information 560 within the mail object 500 corresponding to an electronic mail specified by the pertinent mail symbol are erased by the board display control unit 110.

Figure 24:
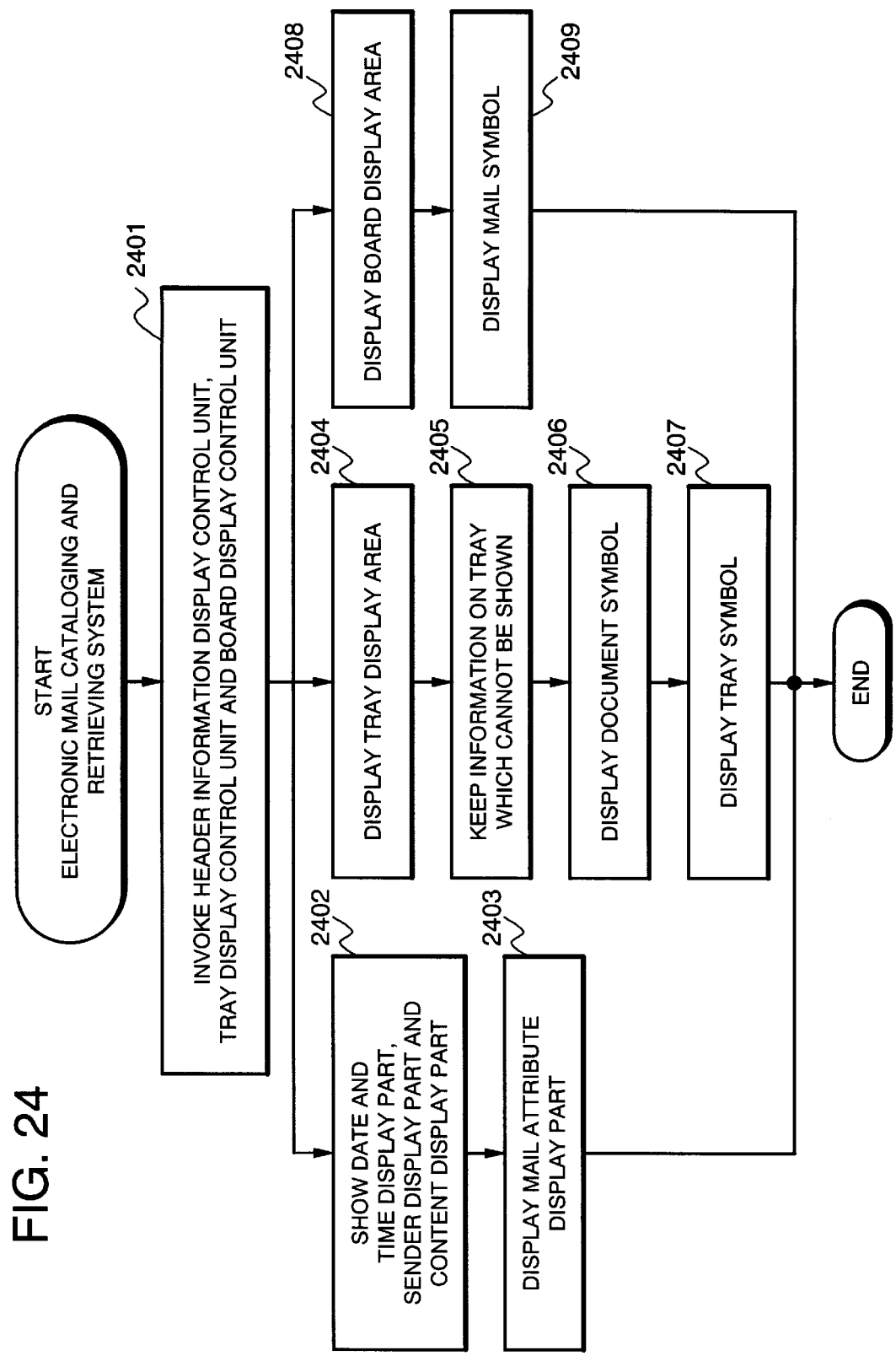
FIG. 24 is a flowchart showing a displaying process at the time of activation in Embodiment 4.

Now, the operation of this embodiment will be described. FIG. 24 is a flowchart showing the process to show on the display device at the time this embodiment is activated. Referring to FIG. 24, description will be made of the operation to show a screen on the display device when the electronic mail cataloging and retrieving system of this embodiment is activated.

When the electronic mail cataloging and retrieving system of this embodiment is activated by the user, the header information display control unit 70, the tray display control unit 80 and the board display control unit 110 are invoked (step 2401). The following operations in step 2402 and step 2403 by the header information display control unit 70 are the same as those in step 1302 and step 1303 by the header information display control unit 70 in Embodiment 1 shown in FIG. 13. And, the operations from step 2404 to step 2407 by the tray display control unit 80 are the same as those from step 1304 to step 1307 by the tray display control unit 80 in Embodiment 1 shown in FIG. 13.

The board display control unit 110 is invoked in step 2401 and displays the board display area 73 on the screen (step 2408). And, the board display control unit 110 refers to the mail attribute information 520 and the display position information 560 in the mail object 500 stored in the mail object storage unit 50, extracts the mail object 500 of which the value is stored in the display position information 560, and displays the mail symbol which is indicated by the attribute value in the mail attribute information 520 on the coordinates indicated by the value in the display position information 560 (step 2409).

Now, the operation at the time of performing a direction in this embodiment will be described. In this embodiment, the operation to execute a direction is the same as those by the electronic mail cataloging and retrieving system in Embodiment 1 through Embodiment 3 shown in FIG. 14 through FIG. 23, and additionally includes the operation particular to Embodiment 4 shown in the flowcharts of FIG. 25 and FIG. 26.

Figure 25:
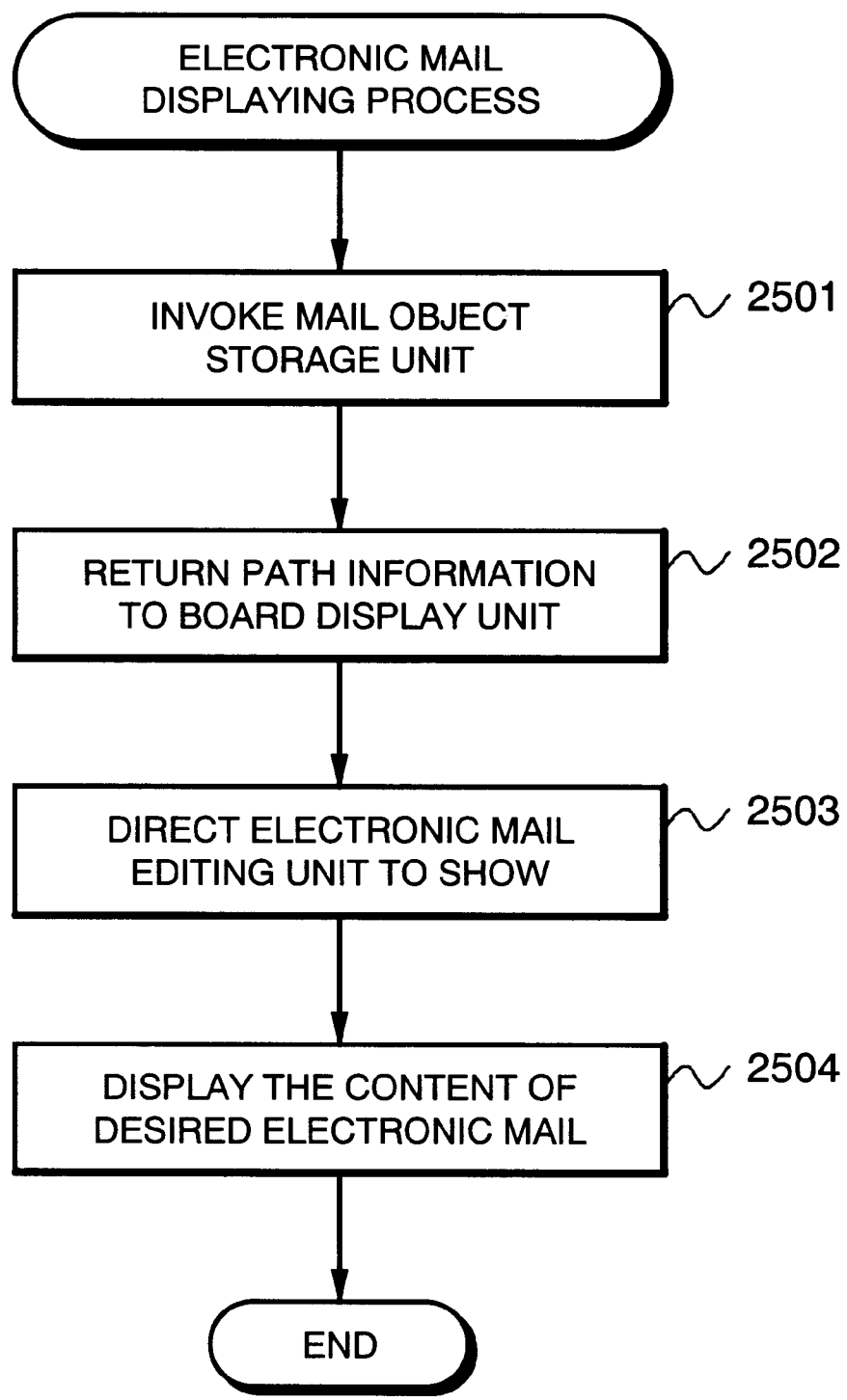
FIG. 25 is a flowchart showing a particular process at the execution of a direction in Embodiment 4, showing the operation when a direction to show the content of an electronic mail relevant to a symbol in a board display area is given.

(1) A direction is given to show an electronic mail corresponding to the mail symbol shown in the board display area 78 (see FIG. 25).

In this case, the board display control unit 110 invokes the mail object storage unit 50 (step 2501). The invoked mail object storage unit 50 refers to the mail object 500 corresponding to the directed mail symbol, and returns the path information 510 contained in the mail object 500 to the board display control unit 110 (step 2502).

Then, the board display control unit 110 sends the path information 510 received from the mail object storage unit 50 and a direction to show the content of an electronic mail relevant to the path information 510 to the electronic mail editing unit 60 (step 2503). The electronic mail editing unit 60 uses the path information 510 received from the board display control unit 110 to find a desired electronic mail in the electronic mail storage unit 30, and displays its content on the screen (step 2504).

Figure 26:
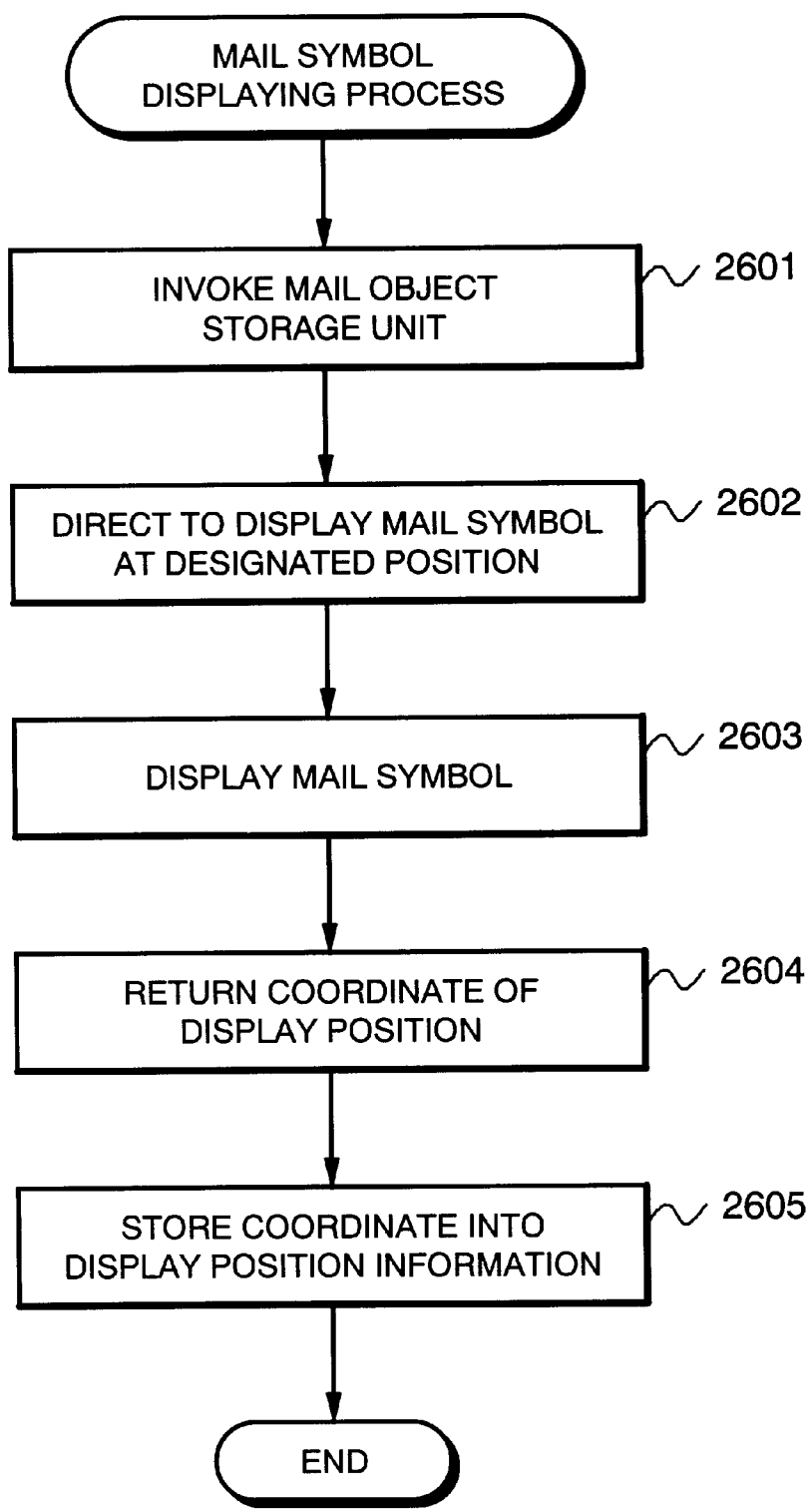
FIG. 26 is a flowchart showing a particular process at the execution of a direction in Embodiment 4, showing the operation when a direction to show symbols in a board display area is given.

(2) One line is selected from the header information display area 71 on the screen and a direction is given to show the mail symbol of an electronic mail corresponding to the pertinent line at a designated position in the board display area 73 (see FIG. 26).

In this case, the header information display control unit 70 invokes the mail object storage unit 50 (step 2601). The invoked mail object storage unit 520 refers to the mail object 500 allocated to the selected line, and sends the mail attribute information 52 contained in the mail object 500 and a direction to show the mail symbol at the position directed by the input through the input unit 10 to the board display control unit 110 (step 2602).

The board display control unit 110 displays at the directed position in the board display area 73 the mail symbol corresponding to the attribute value of the mail attribute information 520 received from the mail object storage unit 50 (step 2603). And, the board display control unit 110 returns the coordinate information on the display position of the pertinent mail symbol to the mail object storage unit 50 (step 2604). The mail object storage unit 50 stores the received coordinate information into the display position information 560 of the referred mail object 500 (step 2605).

By the above-described operation, the electronic mail cataloging and retrieving system of Embodiment 4 provides the following particular effects in addition to the effects achieved in Embodiment 1 through Embodiment 3.

Specifically, the mail symbol previously designated by the user corresponding to the electronic mail can be kept displayed at the designated position in the board display area 73. The user recognizes the mail symbol corresponding to the particular electronic mail in view of the location designated by the user, and can direct to show the operation to display the contents and the like of the pertinent electronic mail. Thus, the contents of the pertinent electronic mail can be displayed quickly even when a line corresponding to the pertinent electronic mail is not shown in the header information display area 71 and the tray display area 72 on the screen.

This embodiment has the structure that the board display control unit 110 was added to the electronic mail cataloging and retrieving system of Embodiment 3 shown in FIG. 7, but the additional information display control unit 90 and the electronic mail condition retrieving unit 100 are not essential elements. Therefore, it is to be understood that the board display control unit 110 can be added to the electronic mail cataloging and retrieving system of Embodiment 1 shown in FIG. 1 which is not provided with the additional information display control unit 90 and the electronic mail condition retrieving unit 100. And, the additional information display control unit 90 and the electronic mail condition retrieving unit 100 can be combined appropriately with the board display control unit 110 and added to the structure. In such a case, if the additional information display control unit 90 and the electronic mail condition retrieving unit 100 are not provided, the operation particular to Embodiment 2 shown in FIG. 21 and FIG. 22 and the operation particular to Embodiment 3 shown in FIG. 23 are not performed in the operation for executing the direction; besides, the effects particular to Embodiment 2 and those particular to Embodiment 3 cannot be obtained. And, if the additional information display control unit 90 is not provided, the addition information 550 among the various types of information in the mail object 500 shown in FIG. 9 does not exist.

Figure 11:
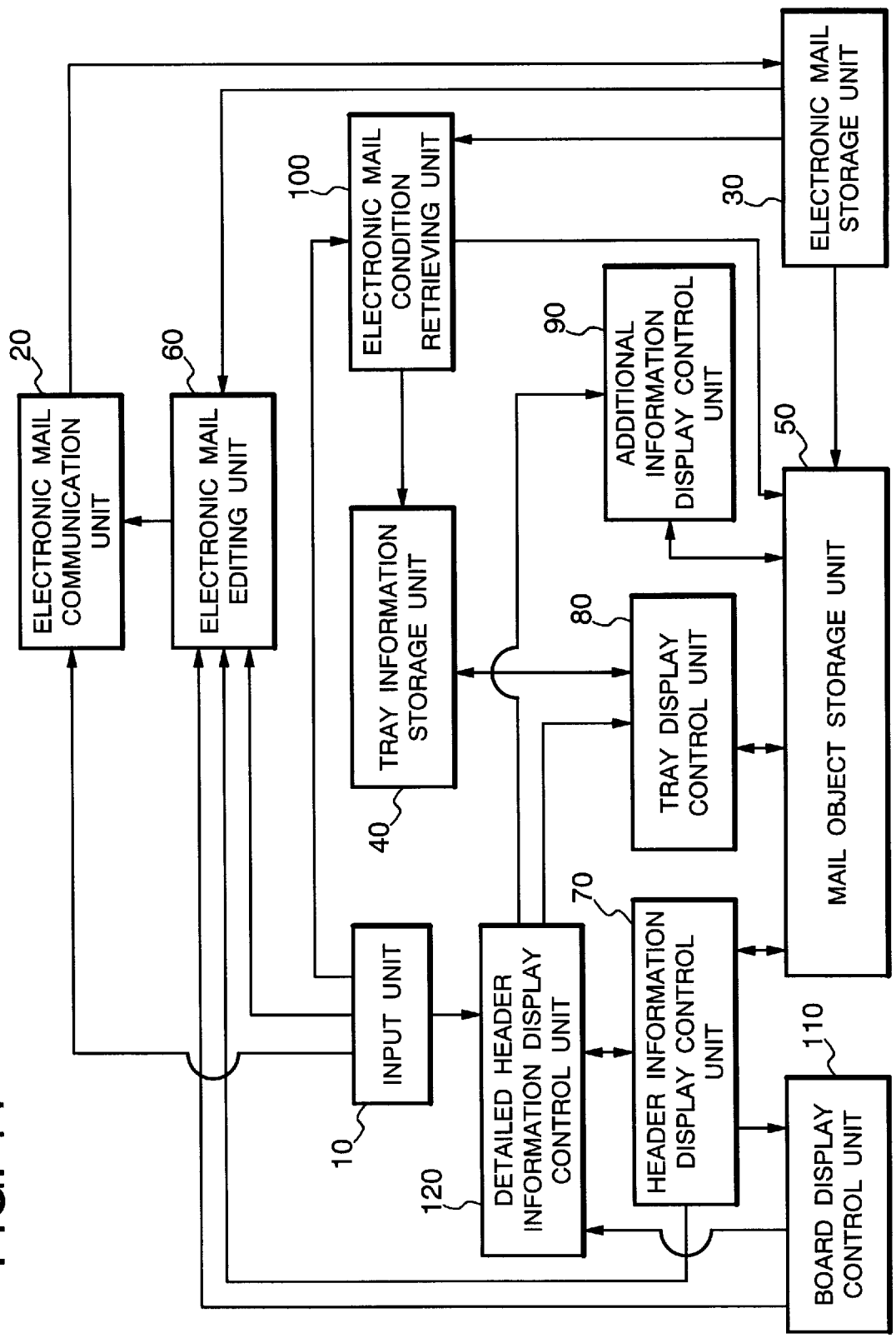
FIG. 11 is a block diagram showing a structure of the electronic mail cataloging and retrieving system according to Embodiment 5 of the invention.

Embodiment 5:

FIG. 11 is a block diagram showing a structure of the electronic mail cataloging and retrieving system according to Embodiment 5 of the invention.

The electronic mail cataloging and retrieving system of Embodiment 5 comprises an input unit 10, an electronic mail communication unit 20, an electronic mail storage unit 30, a tray information storage unit 40, a mail object storage unit 50, an electronic mail editing unit 60, a header information display control unit 70, a tray display control unit 80, an additional information display control unit 90, an electronic mail condition retrieving unit 100, a board display control unit 110, and a detailed header information display control unit 120. FIG. 11 shows only a characteristic structure of this embodiment and omits other general structures. In the above configuration, the input unit 10, the electronic mail communication unit 20, the electronic mail storage unit 30, the tray information storage unit 40, the mail object storage unit 50, the electronic mail editing unit 60, the header information display control unit 70, and the tray display control unit 80 have the same configurations as those described in connection with Embodiment 1 shown in FIG. 1. And, the additional information display control unit 90 is the same as the additional information display unit 90 of the Embodiment 2 shown in FIG. 4. Besides, the electronic mail condition retrieving unit 100 is the same as the electronic mail condition retrieving unit 100 in Embodiment 3 shown in FIG. 7. And, the board display control unit 110 is the same as the board display control unit 110 in Embodiment 4 shown in FIG. 8. Therefore, they are given the same reference numerals and descriptions on their configurations will be omitted.

The detailed header information display control unit 120 is a program-controlled CPU or the like, monitors the position of a pointer indicated by the input unit 10, and displays the detailed header information on the electronic mail corresponding to the position of the pertinent pointer on the screen of the display device. Specifically, when the pointer is positioned at a prescribed position (for example, a line to which the mail object is allocated, or the mail symbol) in the header information display area, the tray display area or the board display area and the detailed header information is directed to be displayed, the detailed header information display control unit 120 extracts the mail object corresponding to the designated line or mail symbol, refers to the header information contained in the pertinent mail object, and displays a detailed header information display window which includes the detailed header information on the pertinent electronic mail.

Here, the detailed header information display window is a window for displaying the content of the header information in an easy-to-see format. As the number of characters (particularly, the number of characters of the text) which is allowed to be shown in the detailed header information display window, the number of characters more than the number of characters which can be displayed in the single line of the header information display area is set.

Figure 12:
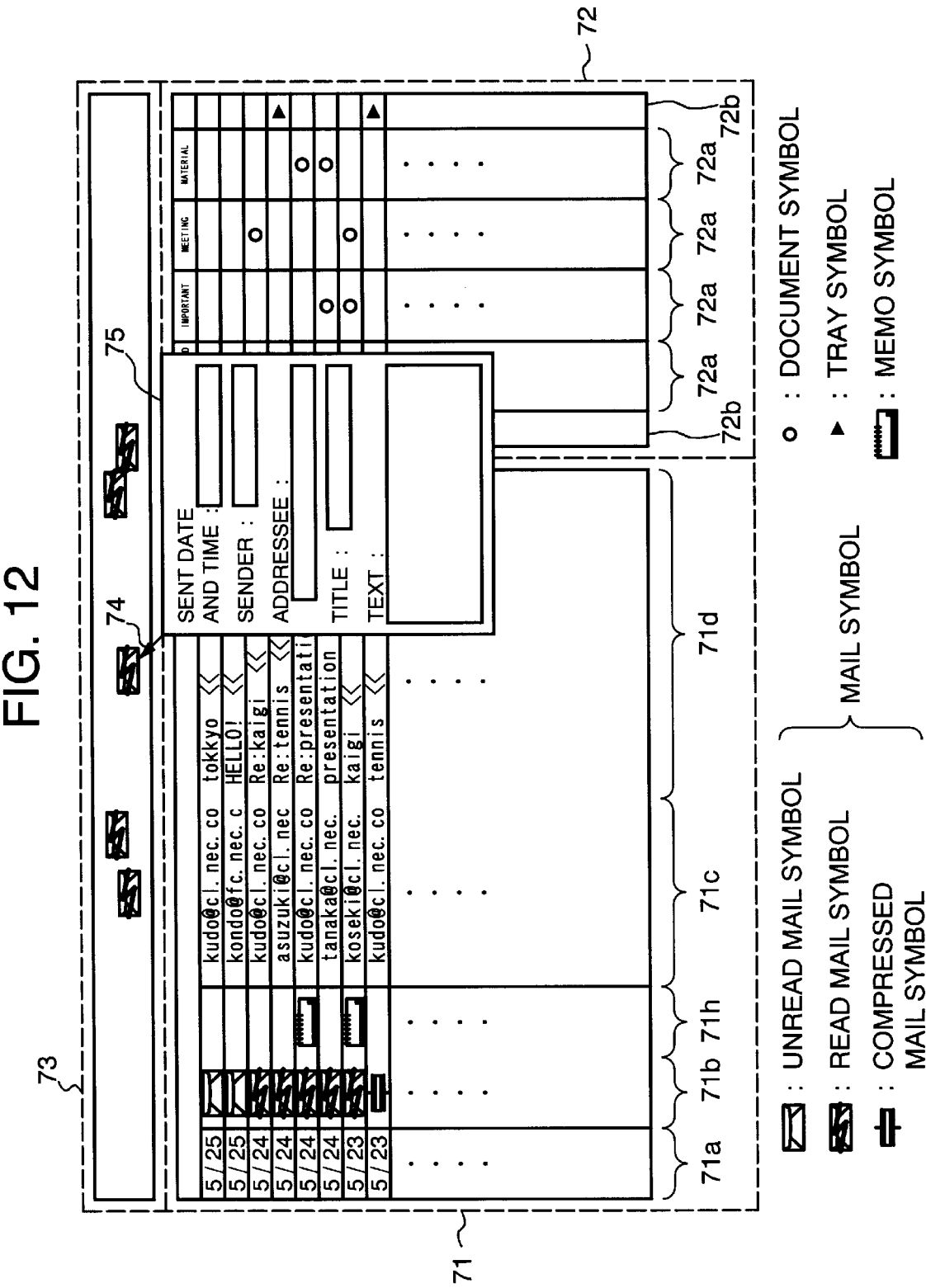
FIG. 12 is a diagram showing one example of the screen shown by Embodiment 5.

FIG. 12 is a diagram showing one example of the screen shown on the display device or the like of the electronic mail cataloging and retrieving system of Embodiment 5. This drawing shows a screen for showing information related to the received electronic mails, and shows the header information display area 71, the tray display area 72, and the board display area 73. And, it also shows the pointer 74 which can be moved to any desired position on the screen and the detailed header information display window 75 according to a prescribed direction.

The header information display area 71 and the tray display area 72 are the same as the header information display area 71 and the tray display area 72 on the screen in Embodiment 2 shown in FIG. 6. And, the board display area 73 is the same as the board display area 73 on the screen in Embodiment 4 shown in FIG. 10.

The pointer 74 is a general mouse pointer or the like, and designates a particular point on the screen. The detailed header information display window 75 has a display column for showing in detail each piece of information such as the date and time, sender, addressee, title, and text in part shown in the header information display area 71, and shows detailed header information on an electronic mail specified by the pointer 74. The display format of the detailed header information display window 75 can be set as desired.

Now, the operation of this embodiment will be described. In this embodiment, the operation of showing the screen on the display device when the electronic mail cataloging and retrieving system is activated is the same as that of the electronic mail cataloging and retrieving system in Embodiment 4 shown in FIG. 24. And, the operation to execute a direction is the same as those by the electronic mail cataloging and retrieving system in Embodiment 1 through Embodiment 4 shown in FIG. 14 through FIG. 23, FIG. 25 and FIG. 26, and additionally includes the operation particular to Embodiment 5 shown in the flowchart of FIG. 27.

Figure 27:
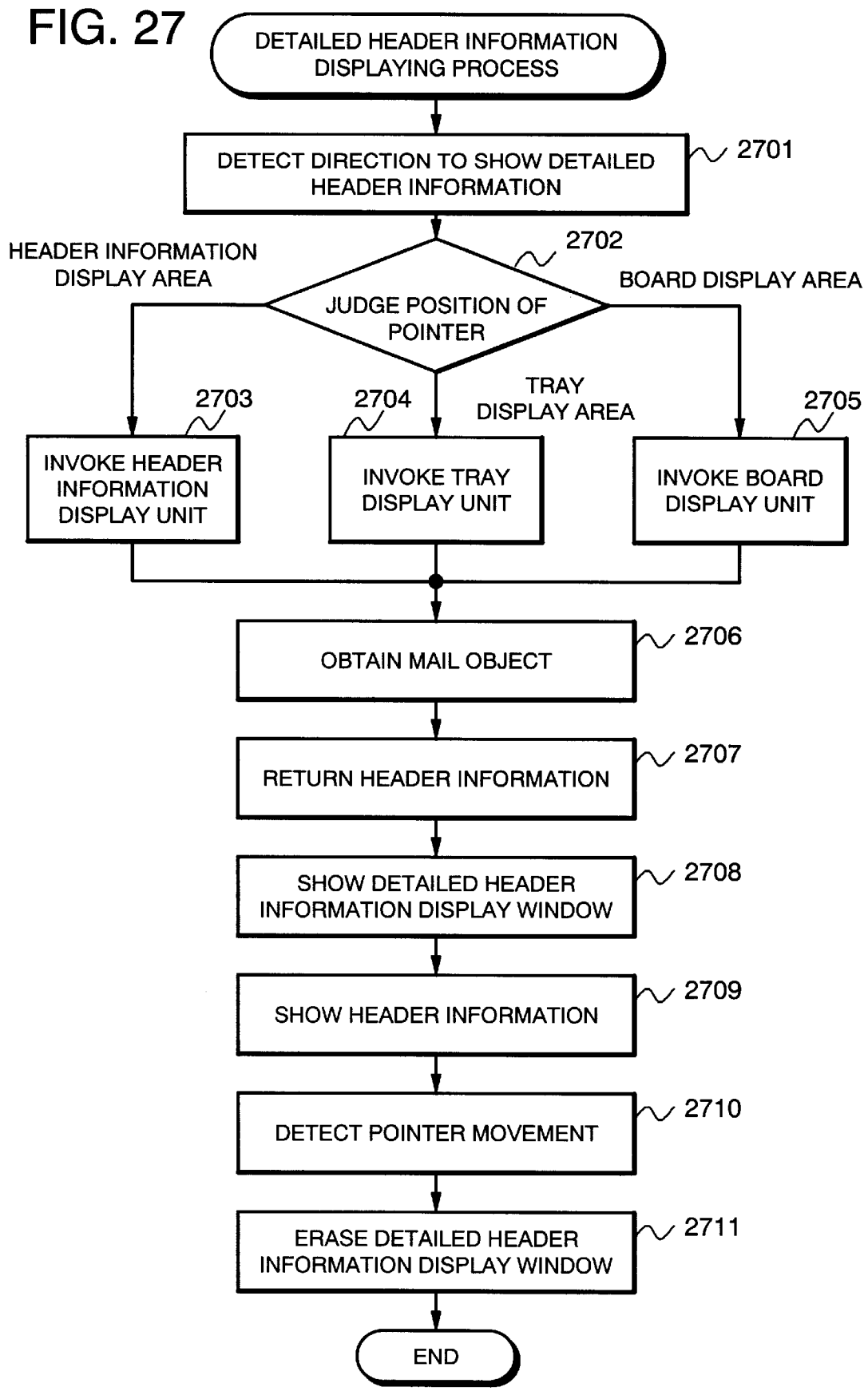
FIG. 27 is a flowchart showing a particular process at the execution of a direction in Embodiment 5, showing the operation when a direction to show detailed header information is given.

Descriptions will be made of the operation when the position of a line or a mail symbol is directed by the pointer 74 and the detailed header information is directed to be shown (see FIG. 27).

In this case, the detailed header information display control 120 detects the entered direction (step 2701), and judges the position (to see which of the header information display area 71, tray display area 72, and board display area 78) of the pointer (step 2702). And, the detailed header information display control 120 invokes the header information display control unit 70 when it is judged that the pointer 74 is in the header information display area 71 (step 2703), invokes the tray display control unit 80 when it is judged that the pointer 74 is in the tray display area 72 (step 2704), and invokes the board display control unit 110 when it is judged that the pointer 74 is in the board display area 78 (step 2705).

The invoked header information display control unit 70, tray display control unit 80 or board display control unit 110 obtains from the mail object storage unit 50 the mail object 500 corresponding to the line or mail symbol where the pointer 74 is positioned (step 2706). And, the header information 530 of the obtained mail object 500 is returned to the detailed header information display control unit 120 (step 2707).

The detailed header information display control unit 10 shows the detailed information display window 75 near the pointer 74 (step 2708), and shows the header information 58 received from the header information display control unit 70, tray display control unit 80 or board display control unit 110 in each display column of the pertinent detailed header information display window 75 (step 2709).

When the pointer 74 is moved from the line or mail symbol corresponding to the display of the detailed header information display window 75 (step 2710), the detailed header information display control unit 120 erases the detailed header information display window 75 from the screen (step 2711).

By the above-described operation, the electronic mail cataloging and retrieving system of Embodiment 5 provides particular effects that the user can easily browse the outline of an electronic mail corresponding to the line or mail symbol shown on the screen, in addition to the effects achieved in Embodiment 1 through Embodiment 4.

This embodiment has the structure that the detailed header information display control unit 120 was added to the electronic mail cataloging and retrieving system of Embodiment 4 shown in FIG. 8, but the additional information display control unit 90, the electronic mail condition retrieving unit 100 and the board display control unit 110 are not essential elements. Therefore, it is to be understood that the board display control unit 110 can be added to the electronic mail cataloging and retrieving system of Embodiment 1 shown in FIG. 1 which is not provided with the additional information display control unit 90, the electronic mail condition retrieving unit 100, and the board display control unit 110. And, the additional information display control unit 90, the electronic mail condition retrieving unit 100 and the board display control unit 110 can be combined appropriately with the detailed header information control unit 120 and added to the structure. In such a case, if the additional information display control unit 90, the electronic mail condition retrieving unit 100, and the board display control unit 110 are not provided, the operation particular to Embodiment 2 shown in FIG. 21 and FIG. 22, the operation particular to Embodiment 3 shown in FIG. 23 and the operation particular to Embodiment 4 shown in FIG. 25 and FIG. 26 are not performed in the operation for executing a direction; besides, the effects particular to Embodiment 2, those particular to Embodiment 3 and those particular to Embodiment 4 cannot be obtained.

Figure 28:
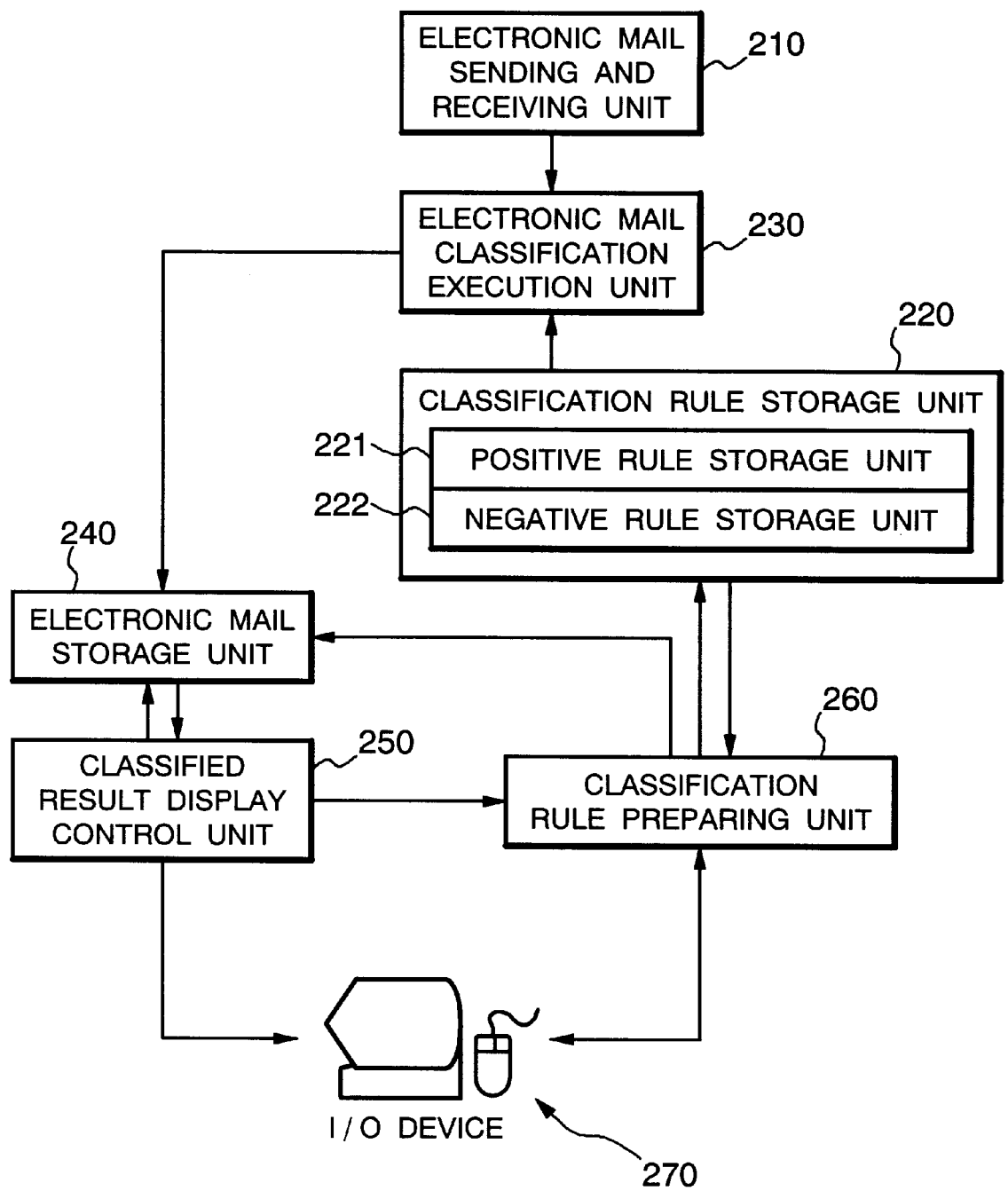
FIG. 28 is a block diagram showing a structure of the electronic mail cataloging and retrieving system according to Embodiment 6 of the invention.

Embodiment 6:

FIG. 28 is a block diagram showing a structure of the electronic mail cataloging and retrieving system according to Embodiment 6 of the invention. This embodiment is characterized by a means of preparing and changing a classification rule for classifying electronic mails.

The electronic mail cataloging and retrieving system of Embodiment 6 comprises an electronic mail sending and receiving unit 210, a classification rule storage unit 220, an electronic mail classification execution unit 230, an electronic mail storage unit 240, a classified result display control unit 250, and a classification rule preparing unit 260. And, this electronic mail cataloging and retrieving system is connected to an I/O device 270 through the classified result display control unit 250 and the classification rule preparing unit 260. FIG. 28 shows only a characteristic structure of this embodiment and omits other general structures. In practical use, it naturally has a means for managing and retrieving the classified and cataloged electronic mails and a printer for printing an electronic mail as required for example.

The electronic mail sending and receiving unit 210 is an interface for connecting the electronic mail cataloging and retrieving system and a wide area network, and sends or receives an electronic mail between the electronic mail cataloging and retrieving system and the wide area network.

The classification rule storage unit 220 is an internal storage device such as a RAM or an external storage device such as a magnetic disk device, and stores a classification rule to be used for classifying electronic mails. As shown in FIG. 28, the classification rule storage unit 220 has a positive rule storage unit 221 which stores conditions for classifying a given electronic mail into a prescribed classification category and a negative rule storage unit 222 which stores conditions for preventing the classification into the above classification category with respect to the classification category defined by the user.

The electronic mail classification execution unit 230 is a program-controlled CPU or the like, and uses the classification rule stored in the classification rule storage unit 220 to classify an electronic rule into an appropriate classification category.

The electronic mail storage unit 240 is an internal storage device such as a RAM and an external storage device such as a magnetic disk device, and stores mail data of electronic mails and the classified result of the pertinent electronic mail.

The classified result display control unit 250 is a program-controlled CPU or the like, and reads the classified result of an electronic mail stored in the electronic mail storage unit 240 to display on the screen of the I/O device 270.

The classification rule preparing unit 260 is a program-controlled CPU or the like, and prepares a classification rule for classifying electronic mails. Specifically, based on an example of classifying electronic mails entered by the user through the I/O device, the classification rule preparing unit 260 extracts necessary information from the mail data of electronic mails, and prepares a classification rule with reference to the extracted information.

The I/O device 270 has an input device such as a keyboard and a mouse for entering various data or commands into the electronic mail cataloging and retrieving system, and a display device for showing the content of an electronic mail, the classified result of an electronic mail, the classification rule and the like.

Figure 29:
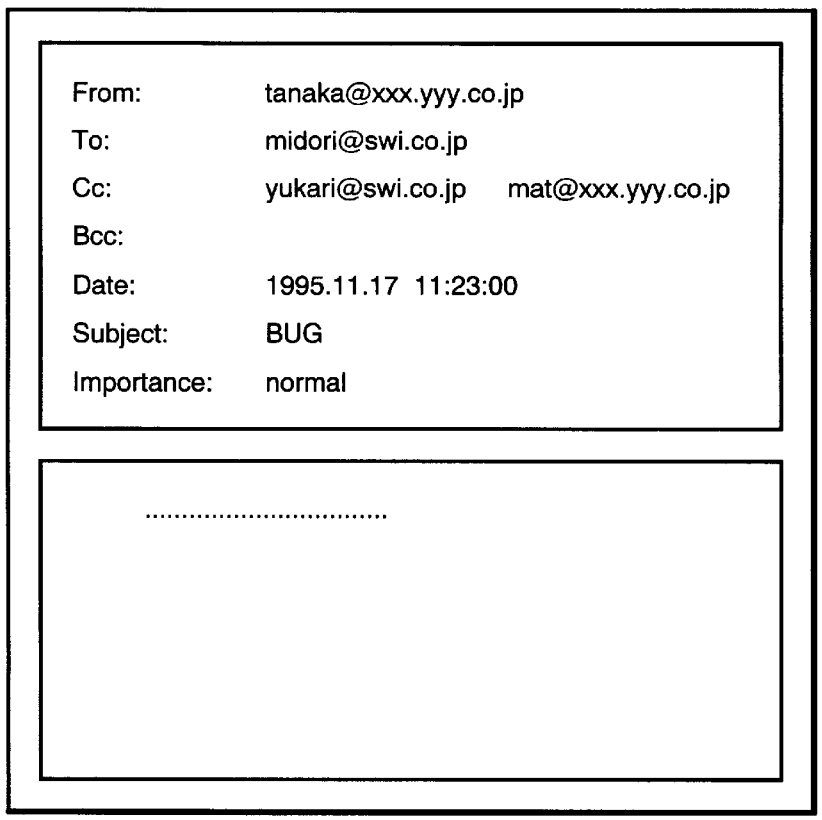
FIG. 29 is a diagram showing an example of mail data used in Embodiment 6.

FIG. 29 shows an example of the structure of electronic mail data to be sent to a network by the electronic mail sending and receiving unit 210. The electronic mail data in the drawing includes header information such as a sender (From), an addressee (To), an addressee of a carbon copy (CC), a sent date and time (Date) and a title (Subject), and the text.

Figure 30:
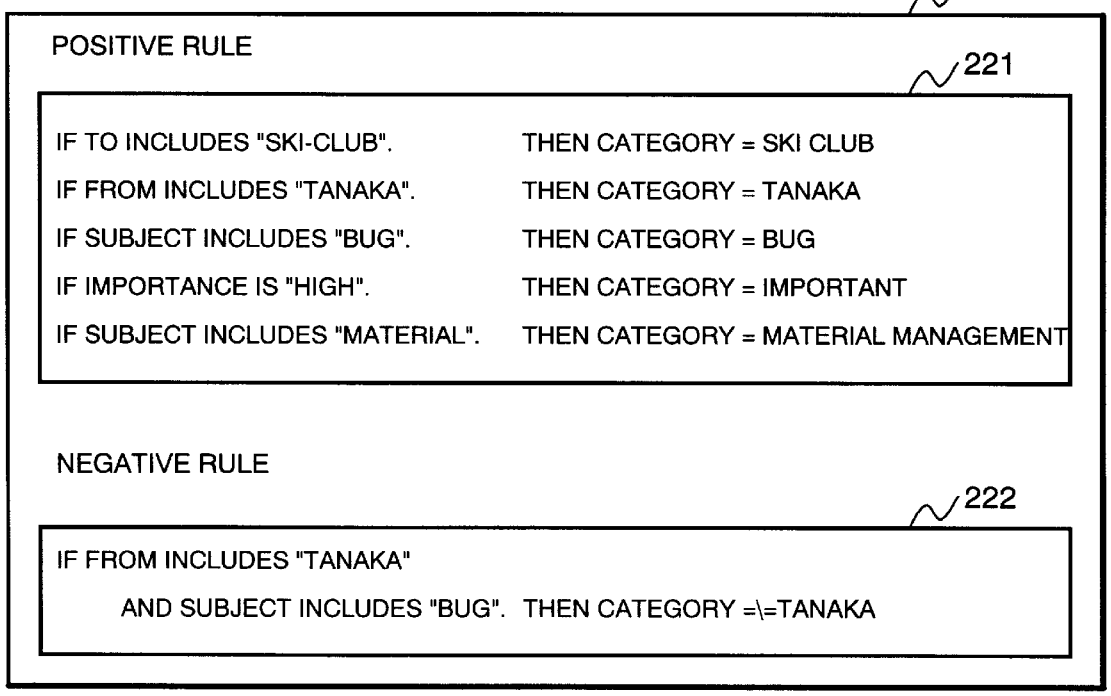
FIG. 30 is a diagram showing an example of the classification rule stored in the classification rule storage unit.

FIG. 30 shows one example of the classification rule stored in the classification rule storage unit 220. As seen in the drawing, the classification rule comprises a condition part and a conclusion part. A positive rule storage part 221 stores a positive rule which has a pattern of electronic mails as the condition part and a category name of a classification category to which an electronic mail conforming to the pertinent pattern is relevant as the conclusion part. For example, the first line in the positive rule storage part 221 in FIG. 30 means that if a character string "ski-club" is contained in the addressee, its electronic mail is classified into a category "ski club". The negative rule storage part 222 stores a negative rule which has a pattern of electronic mails as the condition part and a category name of a classification category to which an electronic mail conforming to the pertinent pattern is not relevant as the conclusion part. For example, the first line in the negative rule storage part 222 in FIG. 30 means that if a character string "tanaka" is contained in the sender and a character string "bug" is contained in the title, its electronic mail is not classified into a category "tanaka".

Figure 31:
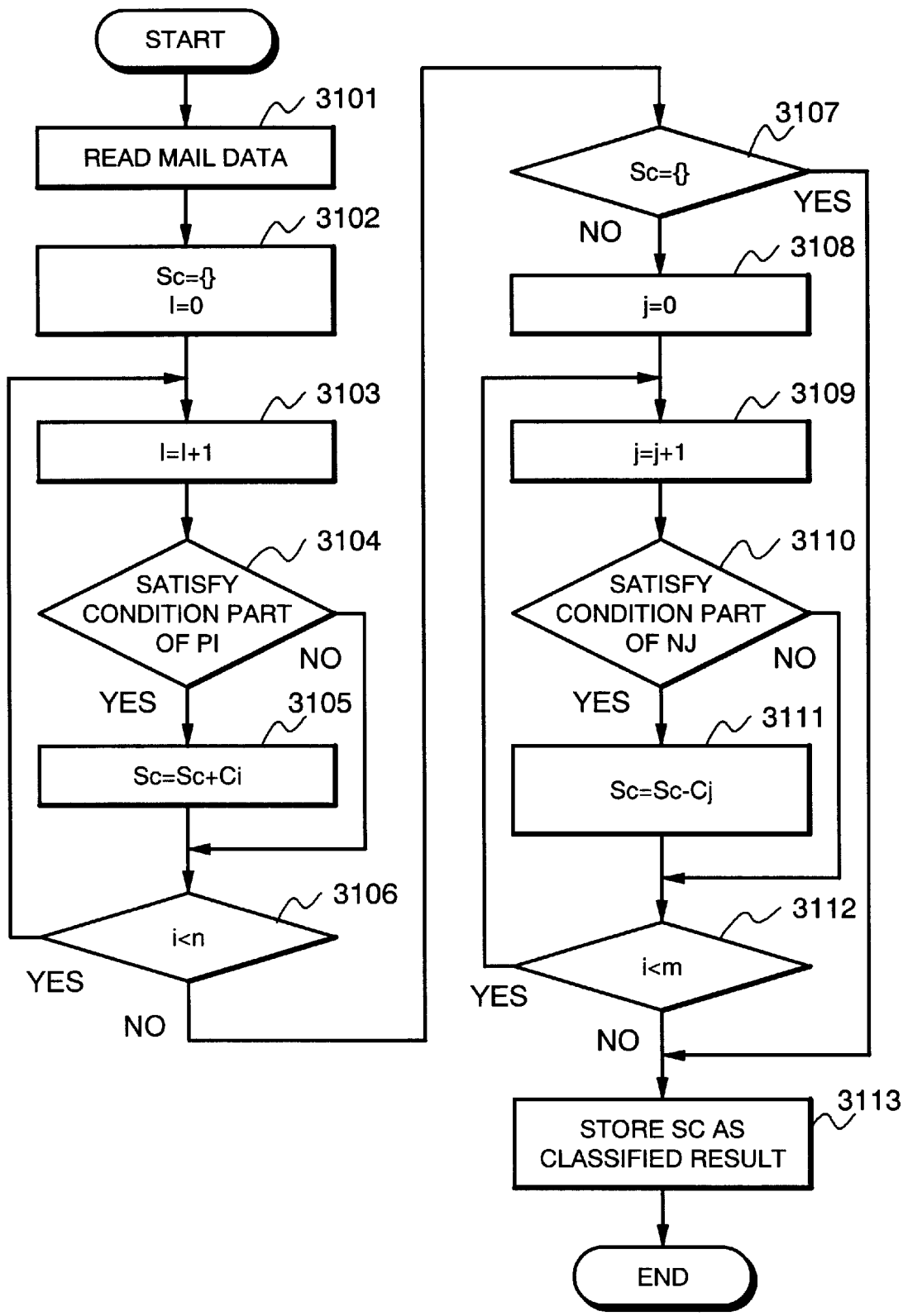
FIG. 31 is a flowchart showing the operation of mail classifying process.

Now, the operation of classifying process of an electronic mail in this embodiment will be described with reference to the flowchart of FIG. 31.

When an electronic mail is sent from the electronic mail sending and receiving unit 210 or an electronic mail is received by the electronic mail sending and receiving unit 210, the electronic mail classification execution unit 230 uses the classification rule stored in the classification rule storage unit 220 to determine a classification category of the pertinent electronic mail. For convenience of description, it is assumed that the rule stored in the positive rule storage part 221 is Pi (i=1, ..., n) and the rule stored in the negative rule storage part 221 is Nj (j=1, ..., m). And, the classification category defined by the user is assumed to be Ck (k=1, ..., t). In this case, n denotes the number of positive rules, m denotes the number of negative rules, and t means the number of classification categories.

The electronic mail classification execution unit 230 reads electronic mail data from the electronic mail sending and receiving unit 210 (step 3101), and sets a classification category set Sc of the pertinent electronic mail to a null set (step 3102). Then, the electronic mail classification execution unit 230 checks whether or not the pertinent electronic mail satisfies the condition part of each positive rule Pi stored in the positive rule storage unit (step 3104) and, if so, adds a classification category Ck inserted into the conclusion part of the positive rule Pi to the classification category set Sc (step 3105). The check of this positive rule Pi and the additional process of the classification category set Sc are performed on all positive rules Pi (steps 3103–3106).

After completing the check on all positive rules, if the classification category set Sc is a null set, the classified result of the electronic mail is determined to be the null set (steps 3107 and 3113).

If the classification category set Sc is not a null set, it is checked whether or not the pertinent electronic mail satisfies the condition part of each negative rule Nj stored in the negative rule storage part (step 3110) and, if it does, the classification category Ck inserted into the conclusion part of the negative rule Ni is deleted from the classification category set Sc (step 3111). The check of this negative rule Ni and the deleting process of the classification category set Sc are performed on all negative rules Nj (steps 3108–3112).

The element of the classification category set Sc after completing the check on all negative rules Nj makes a category in which the pertinent electronic mail is classified (step 3113). Thus, the classification category set Sc obtained is stored as the classified result in the electronic mail storage unit 240 together with the mail data of the pertinent electronic mail.

When the electronic mail data and classified result stored in the electronic mail storage unit 240 are renewed, the classified result display control unit 250 outputs a new storage content to the I/O device 270 to show on the display device. FIG. 32 shows one example of the screen showing the classified result. The screen in FIG. 32 shows information on the received date, sender, title and category in which an electronic mail is classified. In the drawing, the mark "o" in the display column corresponding to each category shows the classified result when the pertinent electronic mail is a received electronic mail, and the mark "x" shows the classified result when the pertinent electronic mail is a sent electronic mail. And, the electronic mail which has the mark "o" in the "Unclassified" column does not have the pertinent classification category, indicating that the classified result has become a null set. For example, the electronic mail on the first row in the screen of FIG. 32 is meant not to have the pertinent classification category. The electronic mail on the fourth row is meant to have been classified into the categories "Important" and "Material management".

Figure 33:
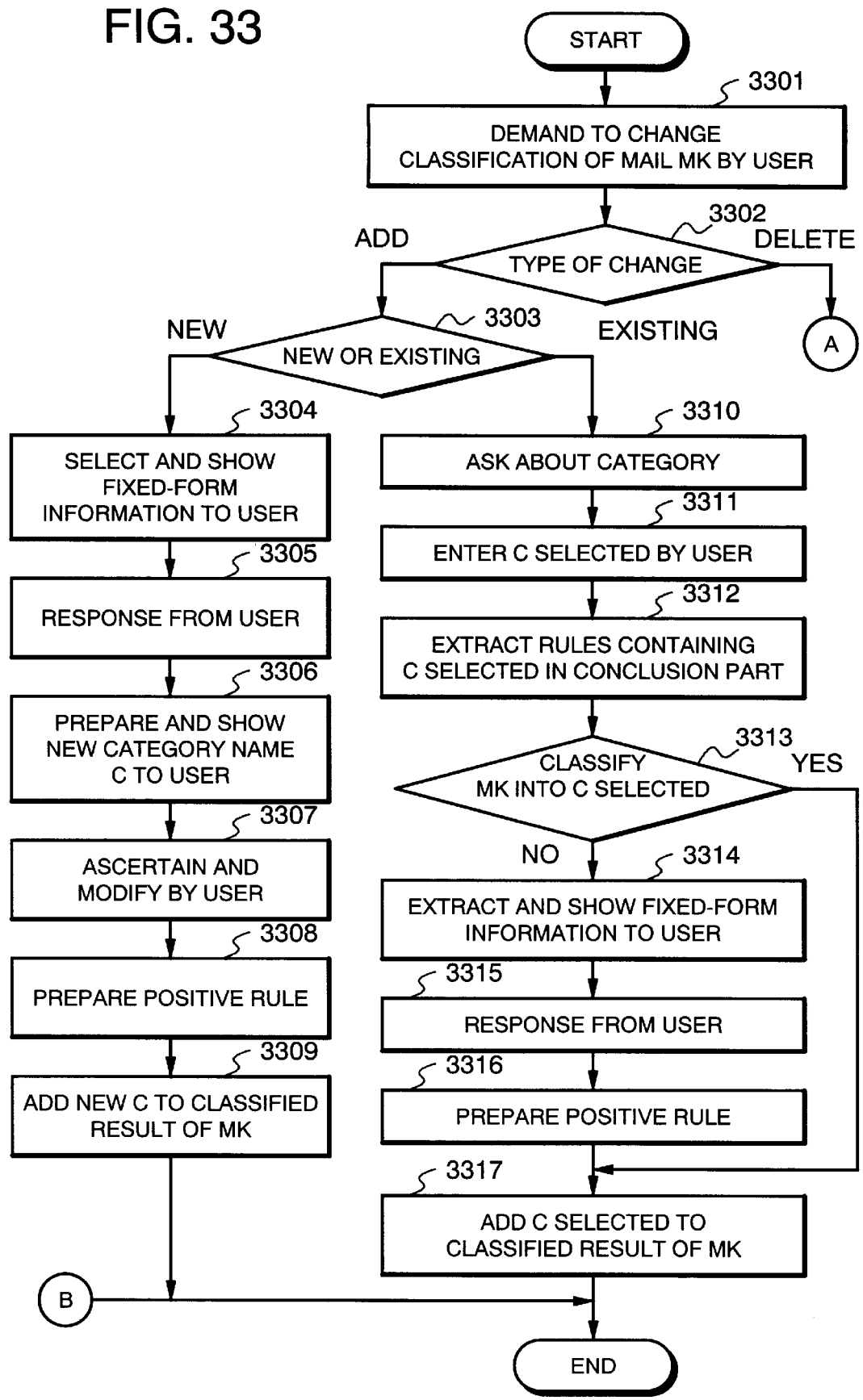
FIG. 33 is a flowchart showing the operation of classification rule preparing process, showing the operation of adding classification.
Figure 34:
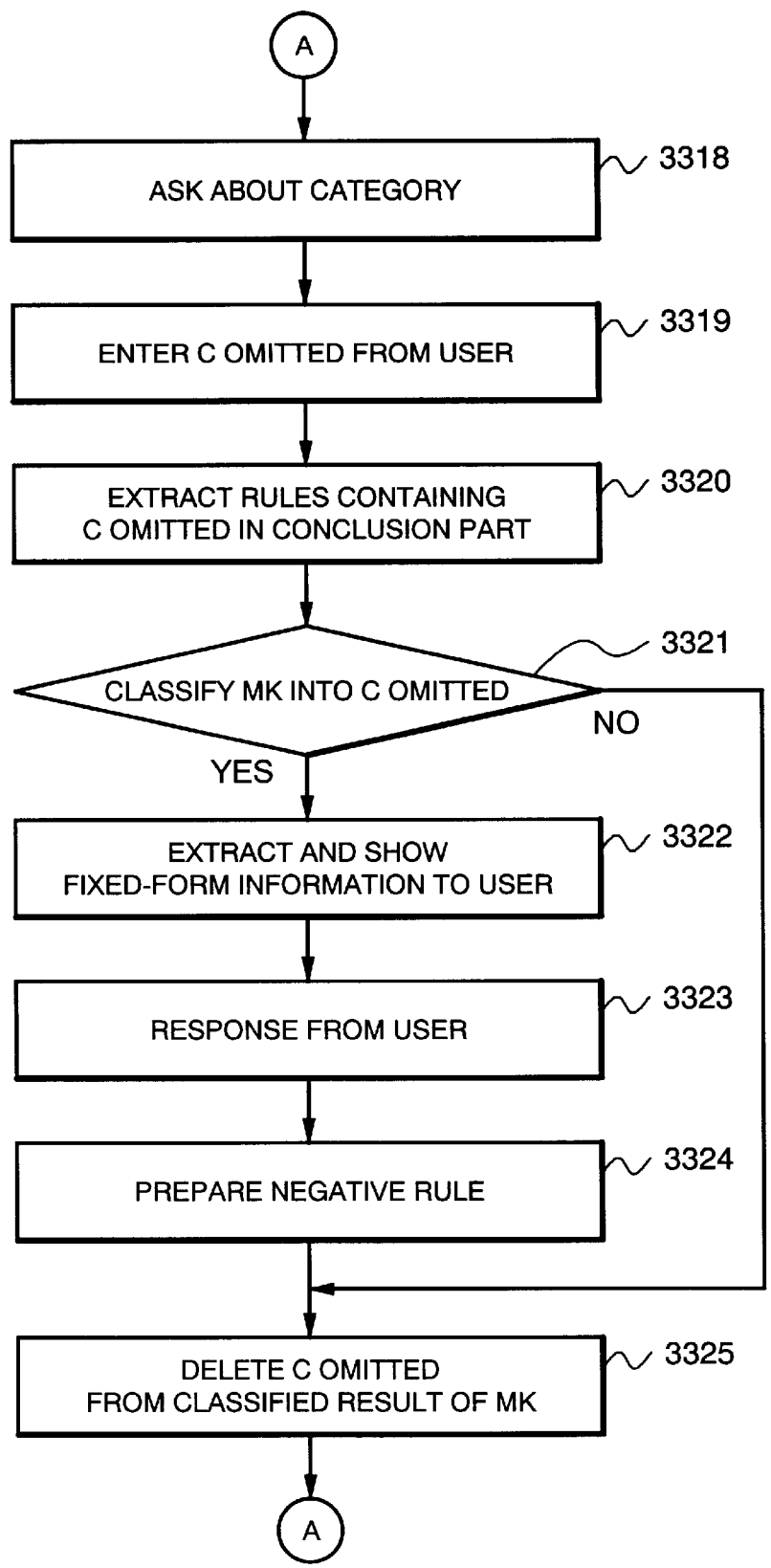
FIG. 34 is a flowchart showing the operation of classification rule preparing process, showing the operation of deleting classification.

Now, the operation of the preparing process of the classification rule in this embodiment will be described with reference to the flowcharts of FIG. 33 and FIG. 34.

When a demand to change the classification of a specified electronic mail Mk is entered by the user through the I/O device 270 (FIG. 33, step 3301), the classification rule preparing unit 260 asks the user whether a classification category for the electronic mail is added or deleted (step 3302). This inquiry is made by showing a prescribed message on the I/O device 270 or the like.

When the classification category "Addition" is selected as the content of a change to the classification, the classification rule preparing unit 260 further asks the user whether a new category is prepared and added to the classification or the existing category is added as the classification (step 3303). When the user answers "New", the classification rule preparing unit 260 extracts the header information of the electronic mail Mk from the electronic mail storage unit 240, and gives its list to the user (step 3304).

When the user operates the I/O device 270 to select information on classification conditions from the list and to enter it (step 3305), the classification rule preparing unit 260 shows the selected information as category name C (new) to the user (step 3306). The user ascertains the category name shown on the I/O device 270, and can modify the category name C (new) if necessary (step 3307).

Then, the classification rule preparing unit 260 determines the header information selected by the user as the condition part, prepares a positive rule with the category name C (new) ascertained and modified by the user as the conclusion part, and additionally stores into the positive rule storage part 221 (step 3308). And, the category C (new) is added to the classification of the electronic mail Mk stored in the electronic mail storage unit 240 (step 3309).

On the other hand, when the answer from the user in response to the inquiry for the category to be added in step 3303 is "Existing", the classification rule preparing unit 260 asks about a category to be added to the classification of the electronic mail Mk (step 3310). When the user operates the I/O device 270 to enter the category C (selected) to be added (step 3311), the classification rule preparing unit 260 collects all positive and negative rules which have the category C (selected) in the conclusion part from the classification rule storage unit 220 (step 3312), and checks whether or not the electronic mail Mk can be classified into the category C (selected) by using the existing classification rule (step 3313). When it is judged that the electronic mail Mk can be classified into the category C (selected), the category C (selected) is added to the classification of the electronic mail Mk stored in the electronic mail storage unit 240.

When it is judged that the electronic mail Mk can not be classified into the category C (selected) by the existing rule, the header information on the electronic mail Mk is extracted, and its list is shown to the user (step 3314). When the user operates the I/O device 270 to select and enter information as the classification conditions from the list (step 3315), the classification rule preparing unit 260 prepares a positive rule with the header information selected by the user as the condition part and the category C (selected) as the conclusion part, and adds to the positive rule storage part 221 (step 3316). And, the category C (selected) is added to the classification of the electronic mail Mk stored in the electronic mail storage unit 240 (step 3317).

Now, description will be made of the operation when the classification category "Deletion" is selected as the content of changing the classification of the electronic mail Mk in step 3302 (see FIG. 34).

In this case, the classification rule preparing unit 260 asks the user about which category shall be removed among the categories set as the classification for the electronic mail Mk (step 3318).

When the user operates the I/O device 270 to enter the category C (omitted) (step 3319), the classification rule preparing unit 260 collects all positive and negative rules which have the category C (omitted) in the conclusion part from the classification rule storage unit 220 (step 3320), and checks whether or not the electronic mail Mk can be classified into the category C (omitted) by using the existing classification rule (step 3321). When it is judged that the electronic mail Mk can not be classified into the category C (omitted), the category C (omitted) is deleted from the classification of the electronic mail Mk stored in the electronic mail storage unit 240 (step 3325).

When it is judged that the electronic mail Mk can be classified into the category C (omitted) by the existing rule, the header information on the electronic mail Mk is extracted, and its list is shown to the user (step 3322). When the user operates the I/O device 270 to select information as the classification conditions from the list and enter it (step 3323), the classification rule preparing unit 260 prepares a negative rule with the header information selected by the user as the condition part and the category C (omitted) as the conclusion part, and adds to the negative rule storage part 222 (step 3324). And, the category C (omitted) is deleted from the classification of the electronic mail Mk stored in the electronic mail storage unit 240.

Specific description will be made how the classification rule is prepared with reference to FIG. 32. FIG. 35 shows the mail data of the electronic mail in the first row of FIG. 32, and FIG. 36 shows the mail data of the electronic mail in the second row. And, it is assumed that the classification rule shown in FIG. 30 is stored in the classification rule storage unit 220.

It is assumed that the electronic mail in the first row should be classified into the existing category "ski club".

When the user requests to change the classification of the electronic mail in the first row, the classification rule preparing unit 260 extracts information such as "sender" and "title" which are usable as the classification conditions from the mail data of the pertinent electronic mail and shows a list of what were extracted to the user by showing on the I/O device 270. The user selects the elements which are actually used as the classification conditions from the shown list. FIG. 37 shows an example of the list of classification conditions. In the example of FIG. 37, when the "addressee of carbon copy" is selected as an element to be used as the classification condition, the classification rule preparing unit 260 prepares a positive rule "If carbon copy addressee is ski-club@swl.co.jp, then classify into category 'ski-club'".

Now, it is assumed that among the electronic mails related to "Material", setting is made to classify the electronic mails sent by the user not into the category "Material management" but into a new category "Material copy".

The user requests to delete the category "Material management" and to add a new category for the classification of the electronic mail in the second row in the screen of FIG. 32. In this case, the classification rule preparing unit 260 prepares for example a negative rule that if the title contains a character string "Material" and "Sender" is midori, it is not classified into the category "Material" and a positive rule that if the title contains a character string "Material" and "sender" is midori, it is classified into the category "Material copy".

By the above-described operation of the electronic mail cataloging and retrieving system of Embodiment 6, the user who does not know the format of the classification rule can enter an electronic mail the user wants to classify, and select an appropriate condition from the shown candidate classification conditions to prepare or modify a classification rule.

In the above example, the description has been made on a case that the electronic mail classification execution unit 230 classifies the sent or received electronic mail and the electronic mail entered by the user. But, the classification can be made on the electronic mails which have been classified and stored in the electronic mail storage unit 240. In this case, in response to a request of reclassifying by the user, the pertinent electronic mail is read from the electronic mail storage unit 240, and the classification rule stored in the classification rule storage unit 220 is used to make classification. A new classified result is stored in the electronic mail storage 240 again.

Thus, if the content of the classification rule stored in the classification rule storage unit 220 is changed, any electronic mail sent or received after the change in the classification rule can be classified according to the new classification standard, and the electronic mails which had been sent or received can also be classified again according to the new classification standard.

Figure 38:
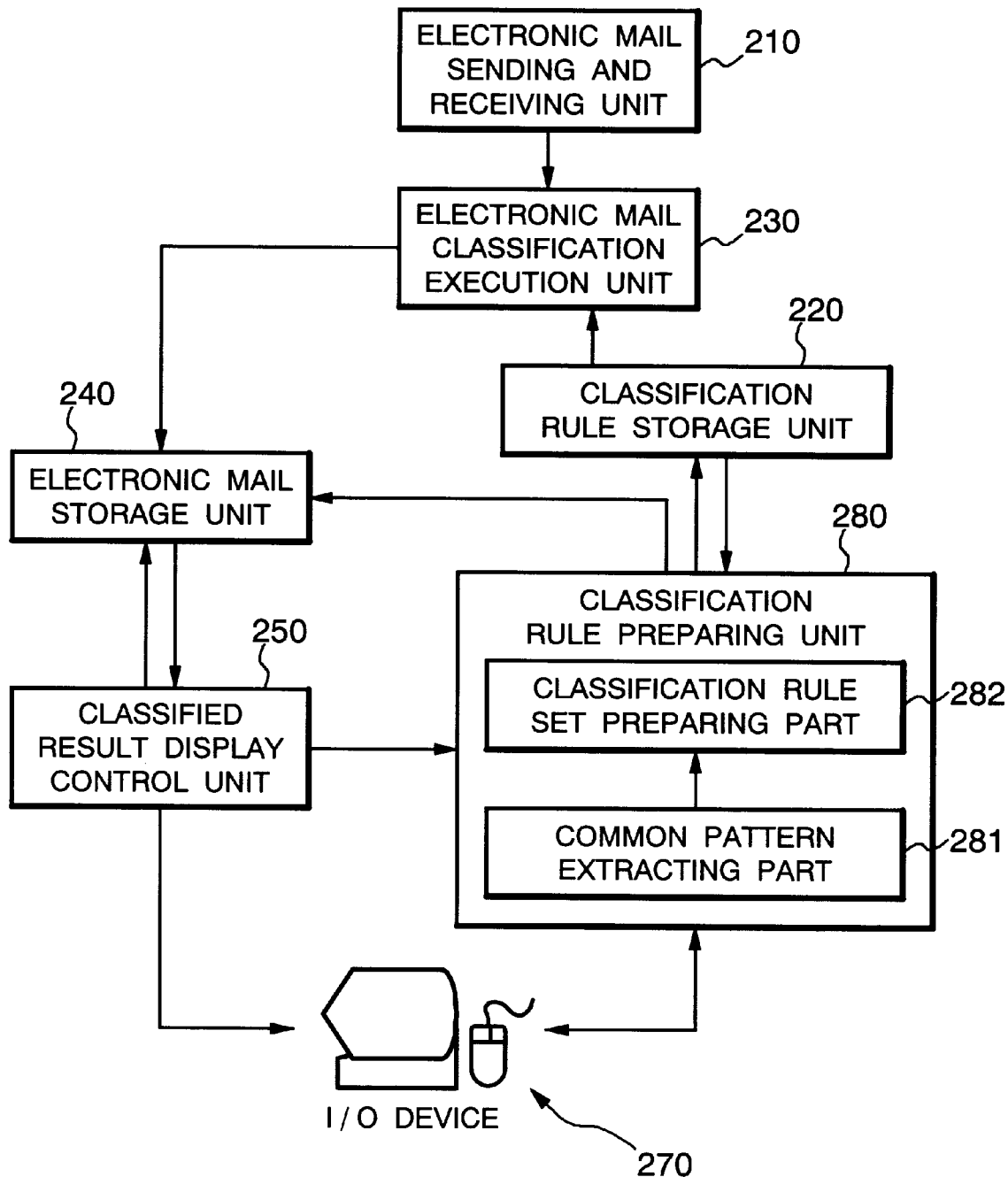
FIG. 38 is a block diagram showing a structure of the electronic mail cataloging and retrieving system according to Embodiment 7 of the invention.
Figure 39:
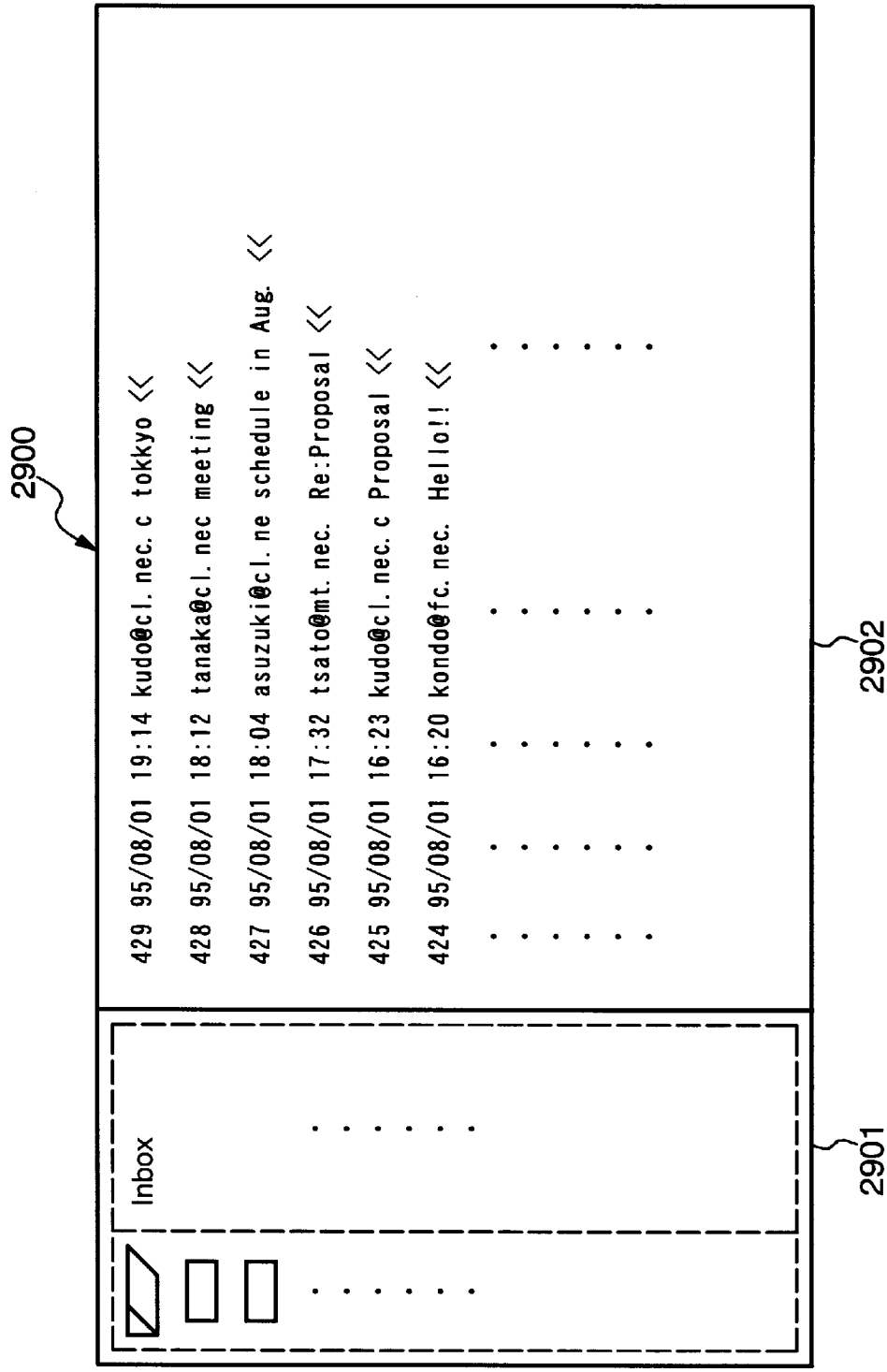
FIG. 39 is a diagram showing one example of the screen shown by a conventional electronic mail cataloging and retrieving system.

Embodiment 7:

FIG. 38 is a block diagram showing a structure of the electronic mail cataloging and retrieving system according to Embodiment 7 of the invention.

The electronic mail cataloging and retrieving system of Embodiment 7 comprises an electronic mail sending and receiving unit 210, a classification rule storage unit 220, an electronic mail classification execution unit 230, an electronic mail storage unit 240, a classified result display control unit 250, and a classification rule preparing unit 280. And, this electronic mail cataloging and retrieving system is connected to an I/O device 270 through the classified result display control unit 250 and the classification rule preparing unit 280. FIG. 38 shows only a characteristic structure of this embodiment and omits other general structures. In the above configuration, the electronic mail sending and receiving unit 210, the classification rule storage unit 220, the electronic mail classification execution unit 230, the electronic mail storage unit 240, the classified result display control unit 250, and the I/O device 270 have the same configurations as those described in connection with Embodiment 6 shown in FIG. 28. Therefore, they are given the same reference numerals and descriptions on their configurations will be omitted.

The classification rule preparing unit 280 is a program-controlled CPU or the like, prepares a classification rule for classifying an electronic mail by the same process as the classification preparing unit 260 described in Embodiment 6, and is provided with a common pattern extracting part 281 and a classification rule set preparing part 282 for supporting the preparing process of a classification rule when a request for adding new classifications for a plurality of electronic mails is made.

The common pattern extracting part 281 extracts a common pattern for the respective electronic mails when a request for modifying the classification on a plurality of electronic mails is received. The classification rule preparing unit 280 prepares a classification rule based on the extracted common pattern.

The classification rule set preparing part 282 prepares a classification rule based on a direction by the user and prepares a set of a plurality of classification rules when there is not a common pattern for all the pertinent electronic rules.

Now, description will be made of the operation of the classification rule preparing unit 280 with respect to a case that a request for modifying the classification is entered by the user on a plurality of electronic mails Ms (s=1, . . . , I; I is a desired natural number).

When the content of classification change is an addition to a new category, the common pattern extracting part 281 extracts header information from each electronic mail Ms, and checks whether or not there is information common to all electronic mails. When there is information common to all electronic mails Mc, the classification rule preparing unit 280 newly prepares a classification category C (all) with the obtained common information as the category name and prepares a positive rule with the common information as the classification condition.

When there is not any piece of information common to all electronic mails, the common pattern extracting part 281 selects information common to most electronic mails. The classification rule preparing unit 280 newly prepares a classification category C (most) with the selected information as the category name, and prepares a positive rule with the pertinent information as the classification condition.

On the other hand, the classification set preparing part 282 extracts an electronic mail which does not meet the prepared positive rule from the set of electronic mails Ms, and displays each header information pattern of the obtained electronic mail on the I/O device 270 to show the user. When the user refers to the shown header information pattern and selects information to be used as the classification condition, the classification rule preparing unit 280 prepares a positive rule with the category C (most) as the conclusion part.

Addition to the existing category and deletion of a category can be performed in the same way.

By the above-described operation, the electronic mail cataloging and retrieving system of Embodiment 7 provides particular effects that when the user enters a plurality of electronic mails as a classification example, common information can be extracted and a classification rule can be prepared automatically, in addition to the effects achieved in Embodiment 6.

And, when there is not any piece of information which is common to all of the entered electronic mails, common information which covers most electronic mails can be selected to prepare a rule, so that the user's time and trouble can be reduced.

As described above, by using the "tray" with the electronic mail cataloging and retrieving system of the present invention, there are effects that header information and classification state of all electronic mails held can be seen simultaneously, and the electronic mails can be cataloged flexibly with less time and labor.

And, since information can be freely added to the electronic mails by means of a tag (additional information), there are effects that the electronic mails can be cataloged and retrieved in more various forms.

Besides, since the electronic mails can be retrieved by the retrieving condition entered by the user and the retrieved result can be displayed on the screen in the form of a tray, there are effects that the electronic mails can be cataloged and retrieved efficiently with less time and labor.

Furthermore, the retrieval history can be shown on the screen together with the header information, electronic mail attribute information and classification state without switching the screen and the user can refer to the retrieval history, so that there are effects that the electronic mails can be cataloged and retrieved in more various forms.

And, since the electronic mail cataloging and retrieving system has the two-dimensional symbol display area to show the electronic mail symbol corresponding to an electronic mail, when the user needs a specific electronic mail, the user can readily refer to it by using the electronic mail symbol shown at a specific display position in the two-dimensional symbol display area, so that there are effects that the electronic mails can be cataloged and retrieved more intuitionally.

Besides, the outline of an electronic mail specified by the header information or the like shown on the screen can be bloused easily, so that there is an effect that the electronic mail can be retrieved more efficiently.

In addition, to prepare or modify a classification rule, the user does not need to study a format of the classification rule, and can prepare or modify a desired classification category or classification rule by a simple operation of directly specifying the electronic mail to be classified. Thus, there are effects that a new classification category can be prepared easily or the classification standard can be modified readily.

Furthermore, when the user requires to classify a plurality of electronic mails into the same category, the classification rule preparing unit extracts information common to the plurality of electronic mails, and automatically prepares a classification rule with information which is common to most electronic mails as the classification condition. Thus, there is an effect of decreasing the user's time and trouble required for processing.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An electronic mail cataloging and retrieving system for cataloging and retrieving sent or received electronic mail comprising:

an electronic mail communication means for sending or receiving the electronic mail;

a first storage means for storing the electronic mail sent or received by the electronic mail communication means;

a second storage means for storing information on a plurality of classification types used for classification of the electronic mail and a format to relate the electronic mail according to the classification types;

a third storage means for storing an electronic mail object which has at least path information, electronic mail attribute information, header information and classification information on each individual piece of electronic mail stored in the first storage means;

a header information display means for reading from the third storage means the header information and the electronic mail attribute information among the electronic mail object concerning a prescribed piece of electronic mail and displaying the header information and the electronic mail attribute information on a display device in a prescribed header information display screen in the form of an at-a-glance guide;

a tray display means for displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types stored in the second storage means, and with the classification types, and with the classification information of an electronic mail object concerning the prescribed piece of electronic mail and being stored in the third storage means; and an electronic mail editing means for displaying a content of an individual piece of electronic mail stored in the first storage means according to a direction by a user and editing the content of the individual piece of electronic mail as required.

2. The electronic mail cataloging and retrieving system as set forth in claim 1, wherein:

the header information display means:

displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list; and the tray display means:

allocates a single piece of electronic mail to a single line, relates each line with a single individual piece of electronic mail according to the allocation of electronic mail in the first list which is shown on the header information display screen by the header information display means, displays a second list, which has all the classification types as classification items, onto the tray information display screen, and inserts a document symbol, which indicates that an individual piece of electronic mail is classified into a particular classification types into a classification item relevant to a classification category of an individual piece of electronic mail related to a particular line of the second list.

3. The electronic mail cataloging and retrieving system as set forth in claim 1, wherein:

the header information display means:

displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list;

the tray display means:

allocates a single piece of electronic mail to a single line, relates each line with a single piece of electronic mail according to the allocation of electronic mail in the first list which is shown on the header information display screen by the header information display means, displays a second lists which has all the classification types as classification items, onto the tray information display screen, and inserts a document symbol, which indicates that an individual piece of electronic mail is classified into a particular classification type, into a classification item relevant to a classification category of an individual piece of electronic mail related to a particular line of the second list; and the header information display means and the tray display means display the header information display screen and the tray information display screen in display areas disposed in parallel in a same display screen.

4. The electronic mail cataloging and retrieving system as set forth in claim 1, wherein the header information display means:

displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list; and the tray display means:

allocates a single piece of electronic mail to a single line, relates each line with a single piece of electronic mail according to the allocation of electronic mail in the first list which is shown on the header information display screen by the header information display means, displays a second list, which has all the classification types as classification items, onto the tray information display screen, and inserts a document symbol which indicates that an individual piece of electronic mail is classified into a particular classification types into a classification item relevant to a classification category of an individual piece of electronic mail related to a particular line of the second list; and the electronic mail editing means, according to a direction entered to show an individual piece of electronic mail by designating a given line on the header information display screen or a given document symbol on the tray information display screen, reads the content of an individual piece of electronic mail relevant to the designated line or document symbol from the first storage means and shows the content on an electronic mail display screen.

5. An electronic mail cataloging and retrieving system for cataloging and retrieving sent or received electronic mail comprising:

an electronic mail communication means for sending or receiving the electronic mail;

a first storage means for storing the electronic mail sent or received by the electronic mail communication means;

a second storage means for storing a format to relate information on a plurality of classification types, used for classification of the electronic mail with the electronic mail according to the plurality of classification types;

a third storage means which, with respect to each individual piece of electronic mail stored in the first storage means, stores an electronic mail object having at least path information, electronic mail attribute information, header information, classification information, and given additional information on a related piece of electronic mail;

a header information display means for reading from the third storage means the header information and the electronic mail attribute information among the electronic mail object concerning a prescribed piece of electronic mail and displaying on a display device in a prescribed header information display screen in the form of an at-a-glance guide;

a tray display means for displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types stored in the second storage means, and with the classification types, and with the classification information of an electronic mail object concerning the prescribed piece of electronic mail and being stored in the third storage means;

an additional information display means for showing a memo symbols indicating that the additional information is added to the related piece of electronic mail which includes the additional information in the electronic mail objects in correspondence with a first list which is displayed on the display device by the header information display means and in which a single piece of electronic mail is allocated to a single line onto the header information display screen; and an electronic mail editing means for displaying a content of an individual piece of electronic mail stored in the first storage means according to a direction by a user and editing the content of the individual piece of electronic mail as required.

6. The electronic mail cataloging and retrieving system as set forth in claim 5, wherein the additional information display means, among the lines in the first list shown by the header information display means, shows the memo symbol at a given position on a line corresponding to an individual piece of electronic mail which has the additional information in its electronic mail object.

7. The electronic mail cataloging and retrieving system as set forth in claim 5, wherein the additional information display means, according to a direction entered to show the additional information by designating a given memo symbol, reads the additional information in the electronic mail object corresponding to the designated memo symbol from the third storage means and shows the additional information on a prescribed additional information display screen.

8. The electronic mail cataloging and retrieving system as set forth in claim 5, wherein the additional information display means, among the lines in the first list shown by the header information display means, shows the memo symbol at a prescribed position on a line corresponding to an individual piece of electronic mail containing the additional information in its electronic mail object, and, according to a direction entered to show the additional information by designating a given memo symbol, reads the additional information in the electronic mail object corresponding to the designated memo symbol from the third storage means and shows the additional information on a prescribed additional information display screen.

9. The electronic mail cataloging and retrieving system as set forth in claim 1 further comprising:

an electronic mail condition retrieval means for retrieving the electronic mail stored in the first storage means based on a given retrieval condition separately entered, wherein the second storage means stores the retrieval condition as one of the classification types of the electronic mail, the third storage means stores a retrieved result on each piece of retrieved electronic mail by the electronic mail condition retrieval means as classification information contained in the electronic mail object corresponding to each retrieved piece of electronic mail, and the tray information display means additionally shows a classification item corresponding to the retrieval condition onto the tray information display screen based on a classification type corresponding to the retrieval condition stored in the second storage means and additionally shows the classification information corresponding to the retrieved result stored in the third storage means.

10. The electronic mail cataloging and retrieving system as set forth in claim 1 further comprising:

a board display means for showing an electronic mail symbol for indicating an individual piece of electronic mail designated by a prescribed means among the electronic mail stored in the first storage means in connection with a desired position on a prescribed symbol display screen, wherein an electronic mail object stored in the third storage means, corresponding to the individual piece of electronic mail, has display position information on the electronic mail symbol on the symbol display screen shown by the board display means.

11. The electronic mail cataloging and retrieving system as set forth in claim 10, wherein the header information display means, the tray display means and the board display means show the header information display screen, the tray information display screen and the symbol display screen in a display area formed in a same display screen.

12. The electronic mail cataloging and retrieving system as set forth in claim 10, wherein:

the header information display means displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list; and the tray display means:

allocates a single piece of electronic mail to a single line, relates each line with a single piece of electronic mail according to the allocation of electronic mail in the first list which is shown on the header information display screen by the header information display means, displays a second lists which has all the classification types as classification items, onto the tray information display screen, and inserts a document symbols which indicates that an individual piece of electronic mail is classified into a particular classification type, into a classification item relevant to a classification category of an individual piece of electronic mail related to a particular line of the second list; and the electronic mail editing means, according to a direction entered to show an individual piece of electronic mail by designating a given line on the header information display screen, a given document symbol on the tray information display screen, or a given electronic mail symbol on the symbol display screen, reads the content of an individual piece of electronic mail relevant to the designated line, document symbol or electronic mail symbol from the first storage means and shows the content on the electronic mail display screen.

13. The electronic mail cataloging and retrieving system as set forth in claim 1 further comprising:

a pointer display means for displaying a pointer at a desired position, and a detailed header information display means which monitors a position of the pointer and displays in a prescribed format detailed header information of an individual piece of electronic mail specified by the position of the pointer in accordance with a direction to display detailed header information.

14. The electronic mail cataloging and retrieving system as set forth in claim 13, wherein:

the header information display means displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list; and the tray display means:

allocates a single piece of electronic mail to a single line, relates each line with a single piece of electronic mail according to the allocation of electronic mail in the first list which is shown on the header information display screen by the header information display means, displays a second list, which has all the classification types as classification items, onto the tray information display screen, and inserts a document symbols which indicates that an individual piece of electronic mail is classified into a particular classification types into a classification item relevant to a classification category of an individual piece electronic mail related to a particular line of the second list; and the detailed header information display means, in accordance with a direction to display the detailed header information entered when the pointer is positioned on a given line on the header information display screen or on a given document symbol on the tray information display screen, reads from the third storage means an electronic mail object of an individual piece of electronic mail relevant to the line or the document symbol where the pointer is positioned and displays at least a portion of the read electronic mail object near the pointer.

15. The electronic mail cataloging and retrieving system as set forth in claim 13 further comprising:

a board display means for showing an electronic mail symbol for indicating an individual piece of electronic mail designated by a prescribed means among the electronic mail stored in the first storage means in connection with a desired position on a prescribed symbol display screen, wherein an electronic mail object stored in the third storage means has display position information on the electronic mail symbol on the symbol display screen shown by the board display means, the header information display means displays a first list in which a single piece of electronic mail is allocated to a single line onto the header information display screen, and inserts the header information and the electronic mail attribute information of the electronic mail object related to a prescribed piece of electronic mail selected according to a prescribed standard into each column of the first list; and the tray display means:

allocates a single piece of electronic mail to a single line, relates each line with a single piece of electronic mail according to the allocation of electronic mail in the first list which is shown on the header information display screen by the header information display means, displays a second list, which has all the classification types as classification items, onto the tray information display screen, and inserts a document symbol, which indicates that an individual piece of electronic mail is classified into a particular classification type, into a classification item relevant to a classification category of an individual piece of electronic mail related to a particular line of the second list; and the detailed header information display means, in accordance with a direction to display the detailed header information entered when the pointer is positioned on a given line on the header information display screen, on a given document symbol on the tray information display screen or on a given electronic mail symbol on the symbol display screen, reads from the third storage means an electronic mail object of an individual piece of electronic mail relevant to the line, the document symbol or the electronic mail symbol where the pointer is positioned and displays at least a portion of the read electronic mail object near the pointer.

16. An electronic mail cataloging and retrieving system for cataloging or retrieving sent or received electronic mail comprising:

an electronic mail communication means for sending or receiving the electronic mail;

a first storage means for storing the electronic mail sent or received by the electronic mail communication means;

a second storage means which stores a plurality of classification rules used for classification of the electronic mail;

an electronic mail classification means which determines classification categories of the electronic mail by using the plurality of classification rules stored in the second storage means and determines a classified result;

a classified result display means for displaying the classified result; and a classification rule preparing means which extracts required information from mail data of an individual piece of electronic mail according to a classification example entered by a user and prepares a classification rule by an interactive procedure.

17. The electronic mail cataloging and retrieving system as set forth in claim 16, wherein.

the classification rules stored in the second storage means are rules to relate a pattern of an individual piece of electronic mail with a category in which an individual piece of electronic mail having the pattern has to be classified or a category in which an individual piece of electronic mail having the pattern must not be classified; and the classification rule preparing means shows prescribed information for forming a pattern of an individual piece of electronic mail based on a predetermined standards prepares a prescribed electronic mail pattern based on information specified by a user among the shown information, prepares a category in which an individual piece of electronic mail having the pattern has to be classified, and relates the prepared electronic mail pattern to the prepared category.

18. The electronic mail cataloging and retrieving system as set forth in claim 16, wherein:

the classification rules stored in the second storage means are rules to relate a pattern of an individual piece of electronic mail with a category in which an individual piece of electronic mail having the pattern has to be classified or a category in which an individual piece of electronic mail having the pattern must not be classified; and when the classification rule preparing means receives a request for changing the classification of an individual piece of electronic mail, if the classification change request requires preparing a new category and classifying the individual piece of electronic mail into the prepared category, then the classification rule preparing means shows prescribed information for forming a pattern of an individual piece of electronic mail based on a predetermined standard, prepares a prescribed electronic mail pattern based on information specified by a user among the shown information, prepares a category in which an individual piece of electronic mail having the pattern has to be classified, and prepares a rule to relate the prepared electronic mail pattern to the prepared category, if the classification change request requires specifying the existing category to newly classify the individual piece of electronic mail into the category, then the classification rule preparing means prepares a rule to relate the designated category as a category in which classification must be made to the electronic mail pattern, and if the classification change request requires deleting a prescribed category among the categories in which the individual piece of electronic mail is classified by the existing classification rule, then the classification rule preparing means prepares a rule to relate the category to be deleted as a category in which classification must not be made to the electronic mail pattern.

19. The electronic mail cataloging and retrieving system as set forth in claim 16, wherein the electronic mail classification means reads an individual piece of electronic mail classified and stored in the first storage means as required and redetermines a classification category based on a classification rule stored in the second storage means.

20. The electronic mail cataloging and retrieving system as set forth in claim 16, wherein the electronic mail classification means, upon receiving a request for changing a classification rule made by specifying a plurality of pieces of electronic mail, prepares a set of classification rules to meet a relevant relation with the plurality of pieces of electronic mail.

21. The electronic mail cataloging and retrieving system as set forth in claim 16, wherein:

the electronic mail classification means, upon receiving a request for changing a classification rule made by specifying a plurality of pieces of electronic mail, when a possible classification rule meeting a relevant relation with all of the plurality of pieces of electronic mail is available, determines the possible classification rule as a classification rule for the plurality of pieces of electronic mail, and when a possible classification rule meeting a relevant relation with all the plurality of pieces of electronic mail is not available, extracts a classification rule which meets the relevant relation with most of the plurality of pieces of electronic mail and extracts a second classification rule which meets a relevant relation with each individual piece of electronic mail which is not pertinent to the extracted classification rule, and prepares a classification rule set including all the extracted classification rules.

22. The electronic mail cataloging and retrieving system as set forth in claim 20, wherein the electronic mail classification means reads an individual piece of electronic mail classified and stored in the first storage means as required and redetermines a classification category based on a classification rule stored in the second storage means.

23. A method for cataloging and retrieving sent or received electronic mail, for use in an electronic mail cataloging and retrieving system, the method comprising the steps of:

sending or receiving the electronic mail;

storing the electronic mail sent or received;

storing information on a plurality of classification types used for classification of the electronic mail;

storing a format to relate each of the individual pieces of electronic mail according to the classification types;

storing an electronic mail object which has at least path information, electronic mail attribute information, header information and classification information on each individual piece of electronic mail;

reading the header information and the electronic mail attribute information from the electronic mail object concerning a prescribed piece of electronic mail, and displaying the header information and the electronic mail attribute information on a display device in a prescribed header information display screen in the form of an at-a-glance guide;

displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types, and with the classification types, and with the classification information of an electronic mail object concerning the prescribed piece of electronic mail; and displaying a content of an individual piece of electronic mail according to a direction by a user and editing the content of the individual piece of electronic mail as required.

24. A method for cataloging and retrieving sent or received electronic mail, for use in an electronic mail cataloging and retrieving system, the method comprising the steps of:

sending or receiving the electronic mail;

storing the electronic mail sent or received;

storing a format to relate information on a plurality of classification types, used for classification of the electronic mail, with the electronic mail according to the plurality of classification types;

storing, for each individual piece of electronic mail, an electronic mail object having at least path information, electronic mail attribute information, header information, classification information, and given additional information on a related piece of electronic mail;

reading the header information and the electronic mail attribute information from the electronic mail object concerning a prescribed piece of electronic mail and displaying the header information and the electronic mail attribute information on a display device in a prescribed header information display screen in the form of an at-a-glance guide;

displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types, and with the classification types, and with the classification information of an electronic mail object concerning the prescribed piece of electronic mail;

showing a memo symbol, indicating that the additional information is added to the related piece of electronic mail which includes the additional information in the electronic mail object, in correspondence with a first list which is displayed on the display device by the header information display means and in which a single piece of electronic mail is allocated to a single line on the header information display screen; and displaying a content of an individual piece of electronic mail according to a direction by a user and editing the content of the individual piece of electronic mail as required.

25. A method for cataloging and retrieving sent or received electronic mail, for use in an electronic mail cataloging and retrieving system, the method comprising the steps of:

sending or receiving the electronic mail;

storing the electronic mail sent or received;

storing a plurality of classification rules used for classification of the electronic mail;

determining classification categories of the electronic mail by using the plurality of classification rules;

determining a classified result from the classification categories;

displaying the classified result; and preparing a classification rule by extracting required information from mail data of an individual piece of electronic mail according to a classification example entered by a user and preparing a classification rule by an interactive procedure.

26. A computer program product comprising computer readable program code for causing a cataloging and a retrieving of sent or received electronic mail, for use in an electronic mail cataloging and retrieving system, the program code in the computer program product comprising:

first computer readable program code for sending or receiving the electronic mail;

second computer readable program code for storing the sent or received electronic mail;

third computer readable program code for storing information on a plurality of classification types used for classification of the electronic mail;

fourth computer readable program code for storing a format to relate each of the individual pieces of electronic mail according to the classification types;

fifth computer readable program code for storing an electronic mail object which has at least path information, electronic mail attribute information, header information and classification information on each individual piece of electronic mail;

sixth computer readable program code for reading the header information and the electronic mail attribute information from the electronic mail object concerning a prescribed piece of electronic mail and displaying the header information and the electronic mail attribute information on a display device in a prescribed header information display screen in the form of an at-a-glance guide;

seventh computer readable program code for displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types, and with the classification types, and with the classification information of an electronic mail object concerning the prescribed piece of electronic mail; and eighth computer readable program code for displaying a content of an individual piece of electronic mail according to a direction by a user and editing the content of the individual piece of electronic mail as required.

27. A computer program product comprising computer readable program code for causing a cataloging and a retrieving of sent or received electronic mail, for use in an electronic mail cataloging and retrieving system, the program code in the computer program product comprising:

first computer readable program code for sending or receiving the electronic mail;

second computer readable program code for storing the sent or received electronic mail;

third computer readable program code for storing a format to relate information on a plurality of classification types, used for classification of the electronic mail, with the electronic mail according to the plurality of classification types;

fourth computer readable program code for storing, for each individual piece of electronic mail, an electronic mail object having at least path information, electronic mail attribute information, header information, classification information, and given additional information on a related piece of electronic mail;

fifth computer readable program code for reading the header information and the electronic mail attribute information from the electronic mail object concerning a prescribed piece of electronic mail and displaying the header information and the electronic mail attribute information on a display device in a prescribed header information display screen in the form of an at-a-glance guide;

sixth computer readable program code for displaying tray information on the display device, wherein the tray information shows whether or not a prescribed piece of electronic mail is classified into a prescribed classification type on a prescribed tray information display screen by referring to a format which relates the prescribed piece of electronic mail with information on the classification types, and with the classification types, and with the classification information of an electronic mail object concerning the prescribed piece of electronic mail;

seventh computer readable program code for showing a memo symbol, indicating that the additional information is added to the related piece of electronic mail which includes the additional information in the electronic mail object, in correspondence with a first list which is displayed on the display device by the header information display means and in which a single piece of electronic mail is allocated to a single line on the header information display screen; and eighth computer readable program code for displaying a content of an individual piece of electronic mail according to a direction by a user and editing the content of the individual piece of electronic mail as required.

28. A computer program product comprising computer readable program code for causing a cataloging and a retrieving of sent or received electronic mail, for use in an electronic mail cataloging and retrieving system, the program code in the computer program product comprising:

first computer readable program code for sending or receiving the electronic mail;

second computer readable program code for storing the sent or received electronic mail;

third computer readable program code for storing a plurality of classification rules used for classification of the electronic mail;

fourth computer readable program code for determining classification categories of the electronic mail by using the plurality of classification rules;

fifth computer readable program code for determining a classified result from the classification categories;

sixth computer readable program code for displaying the classified result; and seventh computer readable program code for preparing a classification rule by extracting required information from mail data of an individual piece of electronic mail according to a classification example entered by a user and preparing a classification rule by an interactive procedure.

* * * * *